(12) United States Patent  (10) Patent No.: US 8,413,176 B2
Maeda et al.  (45) Date of Patent: Apr. 2, 2013

(54) DISK DEVICE HAVING CLAMPER LIFTERS WITH DIFFERENT START OF MOVEMENT TIMING

(75) Inventors: Shinichi Maeda, Osaka (JP); Takuto Yamazaki, Nara (JP); Yukio Morioka, Osaka (JP); Norikatsu Yoshida, Hyogo (JP); Yuji Ariyoshi, Osaka (JP); Hitoshi Higaki, Osaka (JP); Tatsuro Nishi, Osaka (JP)

(73) Assignee: Panasonic Corporation, Osaka (JP)

( * ) Notice: Subject to any disclaimer, the term of this patent is extended or adjusted under 35 U.S.C. 154(b) by 11 days.

(21) Appl. No.: 13/171,585

(22) Filed: Jun. 29, 2011

(65) Prior Publication Data

US 2012/0005695 A1    Jan. 5, 2012

(30) Foreign Application Priority Data

Jun. 30, 2010    (JP) .................................. 2010-148729

(51) Int. Cl.
*G11B 17/03*  (2006.01)
*G11B 17/04*  (2006.01)
*G11B 33/02*  (2006.01)

(52) U.S. Cl. ...................................................... 720/604

(58) Field of Classification Search .................. 720/604, 720/617–624, 632, 633, 652
See application file for complete search history.

(56) References Cited

U.S. PATENT DOCUMENTS

2002/0163870 A1*  11/2002  Ariyoshi et al. ............. 369/75.2
2008/0229338 A1   9/2008   Yamanaka

FOREIGN PATENT DOCUMENTS

| JP | 10-92077 | 4/1998 |
| JP | 11-213496 | 8/1999 |
| JP | 2008-226333 | 9/2008 |

* cited by examiner

*Primary Examiner* — Craig A. Renner
*Assistant Examiner* — Gustavo Polo
(74) *Attorney, Agent, or Firm* — Wenderoth, Lind & Ponack, LLP.

(57) ABSTRACT

A disk device is provided with a pair of slide cam members that start movement when a disk is conveyed to a replayable position, and a pair of clamper lifters respectively having clamper support portions supporting a clamper. The clamper lifters are moved in opposite directions to each other in a horizontal direction orthogonal to a thickness direction of the disk device in conjunction with the movement of the pair of slide cam members. They are arranged so that the timings of the start of movement in the opposite directions to each other are different from each other. The clamper support portions have inclined surfaces in contact with an outer peripheral part of the clamper so as to move the clamper in the thickness direction of the disk device in accordance with the movement of the pair of clamper lifters in the opposite directions to each other.

7 Claims, 41 Drawing Sheets

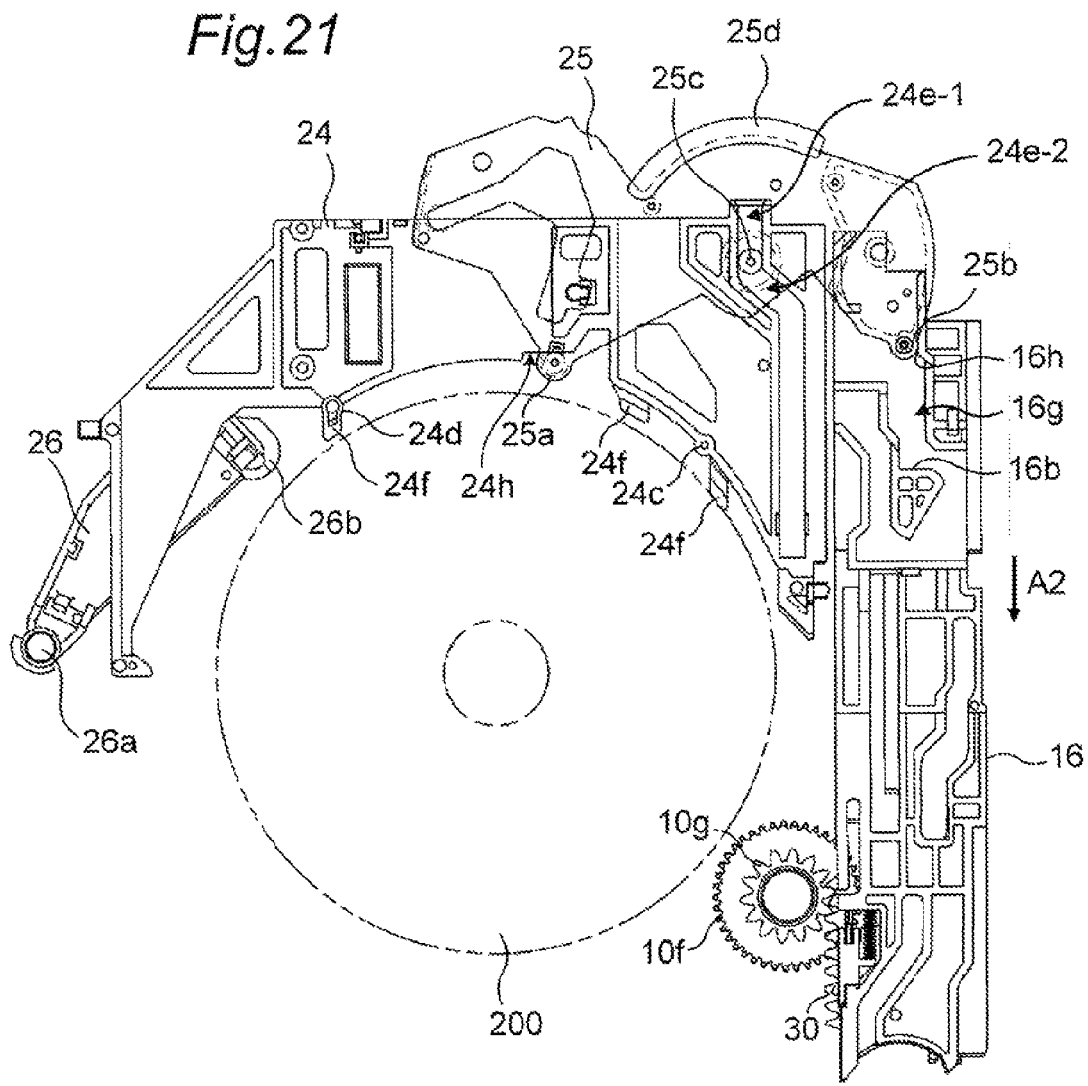

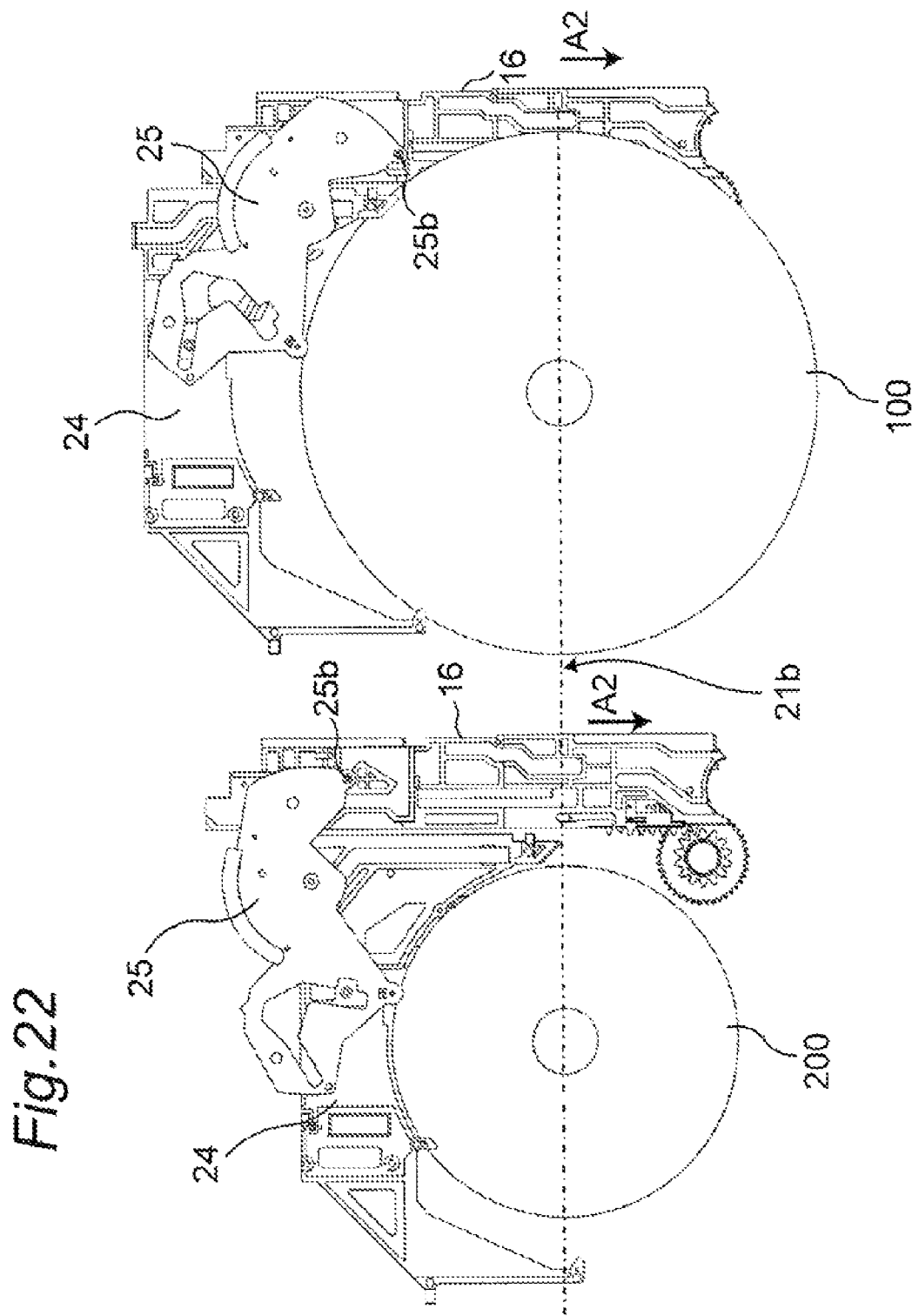

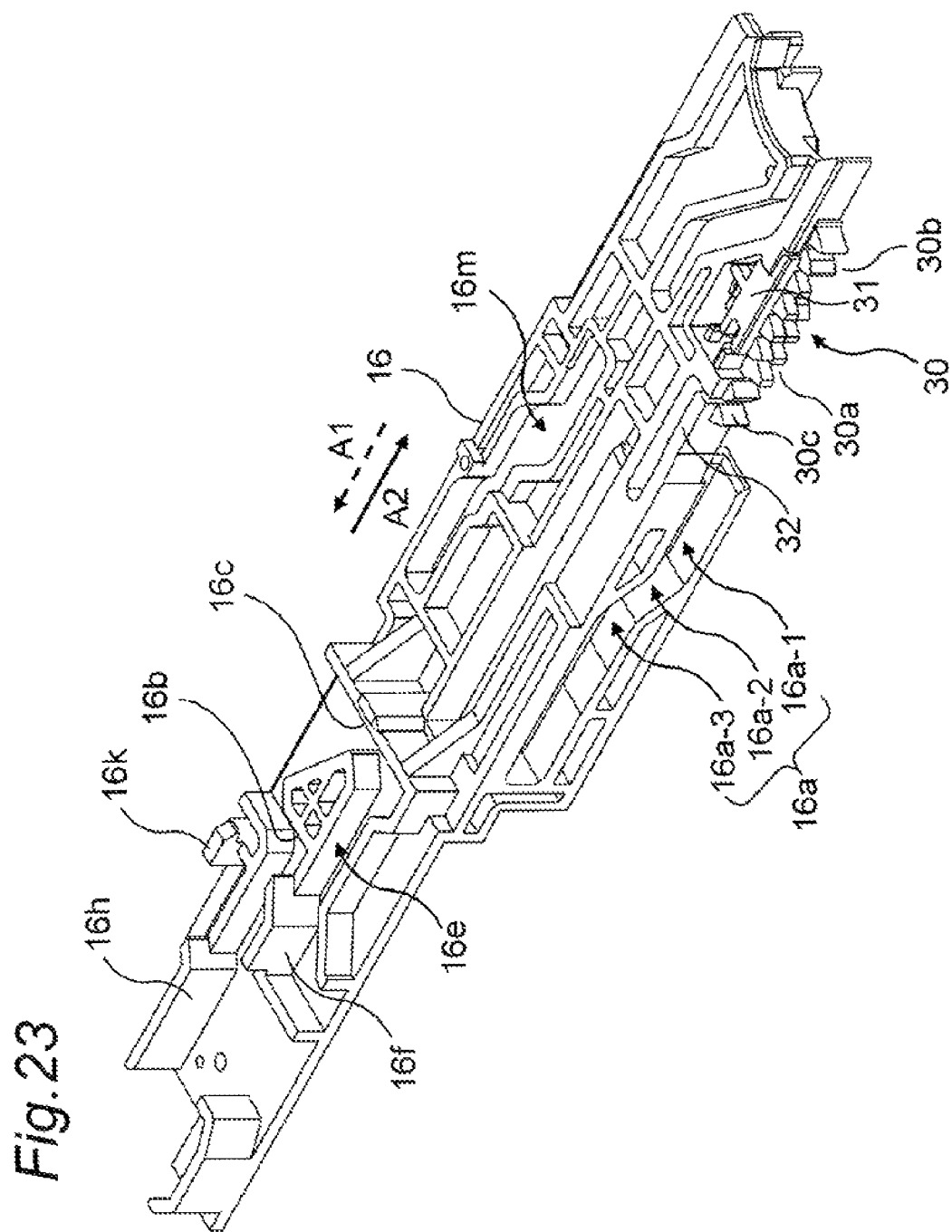

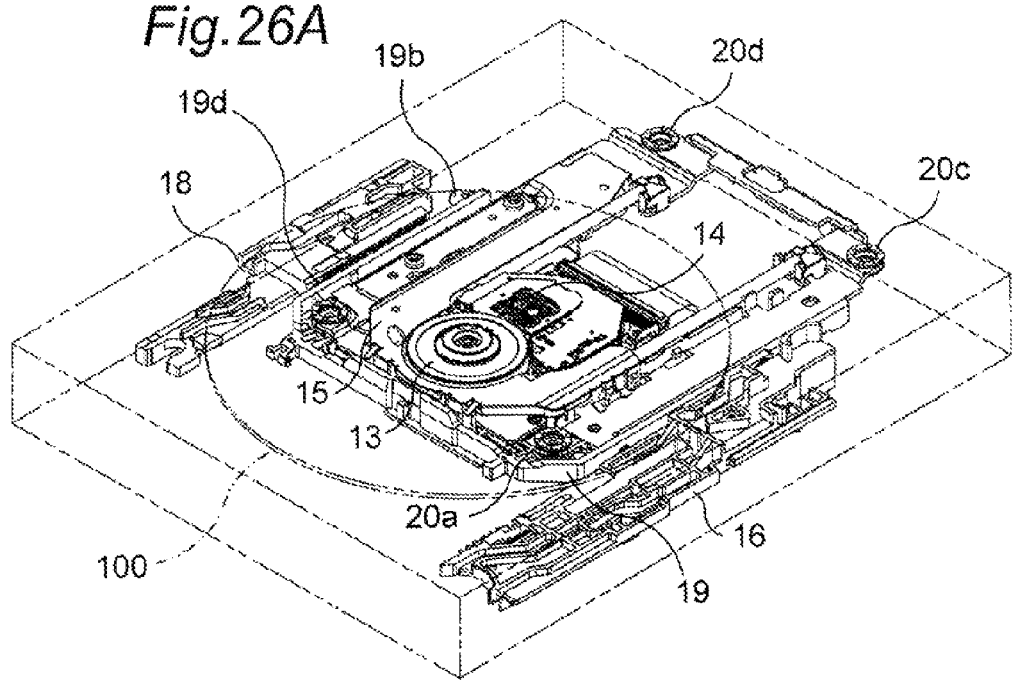
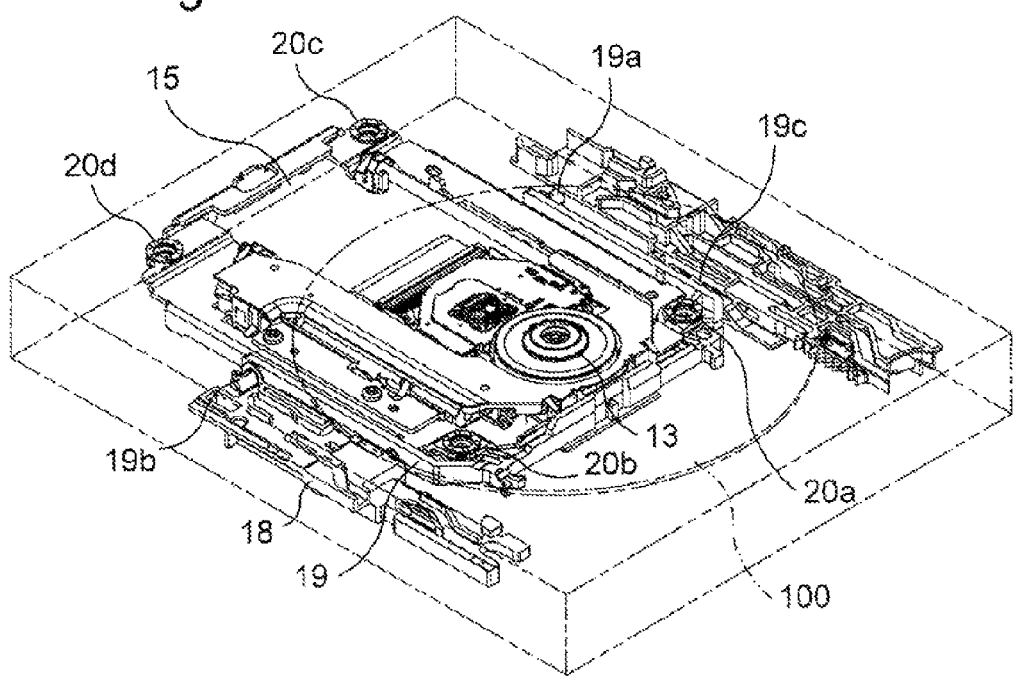

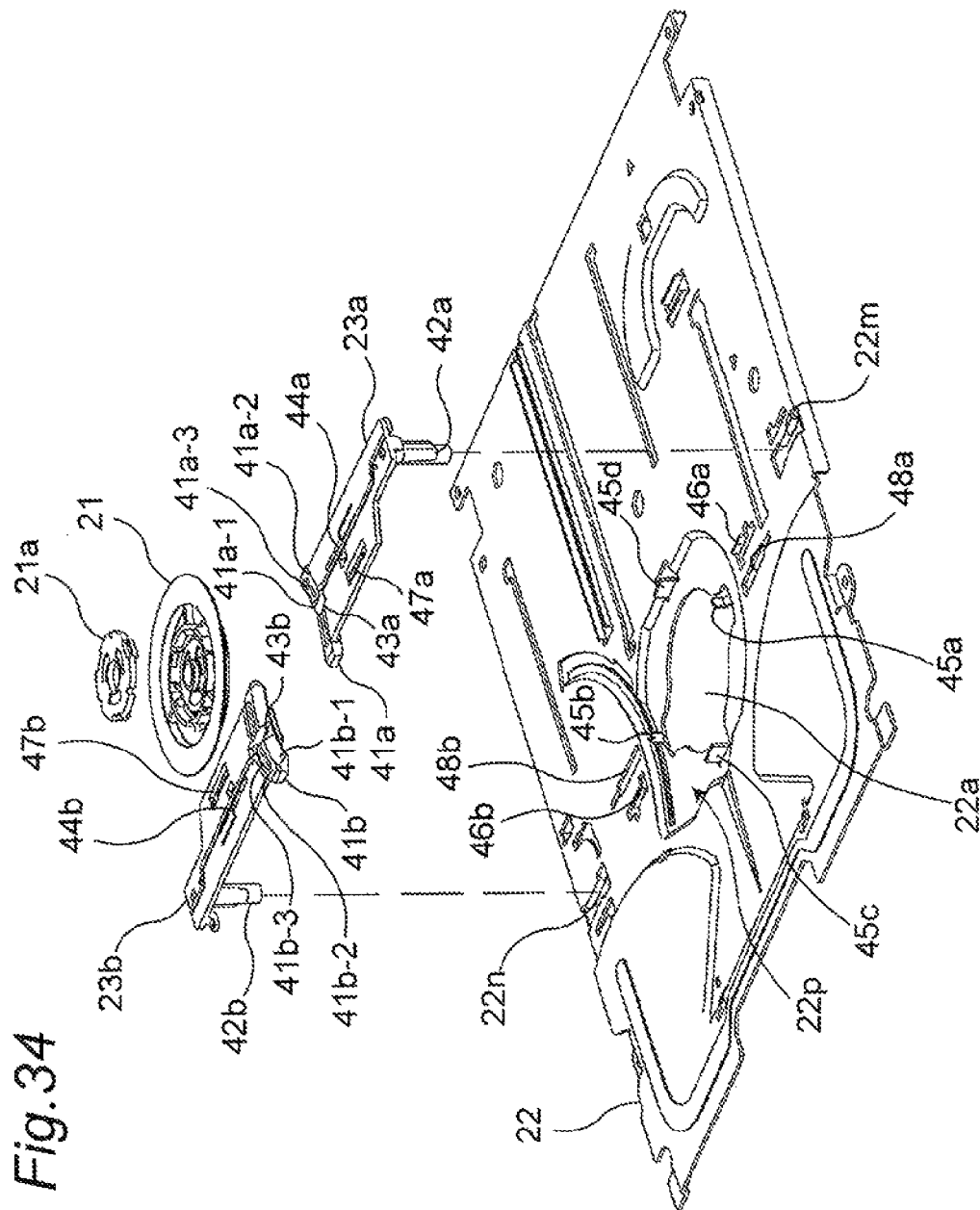

DISK DEVICE HAVING CLAMPER LIFTERS WITH DIFFERENT START OF MOVEMENT TIMING

BACKGROUND OF THE INVENTION (1) Field of the Invention

The present invention relates to a disk device, particularly to a disk device for detecting an inserted disk at a position facing a turntable and bringing the disk into a replayable installment state by a clamper.

(2) Description of Related Art

In recent years, a disk device is required to be further thinner and smaller, and there are various proposals for realizing a thinner and smaller disk device. As this type of disk device, for example, there are devices disclosed in Patent Document 1 (Japanese Unexamined Patent Publication No. 11-213496), Patent Document 2 (Japanese Unexamined Patent Publication No. 10-92077), and Patent Document 3 (Japanese Unexamined Patent Publication No. 2008-226333).

Patent Document 1 discloses a disk device in which a pair of clamper support members is rotated in a thickness direction of the device so as to be brought away from a turntable, so that a clamper is brought away from the turntable. Patent Document 1 also discloses that when the clamper is brought away from the turntable, the pair of clamper support members is operated with a time difference so that one side of the clamper is firstly brought away from the turntable, and then the other side of the clamper is brought up from the turntable.

Patent Document 2 discloses a disk device in which when a pair of left and right clamper support plates is moved in a horizontal direction so as to come close to each other, the pair of left and right clamper support plates is rotated in a thickness direction of the device so as to be brought away from a turntable in accordance with the movement, so that a clamper is brought away from the turntable.

Patent Document 3 discloses a disk device in which facing ends of a pair of clamper separating means are formed into a tapered shape, and the ends are rotated in a thickness direction of the device so as to be brought away from a turntable, so that a clamper is separated from the turntable.

SUMMARY OF THE INVENTION

Any of the disk devices in Patent Documents 1-3 are formed so that members to be contacted with the clamper so as to bring the clamper away from the turntable are rotated in the thickness direction of the device. Therefore, there is a need for a space in which the members are rotated, and there is a limitation in making the disk device thinner and smaller.

Thus, an object of the present invention is to solve the above issue, and to provide a disk device capable of being further thinner and smaller.

In order to achieve the above object, the present invention is formed as follows.

The present invention is to provide a disk device which nips a disk conveyed to a replayable position in a casing between a clamper and a turntable so as to bring the disk into a replayable clamping state, comprising:

a pair of slide cam members which detects that the disk is conveyed to the replayable position, the pair of slide cam members respectively starting movement in conjunction with the detection, and a pair of clamper lifters respectively having clamper support portions supporting the clamper, wherein the pair of clamper lifters is moved in opposite directions to each other in a horizontal direction orthogonal to a thickness direction of the disk device in conjunction with the movement of the pair of slide cam members, and formed so that the timing to start movement in the opposite directions to each other are different from each other, and the clamper support portions of the pair of clamper lifters respectively have inclined surfaces being contacted with an outer peripheral part of the clamper in accordance with the movement of the pair of clamper lifters in the opposite directions to each other so as to move the clamper in the thickness direction of the disk device.

According to the disk device of the present invention, the pair of clamper lifters is formed so as to be moved in the opposite directions to each other in the horizontal direction orthogonal to the thickness direction of the disk device. Thus, there is no need for a space in which the pair of clamper lifters is rotated. Therefore, a further thinner and smaller disk device can be realized.

In a case where the pair of clamper lifters is moved in the opposite directions to each other at the same time, the clamper collides with the disk, and there is a fear that strong impact force and impact sound are generated.

Meanwhile, according to the disk device of the present invention, the timings of the pair of clamper lifters to start the movement are different from each other, and the clamper support portions have the inclined surfaces. Thus, the impact force and the impact sound when the clamper is brought into contact with the disk can be eased. A load required when the clamper is brought away from the disk can be reduced.

BRIEF DESCRIPTION OF THE DRAWINGS

FIG. 21 is a top view showing a state in which an installment operation of the small-diameter disk is completed;

FIG. 22 is a view showing a positional relationship of the slide cam member, the centering member, and the trigger lever relative to the large-diameter disk conveyed to the replayable position, and a positional relationship of the slide cam member, the centering member, and the trigger lever relative to the small-diameter disk conveyed to the replayable position;

FIG. 23 is a perspective view of the slide cam member;

FIG. 26A is a perspective view showing a positional relationship between the intermediate chassis and the pair of slide cam members when the turntable is raised;

FIG. 26B is another perspective view showing a positional relationship between the intermediate chassis and the pair of slide cam members when the turntable is raised;

FIG. 34 is an exploded perspective view showing a configuration of a clamper, the upper base, and a pair of clamper lifters;

DETAILED DESCRIPTION OF PREFERRED EMBODIMENTS

Figure 1:
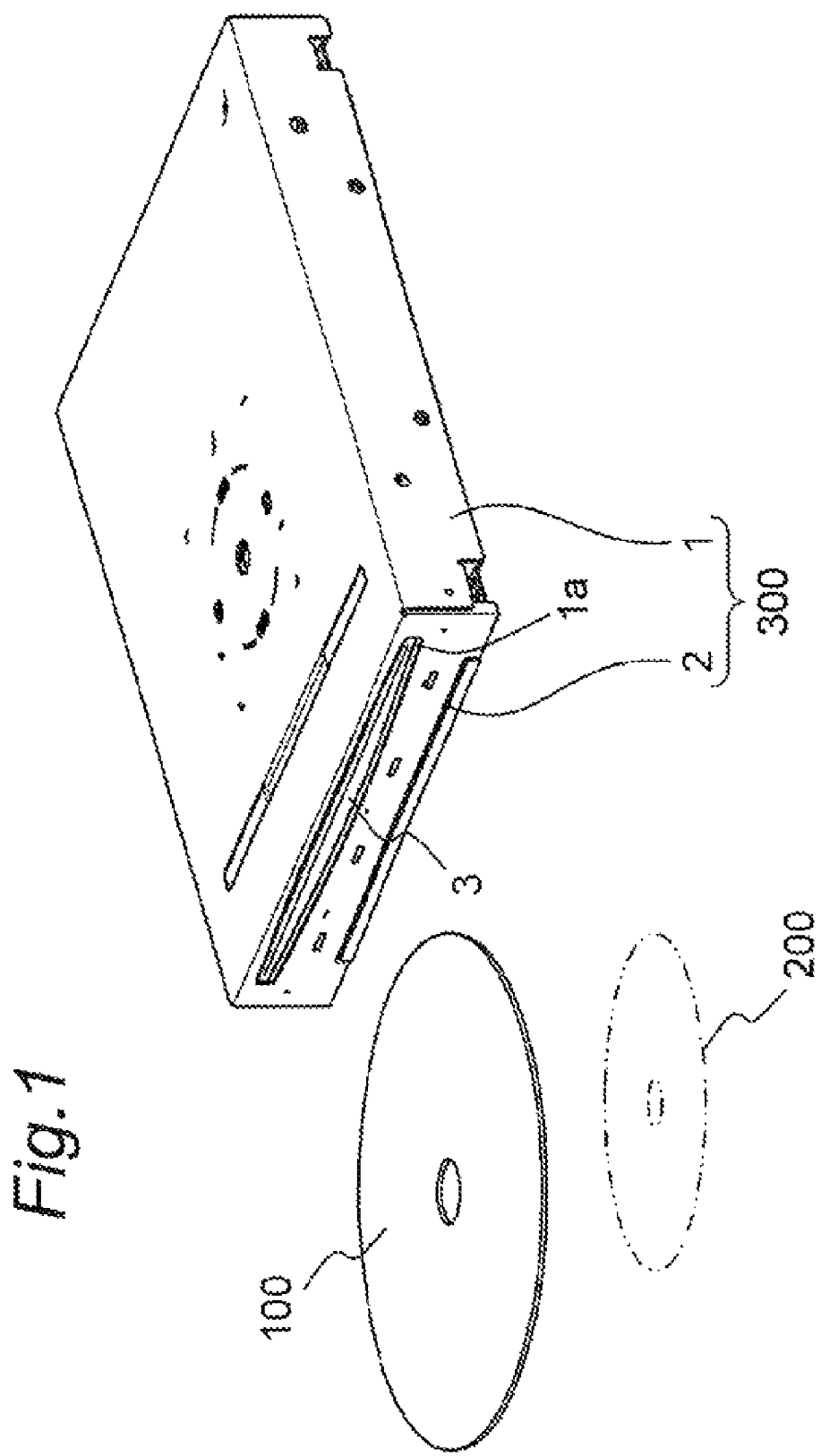
FIG. 1 is a perspective outer appearance view showing a main body of a disk device according to a first embodiment of the present invention and a disk.

According to a first aspect of the present invention, there is provided a disk device which nips a disk conveyed to a replayable position in a casing between a clamper and a turntable so as to bring the disk into a replayable clamping state. A pair of slide cam members detect that the disk is conveyed to the replayable position, thereby starting movement in conjunction with detection. A pair of clamper lifters respectively have clamper support portions supporting the clamper. The pair of clamper lifters is moved in opposite directions to each other in a horizontal direction orthogonal to a thickness direction of the disk device in conjunction with the movement of the pair of slide cam members, so as to differ in timing to start movement in the opposite directions from each other. The clamper support portions of the pair of clamper lifters respectively have inclined surfaces that are contacted with an outer peripheral part of the clamper in accordance with the movement of the pair of clamper lifters in the opposite directions to each other so as to move the clamper in the thickness direction of the disk device.

According to a second aspect of the present invention, the disk device as defined in the first aspect has the inclined surfaces formed so that size in the thickness direction of the disk device is smaller than size in a thickness direction of the clamper.

According to a third aspect of the present invention, the disk device as defined in the first aspect has the clamper lifters arranged slidably relative to a chassis arranged on an upper side of the turntable. An opening portion through which one part of the clamper is passable is formed at a position facing the turntable in the chassis, and a thickness, which is a sum of thickness of part of the clamper lifters excluding cam shafts and the clamper support portions and a thickness of the chassis, is substantially equal to the thickness of the clamper.

According to a fourth aspect of the present invention, the disk device as defined in the third aspect, the chassis has a plurality of regulating pieces which regulate the clamper from moving in the horizontal direction in a peripheral part of the opening portion.

According to a fifth aspect of the present invention, in the disk device as defined in the fourth aspect at least one of the regulating pieces is contacted with an inner surface of the casing so as to form a fixed space permitting the movement of the pair of clamper lifters in the opposite directions between the chassis and the inner surface of the casing.

According to a sixth aspect of the present invention, the disk device as defined in the first aspect has raising and lowering cams which raise and lower the turntable, lifter cams which move the pair of clamper lifters are formed in the pair of slide cam members, and the pair of clamper lifters respectively has cam shafts to be engaged with the lifter cams.

According to a seventh aspect of the present invention, in the disk device as defined in the sixth aspect in conjunction with a series of movement of the pair of slide cam members, the raising and lowering cams perform an operation which raises and lowers the turntable, and the lifter cams perform an operation which moves the pair of clamper lifters in the opposite directions to each other.

Before the description of the present invention proceeds, it is noted that like parts are designated by like reference numerals throughout the accompanying drawings.

Hereinafter, embodiments of the present invention will be described with reference to the drawings.

First Embodiment

Figure 2:
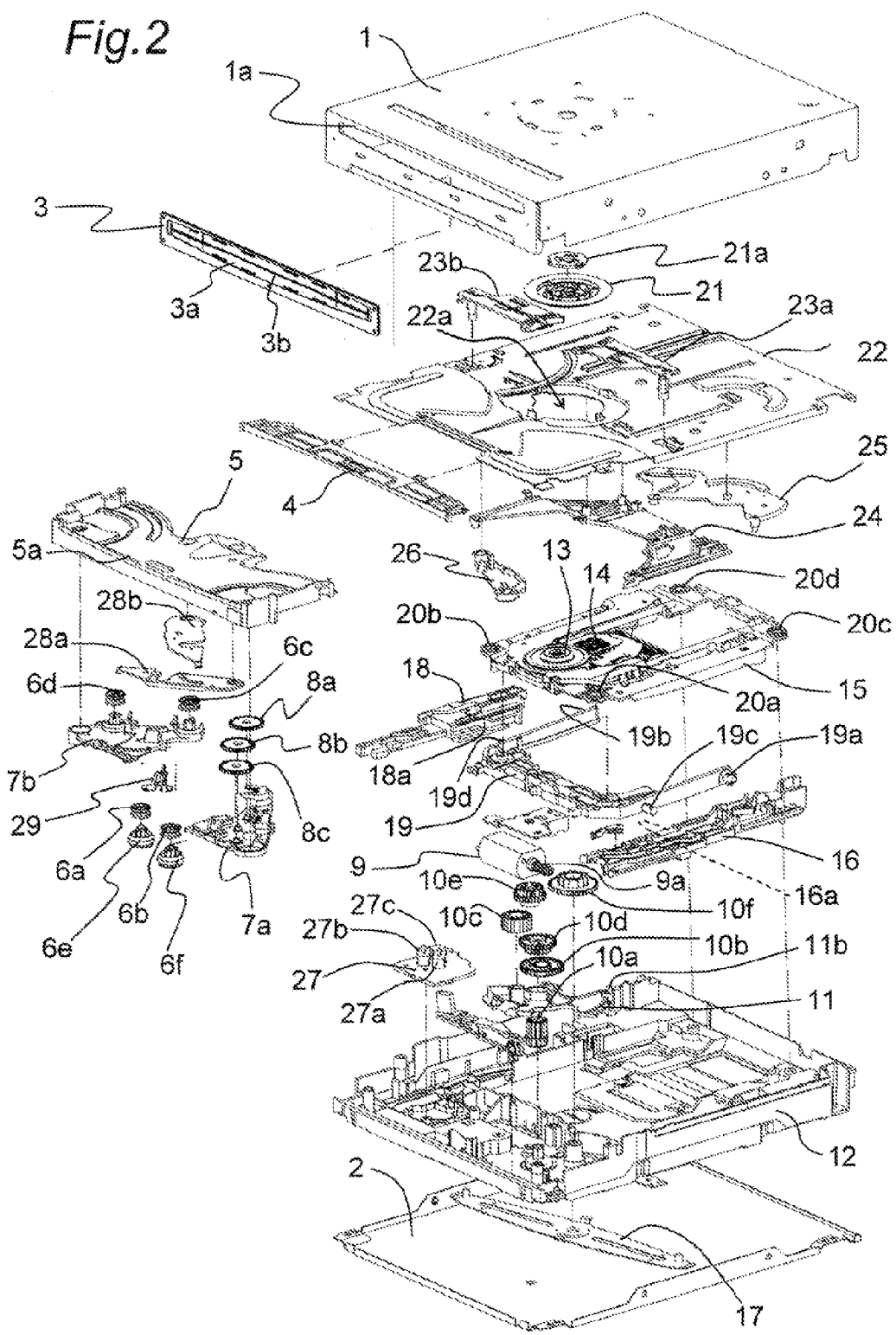
FIG. 2 is an exploded perspective view of the disk device of FIG. 1.
Figure 3:
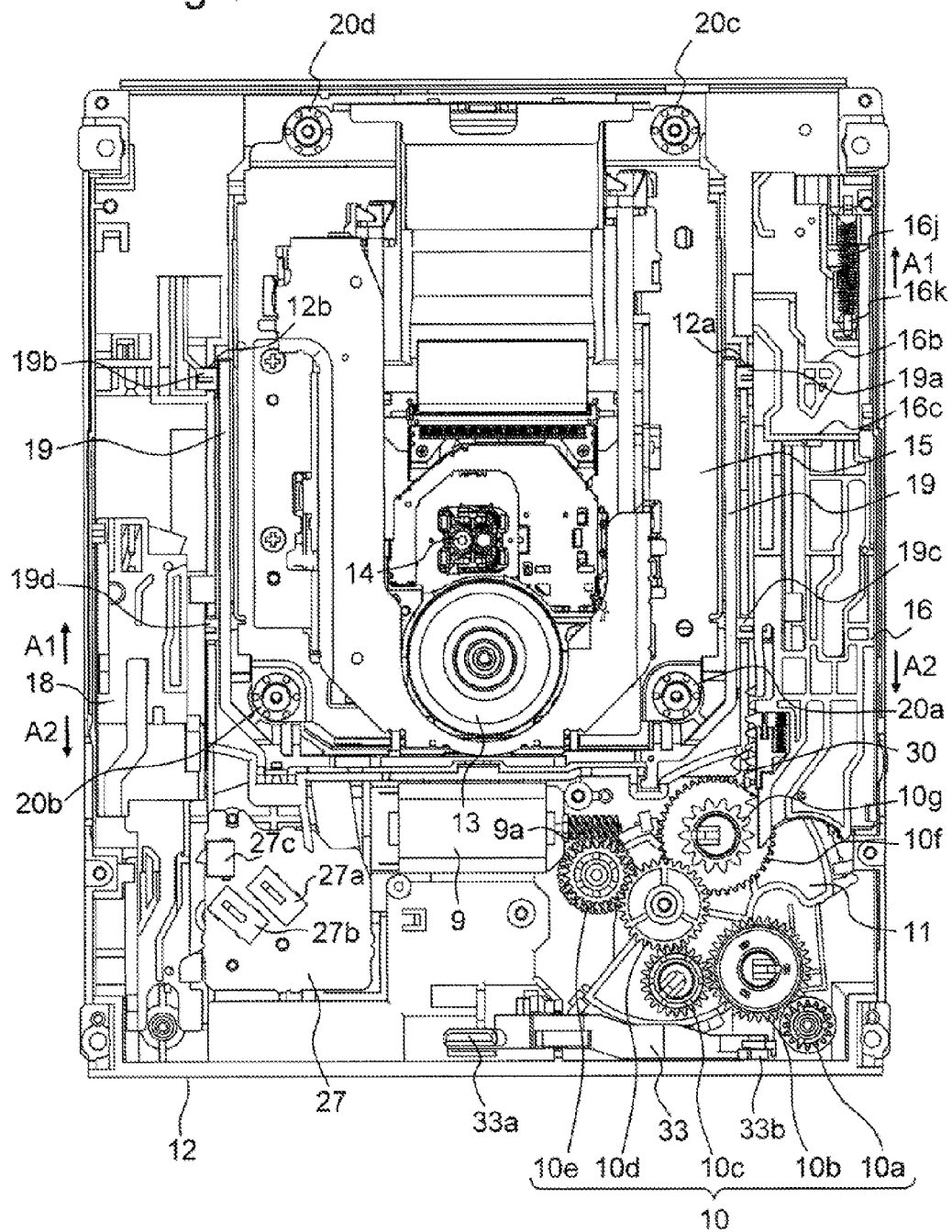
FIG. 3 is a top view showing attachment states of parts to be attached to a mechanical chassis.

Hereinafter, a disk device according to a first embodiment of the present invention will be described. FIG. 1 is a perspective outer appearance view showing the disk device according to the first embodiment and a disk. FIG. 2 is an exploded perspective view of the disk device of FIG. 1. FIG. 3 is a top view showing attachment states of parts to be attached to a mechanical chassis provided in the disk device of FIG. 1. For convenience, the upper side of FIG. 2 indicates the upper side of the disk device, and the lower side of FIG. 2 indicates the lower side of the disk device. However, the present invention is not limited thereto. For example, the disk device may be tilted by 90°. That is, the disk device is not limited to being horizontally arranged as shown in FIG. 1 but may be arranged perpendicularly or the like.

In FIG. 1, the disk device is provided with an upper cover 1 and a lower cover 2 forming a casing 300 serving as an outer shell of the device. An opening portion 1a for disk insertion and ejection is provided in a front surface of the upper cover 1. The opening portion 1a is closed by an anti-dust cover 3. The anti-dust cover 3 is provided with an elastic sheet 3a made of felt or the like. A slit 3b through which a large-diameter disk 100 and a small-diameter disk 200 can pass is formed substantially in a center (at a position facing the opening portion 1a) of the elastic sheet. A front end of the large-diameter disk 100 or the small-diameter disk 200 is inserted into the casing 300 through the slit 3b and the opening portion 1a while elastically deforming the anti-dust cover 3, so that a disk conveyance mechanism arranged in the casing 300 and described later is driven and the large-diameter disk 100 or the small-diameter disk 200 is conveyed to a replayable position. The large-diameter disk 100 indicates for example a disk having a standard diameter of 12 cm. The small-diameter disk 200 indicates for example a disk having a standard diameter of 8 cm. Hereinafter, when matters regarding both the large-diameter disk and the small-diameter disk are described and there is no particular need for distinguishing those disks, each of those disks will be referred to as the "disk".

An upper guide 4 for guiding the upper side of the disk and a roller base 5 for guiding the lower side of the disk with a guide portion 5a are provided in the vicinity of the opening portion 1a inside the casing 300. The roller base 5 rotatably retains a pair of roller arms 7a, 7b functioning as a guide and a drive force transmission portion for conveying the disk into the casing 300 (refer to FIG. 4). A pair of rubber rollers 6a, 6b is rotatably provided to the roller arm 7a. A pair of rubber rollers 6c, 6d is fixed to the roller arm 7b. The rubber roller 6a is integrated with a roller gear 6e (refer to FIG. 2). The rubber roller 6b is integrated with a roller gear 6f.

Figure 7:
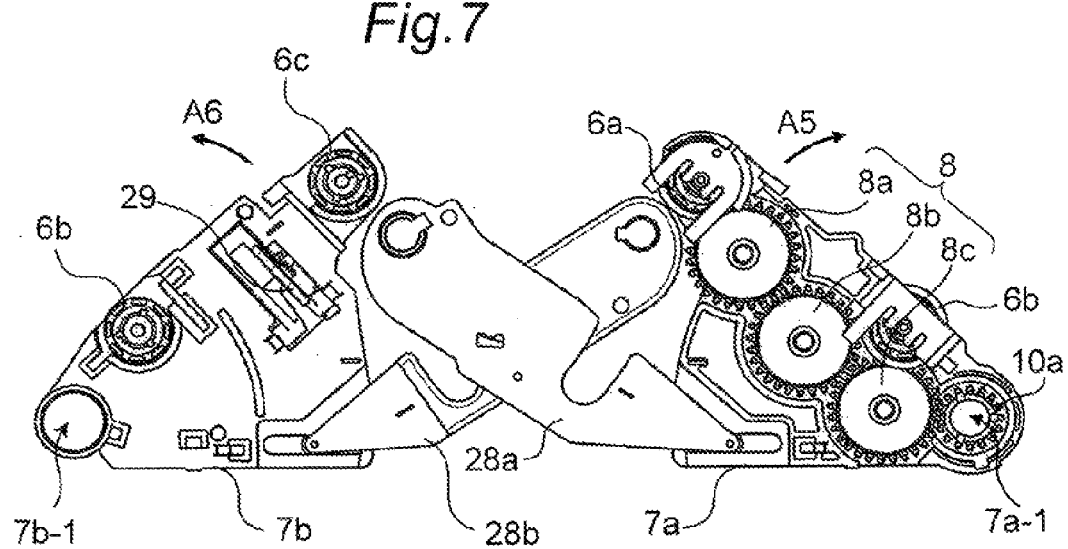
FIG. 7 is a top view showing an attachment state of a pair of roller arms and a pair of link arms.

A gear row 8 formed by gears 8a to 8c is provided to the roller arm 7a (refer to FIG. 7). The gear 8c is meshed with a gear 10a in a gear row 10 formed by gears 10a to 10e shown in FIG. 3. The gear 10e is meshed with a worm gear 9a provided in a motor 9 serving as one example of a drive source. Accordingly, drive force of the motor 9 is transmitted to the gear row 8 via the worm gear 9a, the gears 10e, 10d, 10c, 10b, and 10a in the gear row 10. Since a gear 10f is meshed with a lower portion of the gear 10d, the drive force is transmitted at the same time, and a pinion 10g is coaxially integrated with this gear 10f. The pinion 10g is capable of being meshed with a rack 30 provided to a slide cam member 16 to be described later. However, in an initial state in which the disk is not inserted, the pinion 10g is not meshed with the rack 30. The gear 10c is rotatably and axially supported on a clutch plate 11. The clutch plate 11 is rotatably provided with the up and down direction (also referred to as the thickness direction) as a rotation axis thereof. As described later, rotation of the clutch plate 11 is performed by sliding of the slide cam member 16 in an arrow A2 direction. By the rotation of the clutch plate 11, the gear 10c moves, meshing with the gear 10b is released, and the drive force is transmitted only to the gear 10f and the coaxial pinion 10g. The roller base 5, the gear row 8, the motor 9, and the gear row 10 are rotatably or slidably retained on the mechanical chassis 12 arranged in the casing 300 according to need.

As shown in FIG. 2, a turntable 13 on which the disk is mounted and a traverse base 15 having an optical pickup 14 are arranged inside the casing 300. The turntable 13 is integrated with a spindle motor (not shown) for generating rotation force to rotate the disk. The traverse base 15 is rotatable in the up and down direction and floated and supported on the mechanical chassis 12 with fixed elasticity. By rotation of the traverse base 15, the disk conveyed to the replayable position can be installed onto the turntable 13.

As shown in FIG. 3, on the right side of the mechanical chassis 12, the slide cam member 16 is provided slidably in an arrow A1 or A2 direction. On the left side of the mechanical chassis 12, a slide cam member 18 is provided slidably in the arrow A1 or A2 direction. The slide cam member 16 and the slide cam member 18 are coupled by a link arm 17 (refer to FIG. 2) which is rotatably supported on a lower part of the mechanical chassis 12, and formed to slide in the opposite directions to each other by rotation of the link arm 17. An intermediate chassis 19 for supporting the traverse base 15 is axially supported by pins 19a, 19b and thus rotatably provided in the mechanical chassis 12. Pins 19c, 19d to be engaged with raising and lowering cams 16a, 18a (refer to FIG. 2) formed to the slide cam members 16, 18 are provided to the intermediate chassis 19. The slide cam members 16, 18 slide in the opposite directions to each other, so that the pins 19c, 19d move along the raising and lowering cams 16a, 18a and thus are raised or lowered, and the intermediate chassis 19 is rotated taking the pins 19a, 19b as a rotation axis.

A front part of the traverse base 15 (on the side of the opening portion 1a) is fixed to a front part of the intermediate chassis 19 at one point on the left side and at one point on the right side via floating rubbers 20a, 20b. A rear part of the traverse base 15 is floated and supported on the mechanical chassis 12 via floating rubbers 20c, 20d. The intermediate chassis 19 is rotated taking the pins 19a, 19b as the rotation axis, so that the traverse base 15 is rotated taking the floating rubbers 20d, 20c as a rotation axis. In accordance with this rotating operation of the traverse base 15, the turntable 13 is raised or lowered.

Above the turntable 13, an upper base 22 serving as one example of a chassis is arranged so as to cover an upper part of the traverse base 15. An opening portion 22a is provided in the upper base 22 at a position facing the turntable 13. To the upper base 22, a pair of facing clamper lifters 23a, 23b sandwiching the opening portion 22a is provided slidably in the direction in which the clamper lifters are brought close to or away from each other. Above the turntable 13, a clamper 21 for clamping the disk onto the turntable 13 is provided.

When the pair of clamper lifters 23a, 23b is placed close to each other, the clamper 21 is supported on ends of the clamper lifters 23a, 23b. At this time, the clamper 21 is in a non-contact state with the disk mounted on the turntable 13. When the pair of clamper lifters 23a, 23b moves in the direction in which the clamper lifters are brought away from each other from this state, the clamper 21 moves close to the turntable 13 through the opening portion 22a.

A metal yoke 21a is provided in the clamper 21. A magnet provided in the turntable 13 attracts the metal yoke 21a with magnetic force in a state that the disk is mounted on the turntable 13, so that the disk is nipped between the clamper 21 and the turntable 13. Thereby, the disk is installed onto the turntable 13 and brought into a replayable clamping state. When the pair of clamper lifters 23a, 23b moves in the direction in which the clamper lifters are brought close to each other from this clamping state, the clamper 21 pressed by the pair of clamper lifters 23a, 23b due to the movement moves away from the turntable 13 against the magnetic force. Thereby, the clamping state is cancelled.

A centering member 24 for centering the disk toward the replayable position is slidably provided on a lower surface of the upper base 22. A trigger lever 25 serving as one example of a trigger member rotated by being contacted with and pressed by the disk conveyed to the replayable position is rotatably provided on the lower surface of the upper base 22 (refer to FIGS. 9 and 10). A guide lever 26 for stably retaining the disk inserted into the casing 300 between the turntable 13 and the clamper 21 is rotatably provided on the lower surface of the upper base 22. The upper base 22 is fixed to the mechanical chassis 12. The mechanical chassis 12 is nipped between the upper cover 1 and the lower cover 2 and thus fixed.

A substrate 27 onto which detection switches 27a to 27c are disposed is attached to the mechanical chassis 12 (refer to FIG. 3). The detection switch 27a detects the disk inserted through the opening portion 1a. As shown in FIG. 7, the detection switch 27a is operated by a disk detection lever 29 provided to the roller arm 7b. The detection switch 27b detects that loading is finished at the time of the ejection of the disk. The detection switch 27b is operated by a lower surface of the roller arm 7b rotating at the time of inserting and ejecting the disk. The detection switch 27c detects that the disk is conveyed to the replayable position and installment thereof is completed. The detection switch 27c is operated by the slide cam member 18. The substrate 27 is provided at a position facing the roller arm 7b attached to the roller base 5.

Figure 8A:
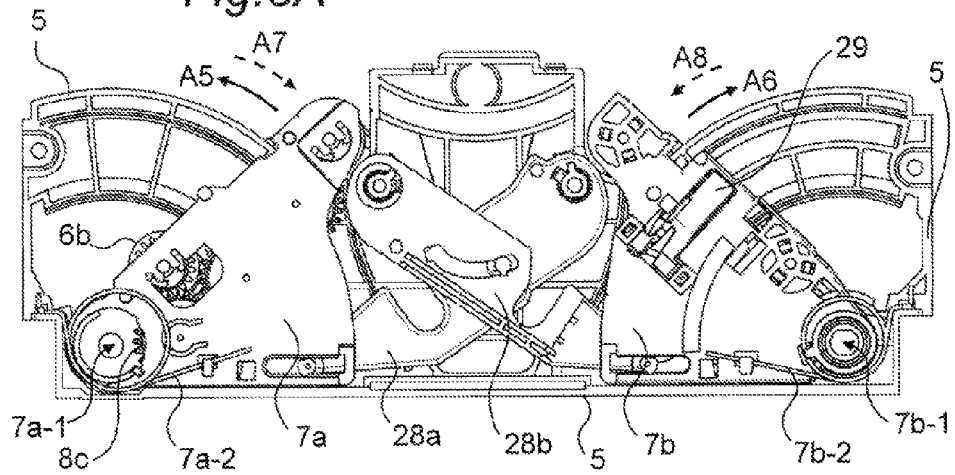
FIG. 8A is a bottom view showing a state in which the pair of roller arms is rotated in the direction in which the roller arms are brought close to each other.
Figure 8B:
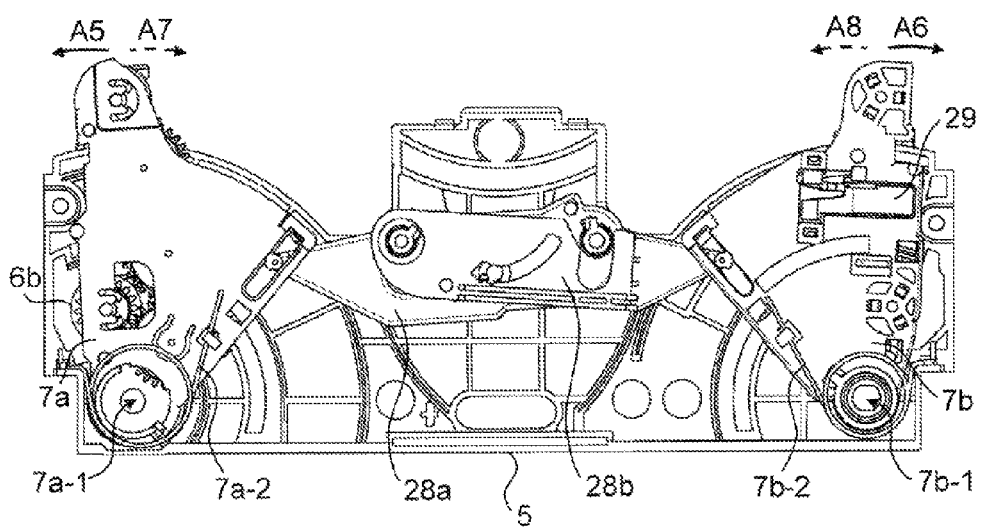
FIG. 8B is a bottom view showing a state in which the pair of roller arms is rotated in the direction in which the roller arms are brought away from each other.

As shown in FIGS. 7, 8A, and 8B, link arms 28a, 28b are rotatably provided to the roller base 5. The link arms 28a, 28b are engaged with the roller arms 7a, 7b so as to rotate the roller arms 7a, 7b in synchronization with each other. The roller arm 7a is provided rotatably in an arrow A5 direction and an arrow A7 direction about a rotation shaft 7a-1. This roller arm 7a is biased in the arrow A7 direction by a torsion coil spring 7a-2. The roller arm 7b is provided rotatably in an arrow A6 direction and an arrow A8 direction about a rotation shaft 7b-1. This roller arm 7b is biased in the arrow A8 direction by a torsion coil spring 7b-2.

It is noted that in the first embodiment, the disk conveyance mechanism for conveying the disk to the replayable position is formed by the gear row 10, the gear row 8, the rubber rollers 6a to 6d, the roller gears 6e, 6f, the roller arms 7a, 7b, and the link arms 28a, 28b. In the first embodiment, a disk installment mechanism for installing the disk conveyed to the replayable position onto the turntable 13 so as to bring the disk into the replayable clamping state is formed by the gears 10d to 10f, the pinion 10g, the slide cam member 16, the link arm 17, the slide cam member 18, the intermediate chassis 19, the traverse base 15, the floating rubbers 20a to 20d, the clamper 21, the upper base 22, and the clamper lifters 23a, 23b. In the first embodiment of the present invention, a transmission route switching mechanism for switching a transmission route of the drive force so that the drive force generated by the drive source is transmitted only to one of the disk conveyance mechanism and the disk installment mechanism is formed by the clutch plate 11, the slide cam member 16 for driving this clutch plate, and the trigger lever 25. The motor 9 serving as the drive source and the worm gear 9a serve as common constituent parts relating to drive of the mechanisms, and there are some parts such as the gear row 10 part of which is used for the drive of a plurality of mechanisms. It is noted that the disk conveyance mechanism, the disk installment mechanism, and the transmission route switching mechanism of the present invention are not limited to the above described configurations, needless to say.

Next, with reference to FIG. 3, the configuration of the disk device will be described further in detail. FIG. 3 is the top view showing a state that parts excluding those parts relating to the upper cover 1, the lower cover 2, the roller base 5 and parts relating to the upper base 22 are attached to the mechanical chassis 12 in the entire configuration shown in FIG. 2.

As shown in FIG. 3, the turntable 13 and the optical pickup 14 are arranged on the traverse base 15 substantially in a center of the disk device. The intermediate chassis 19 having a substantially U shape is arranged so as to surround the front part and both side parts of the traverse base 15. The slide cam member 16 is arranged on the right side of the intermediate chassis 19. The slide cam member 18 is arranged on the left side of the intermediate chassis 19. The slide cam member 16 and the slide cam member 18 are arranged slidably in the front and rear direction (the arrow A1 and A2 directions) which is the same as the disk conveying direction. In the initial state that the disk is not conveyed, the slide cam member 16 is biased in the arrow A1 direction by a spring 16j extended between the mechanical chassis 12 and the slide cam member 16. The slide cam member 18 connected to the slide cam member 16 via the link arm 17 is biased in the arrow A2 direction. The pins 19c, 19d provided at both ends of the front part of the intermediate chassis 19 are slidably engaged with the raising and lowering cams 16a, 18a formed to the slide cam members 16, 18 (refer to FIG. 2). The pins 19a, 19b provided at both ends of a rear part of the intermediate chassis 19 are rotatably retained on bearing portions 12a, 12b formed to the mechanical chassis 12. With this configuration, the slide cam members 16, 18 slide in opposite directions to each other, so that the intermediate chassis 19 is rotated using the pins 19a, 19b as the rotation axis, and the front part of the intermediate chassis 19 is raised or lowered.

Sliding of the slide cam members 16, 18 in the opposite directions to each other is performed by transmitting the drive force of the motor 9 to the pinion 10g via the worm gear 9a, and the gears 10e, 10d, 10f in a state that the rack 30 of the slide cam member 16 and the pinion 10g are meshed with each other. The trigger lever 25 is rotated by being pressed by the disk conveyed to the replayable position on the turntable 13, and the slide cam member 16 is pressed by the trigger lever 25 and thus slightly slides in the arrow A2 direction, so that the pinion 10g is meshed with the rack 30.

That is, when the disk is conveyed to the replayable position with the drive of the motor 9, by an action of the trigger lever 25 and transmission switching of the drive force of the motor 9, the slide cam members 16, 18 slide in the opposite directions to each other. Thereby, the intermediate chassis 19 and the traverse base 15 are raised, and the disk is installed onto the turntable 13 and thus brought into the replayable clamping state.

Figure 4:
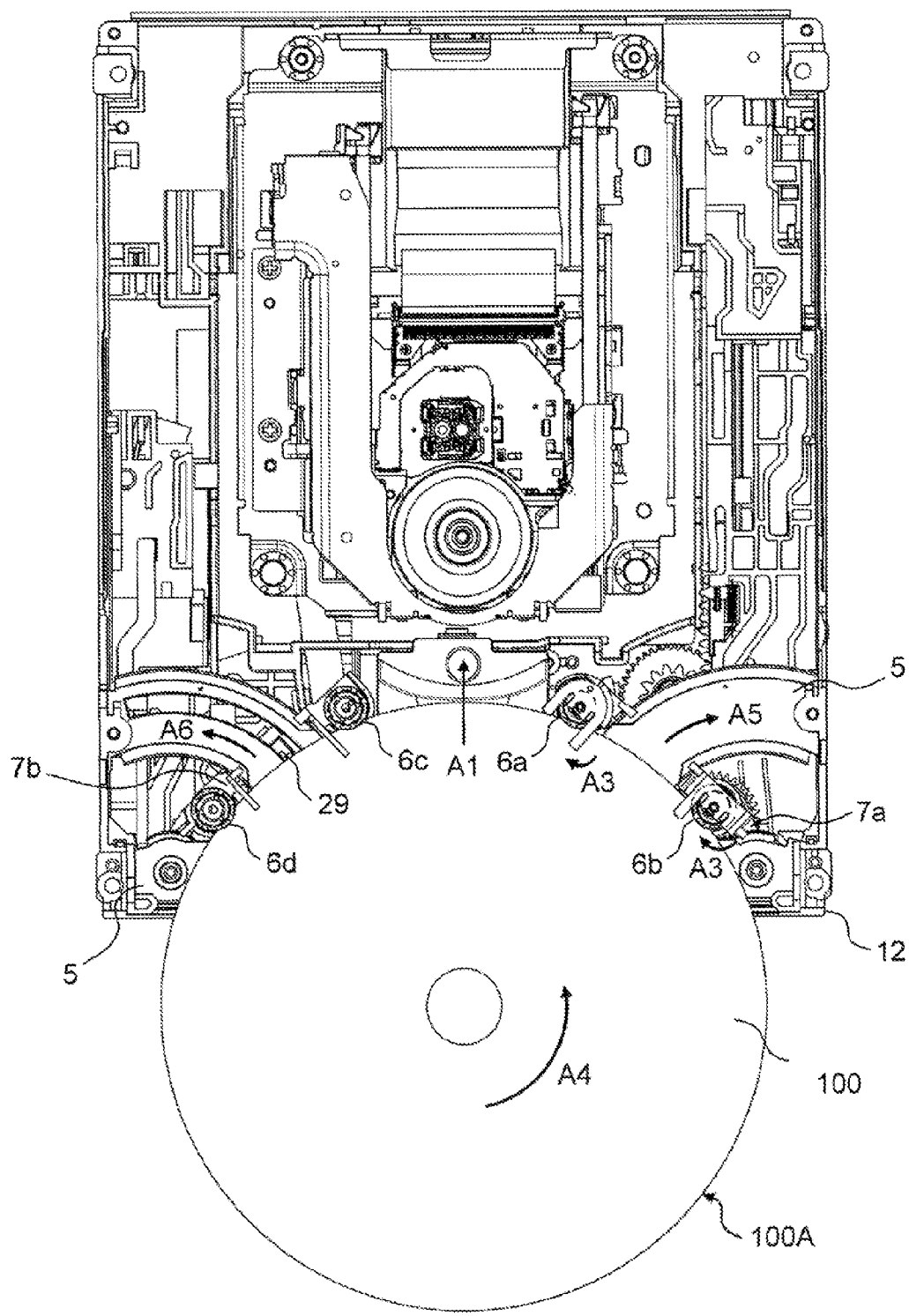
FIG. 4 is a top view showing a state immediately after a large-diameter disk is inserted into the disk device of FIG. 1.
Figure 5:
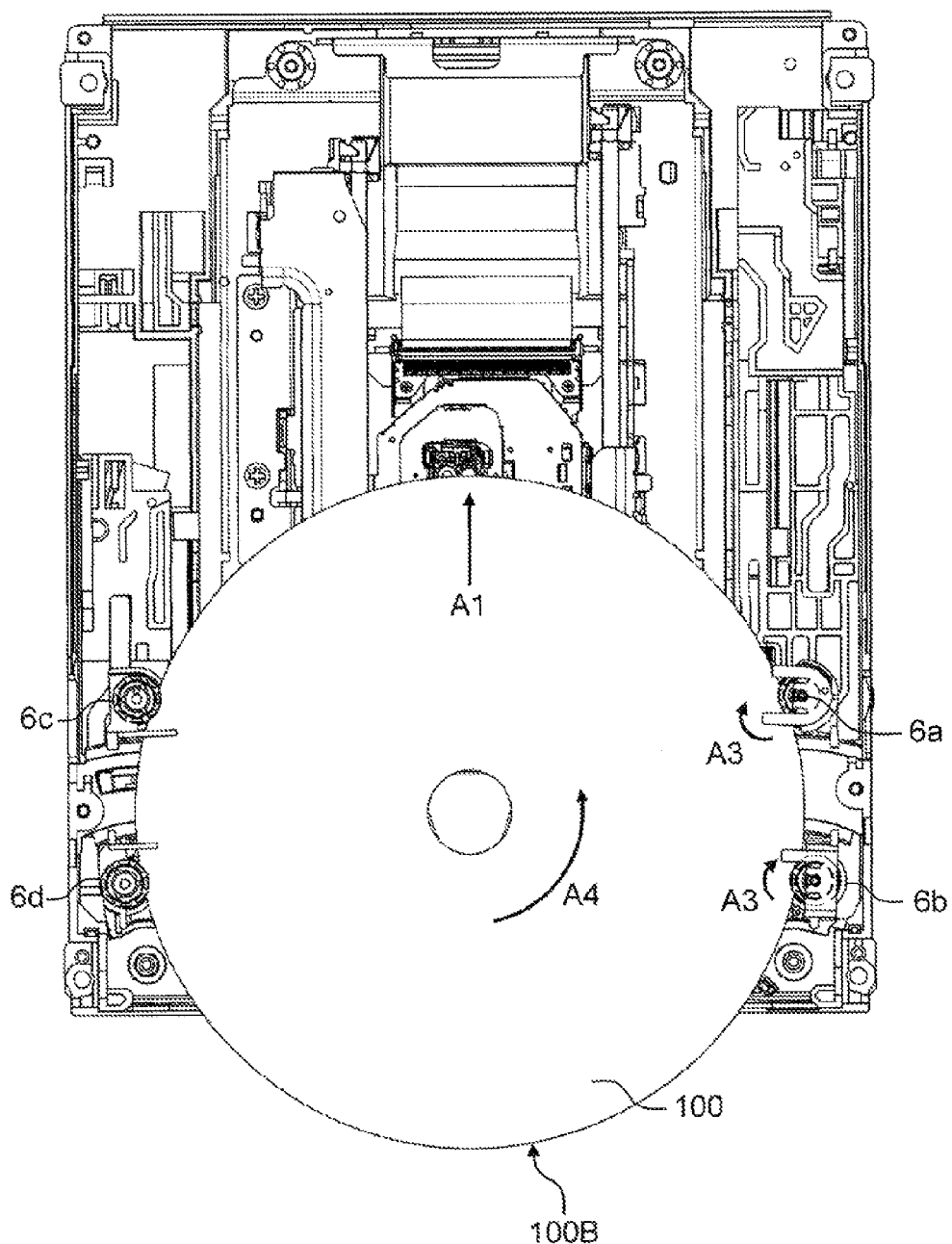
FIG. 5 is a top view showing a state in which the large-diameter disk inserted into the disk device of FIG. 1 is being conveyed to a replayable position.
Figure 6:
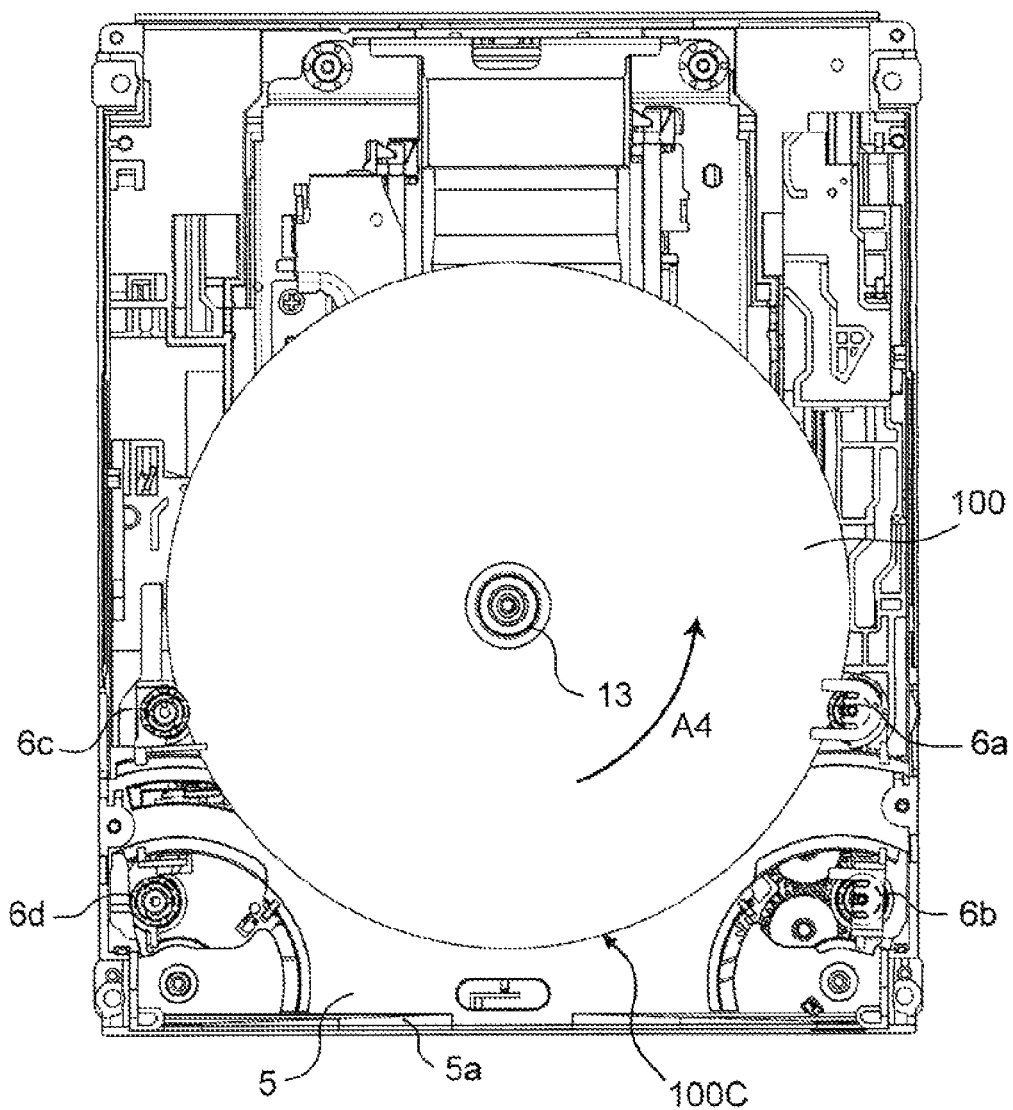
FIG. 6 is a top view showing a state in which the large-diameter disk inserted into the disk device of FIG. 1 is already conveyed to the replayable position.

Next described with reference to FIGS. 4 to 8B is a conveyance operation of the large-diameter disk 100 for conveying the large-diameter disk 100 inserted into the casing 300 to the replayable position. FIGS. 4 to 6 are top views showing conveying states of the large-diameter disk. FIG. 7 is a top view showing an attachment state of the pair of roller arms 7a, 7b and the pair of link arms 28a, 28b. FIGS. 8A and 8B are bottom views showing a state that the pair of roller arms 7a, 7b is rotated in the direction in which the roller arms are brought close to or away from each other.

FIG. 4 shows a state immediately after the large-diameter disk 100 is inserted into the casing 300. At this time, the large-diameter disk 100 is contacted with the pair of rubber rollers 6a, 6b on the right side and the pair of rubber rollers 6c, 6d on the left side. At this time, the disk detection lever 29 provided to the roller arm 7b is rotated by being pressed by the large-diameter disk 100, so that the detection switch 27a is operated so as to detect that the large-diameter disk 100 is inserted through the opening portion 1a. When the detection switch 27a is operated, the motor 9 starts driving. The drive force of the motor 9 is transmitted to the rubber rollers 6a, 6b via the gear row 10 and the gear row 8. Thereby, the rubber rollers 6a, 6b are rotated in an arrow A3 direction, and by rotation drive force and friction force of the rubber roller 6b and friction force of the non-rotated rubber roller 6d facing the rubber roller 6b while sandwiching the large-diameter disk 100, the large-diameter disk 100 is rotated in an arrow A4 direction taking the rubber roller 6d (in more detail, a contact point with the large-diameter disk 100) as a rotation axis. By this rotation in the arrow A4 direction, the large-diameter disk 100 is conveyed in the arrow A1 direction.

When the large-diameter disk 100 is conveyed in the arrow A1 direction from the state shown in FIG. 4, the large-diameter disk 100 extends a gap between the rubber roller 6b and the rubber roller 6d. Thereby, against bias force of the torsion coil springs 7a-2, 7b-2 described with reference to FIG. 8, the roller arm 7a is rotated in the arrow A5 direction, and the roller arm 7b is rotated in the arrow A6 direction. That is, the pair of roller arms 7a, 7b is rotated in the directions in which the roller arms are brought away from each other (opening directions). By the rotation of the roller arms 7a, 7b, the rubber rollers 6a, 6c are once brought away from a peripheral part of the disk 100. After that, when the large-diameter disk 100 is further conveyed in the arrow A1 direction and a center part of the disk 100 having the maximum diameter in the left and right direction of the disk 100 passes through the gap between the rubber rollers 6b, 6d, the roller arm 7a is rotated in the arrow A7 direction, and the roller arm 7b is rotated in the arrow A8 direction by the bias force of the torsion coil springs 7a-2, 7b-2 described with reference to FIG. 8. That is, the pair of roller arms 7a, 7b is rotated in the directions in which the roller arms are brought close to each other (closing directions). Thereby, the rubber rollers 6a, 6c are contacted with the peripheral part of the disk 100 again and brought into the state shown in FIG. 5.

FIG. 5 shows a state in which all the rubber rollers 6a to 6d are contacted with the large-diameter disk 100. FIG. 6 shows a state in which the large-diameter disk 100 is conveyed to the replayable position. The large-diameter disk 100 passes through a disk position 100B shown in FIG. 5 in a process of conveyance from a disk position 100A immediately after insertion into the casing 300 (refer to FIG. 4) to a disk position 100C serving as the replayable position (refer to FIG. 6). At this disk position 100B, rotation force for the large-diameter disk 100 is switched to be transmitted from the rubber rollers 6a, 6c instead of the rubber rollers 6b, 6d. That is, from this disk position 100B to the disk position 100C, the large-diameter disk 100 is rotated in the arrow A4 direction taking the rubber roller 6c as a rotation center by rotation drive force of the rubber roller 6a. By this rotation in the arrow A4 direction taking the rubber roller 6c as the rotation center, the large-diameter disk 100 is further conveyed in the arrow A1 direction. The large-diameter disk 100 is conveyed to the disk position 100C shown in FIG. 6. At this position, the conveyance operation of the disk 100 is finished. This conveyance is detected, so that an installment operation for clamping the disk 100 onto the turntable 13 to be described later is performed. When the detection switch 27c detects that the installment operation is completed, the motor 9 stops driving. Thereby, the conveyance operation and the installment operation of the large-diameter disk 100 are completed.

Next, an ejection operation of the large-diameter disk 100 will be described. It is noted that the large-diameter disk 100 is placed at the disk position 100C shown in FIG. 6, the clamping state is cancelled, and the large-diameter disk is nipped by the rubber rollers 6a, 6c.

Firstly, the motor 9 is already reversely driven for canceling the clamping state, and the rubber rollers 6a, 6b are rotated in the opposite direction to that of the conveyance operation of the large-diameter disk 100. Thereby, the large-diameter disk 100 is rotated in the opposite direction to the arrow A4 direction taking the rubber roller 6c as the rotation center. By this rotation in the opposite direction to the arrow A4 direction, the large-diameter disk 100 is conveyed in the opposite direction to the arrow A1 direction (that is, the arrow A2 direction).

When the large-diameter disk 100 reaches the disk position 100B shown in FIG. 5 by the conveyance in the opposite direction to the arrow A1 direction, the rotation force of the large-diameter disk 100 is switched to be transmitted from the rubber rollers 6b, 6d instead of the rubber rollers 6a, 6c. Thereby, the large-diameter disk 100 is rotated in the opposite direction to the arrow A4 direction taking the rubber roller 6d as the rotation center. By this rotation in the opposite direction to the arrow A4 direction, the large-diameter disk 100 is further conveyed in the opposite direction to the arrow A1 direction. When the detection switch 27b detects that the large-diameter disk 100 is conveyed to the disk position 100A shown in FIG. 4 by this conveyance in the opposite direction to the arrow A1 direction, the motor 9 stops driving. Thereby, the ejection operation of the large-diameter disk 100 is completed.

It is noted that the large-diameter disk 100 ejected to the disk position 100A shown in FIG. 4 can be taken out by fingers of a user. At this time, with nipping force and friction force of the rubber rollers 6a to 6d as well as elastic force and friction force of the anti-dust cover 3, the large-diameter disk 100 is retained without popping out from the opening portion 1a to the exterior of the casing 300.

Figure 9:
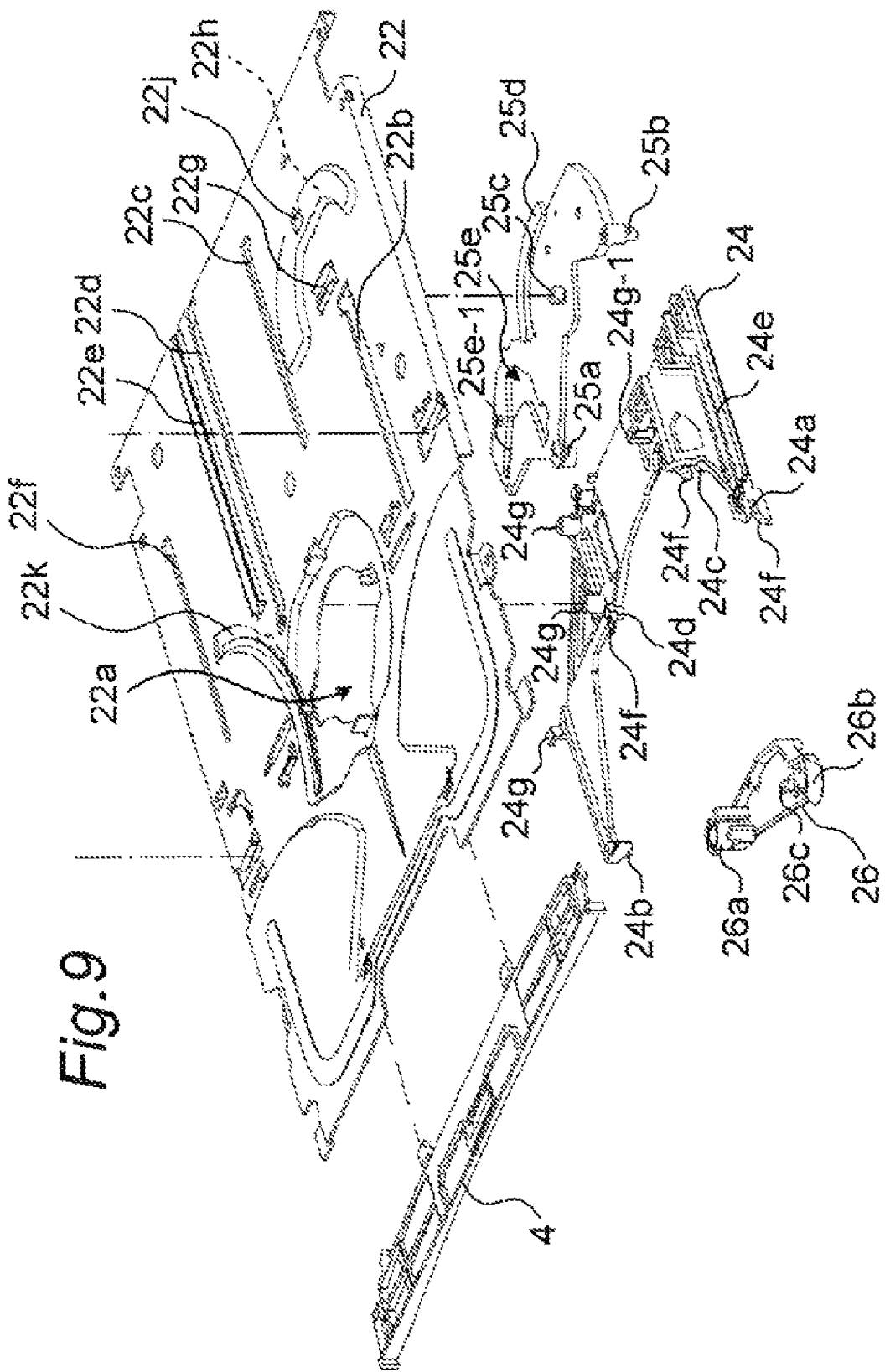
FIG. 9 is an exploded perspective view showing a configuration of parts relating to an upper base.
Figure 10:
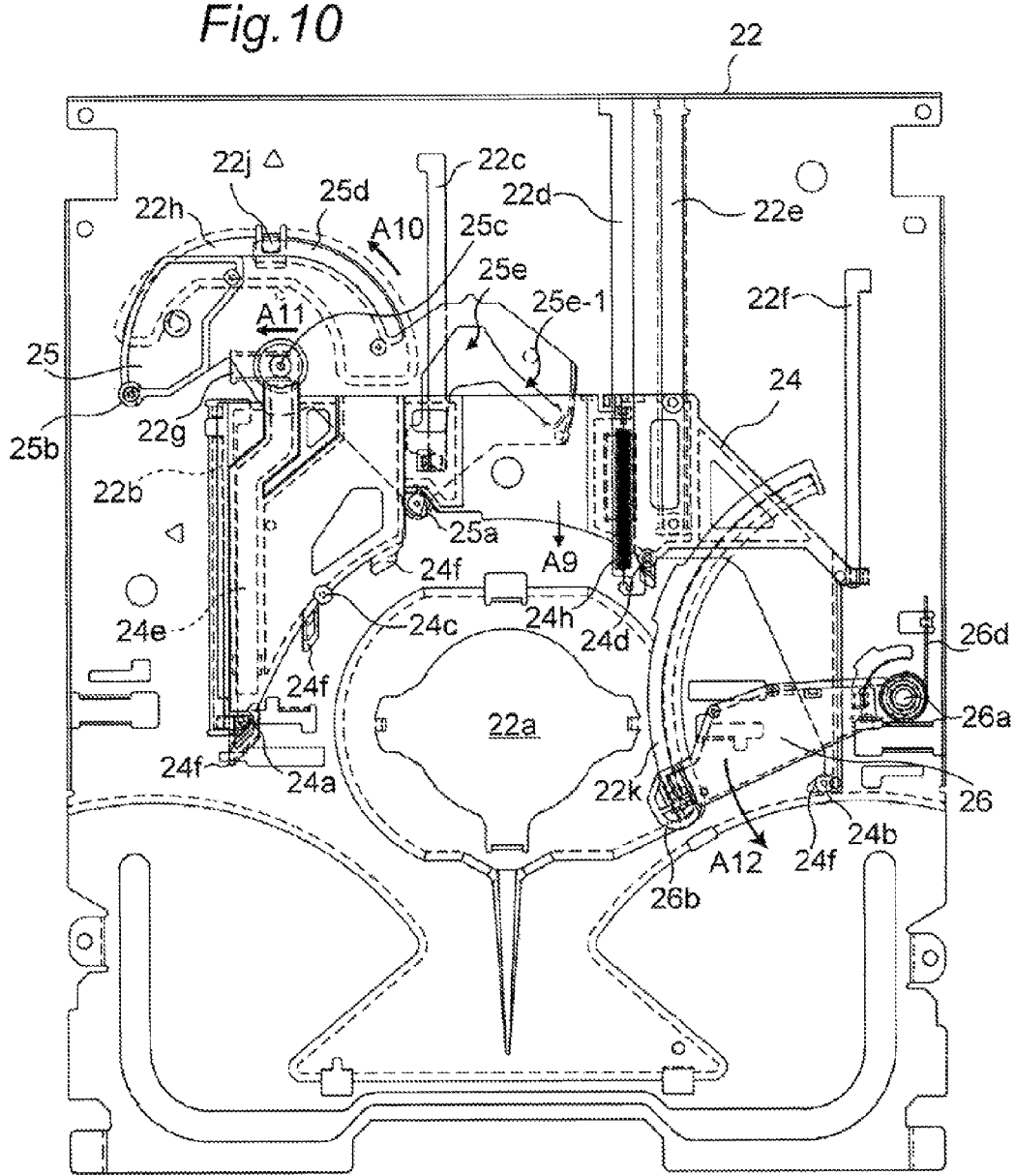
FIG. 10 is a bottom view showing a state in which the parts of FIG. 9 are attached to the upper base.

Next, with reference to FIGS. 9 and 10, configurations of the centering member 24, the trigger lever 25, and the guide lever 26 slidably or rotatably attached on the lower surface of the upper base 22 will be described further in detail. FIG. 9 is an exploded perspective view showing configurations of parts relating to the upper base 22. FIG. 10 is a bottom view showing a state in which the parts shown in FIG. 9 are attached to the upper base 22.

The centering member 24 is provided with positioning contact portions 24a, 24b to be contacted with the large-diameter disk 100 so as to center the large-diameter disk, and positioning contact portions 24c, 24d to be contacted with the small-diameter disk 200 so as to center the small-diameter disk. The centering member 24 is also provided with a guide cam 24e serving as one example of a guide portion to be engaged with the trigger lever 25 so as to rotate the trigger lever 25, and a plurality of position regulating guides 24f for regulating a position of the disk in the thickness direction. The guide cam 24e has a first straight cam portion 24e-1 and a second straight cam portion 24e-3 provided in parallel to the disk conveying direction, and a tilt cam portion 24e-2 provided in a crossing direction to the disk conveying direction to couple the first straight cam portion 24e-1 and the second straight cam portion 24e-3.

The centering member 24 is provided with a plurality of sliding guides 24g such as pins and claw pieces. The sliding guides 24g are engaged with guide holes 22b to 22f formed in the upper base 22, so that the centering member 24 is slidable in the disk conveying direction along the lower surface of the upper base 22. As shown in FIG. 10, the centering member 24 is biased in an arrow A9 direction (disk ejecting direction) by a twist coil spring 24h extended between the centering member and the upper base 22. Thereby, the centering member 24 imparts bias force in the arrow A9 direction to the disk inserted into the casing 300, so as to center the disk.

The trigger lever 25 is rotated by being contacted with the disk conveyed to the replayable position, so as to impart initial sliding to the slide cam member 16. The slide cam member 16 drives the disk installment mechanism by this initial sliding. The trigger lever 25 is provided with a disk contact portion (also referred to as the detection portion) 25a to be contacted with the disk, a slide cam pressing portion 25b to be engaged with the slide cam member 16 so as to press the slide cam member 16 in the arrow A2 direction (refer to FIG. 3), and a rotation shaft portion 25c serving as a rotation center of the trigger lever 25.

The rotation shaft portion 25c of the trigger lever 25 is engaged with an elongated circular axial hole 22g formed in the upper base 22, and also engaged with the guide cam 24e of the centering member 24. Thereby, the trigger lever 25 is rotated in an arrow A10 direction or the opposite direction thereof about a crossing part of the axial hole 22g and the guide cam 24e.

The trigger lever 25 is provided with an arc shape convex portion 25d so that the trigger lever can be rotated while being retained by the upper base 22. The upper base 22 is provided with a concave portion 22h in which the arc shape convex portion 25d is arranged, and an engagement claw portion 22j to be engaged with the arc shape convex portion 25d so that the arc shape convex portion 25d is not disengaged with the concave portion 22h. The concave portion 22h is formed so as to be larger than the arc shape convex portion 25d so that the trigger lever 25 can be rotated even when the rotation shaft portion 25c moves in an arrow A11 direction or the opposite direction thereof in the axial hole 22g.

There is formed in the trigger lever 25 a hole 25e through which a sliding guide 24g-1 serving as one of the plurality of sliding guides 24g of the centering member 24 passes. A link groove 25e-1 is formed in this hole 25e.

The guide lever 26 is provided to retain the disk inserted into the casing 300 at a height between the turntable 13 and the clamper 21. The guide lever 26 is provided with a rotation shaft 26a rotatably and axially supported on the upper base 22, and a positioning guide 26b for retaining the height of the disk.

In order to stabilize a position in the height direction of the guide lever 26 itself, the guide lever 26 is provided with an engagement claw piece 26c to be engaged with an arc shape hole 22k formed in the upper base 22. The guide lever 26 is biased in an arrow A12 direction by a torsion coil spring 26d, and normally retained in the state shown in FIG. 10. The disk inserted into the casing 300 is contacted with the positioning guide 26b and conveyed to the replayable position while rotating the guide lever 26 in the opposite direction to the arrow A12 direction against bias force of the spring 26d.

Next, with reference to FIGS. 11 to 22, the disk conveyance operation and the disk installment operation will be described.

Figure 11:
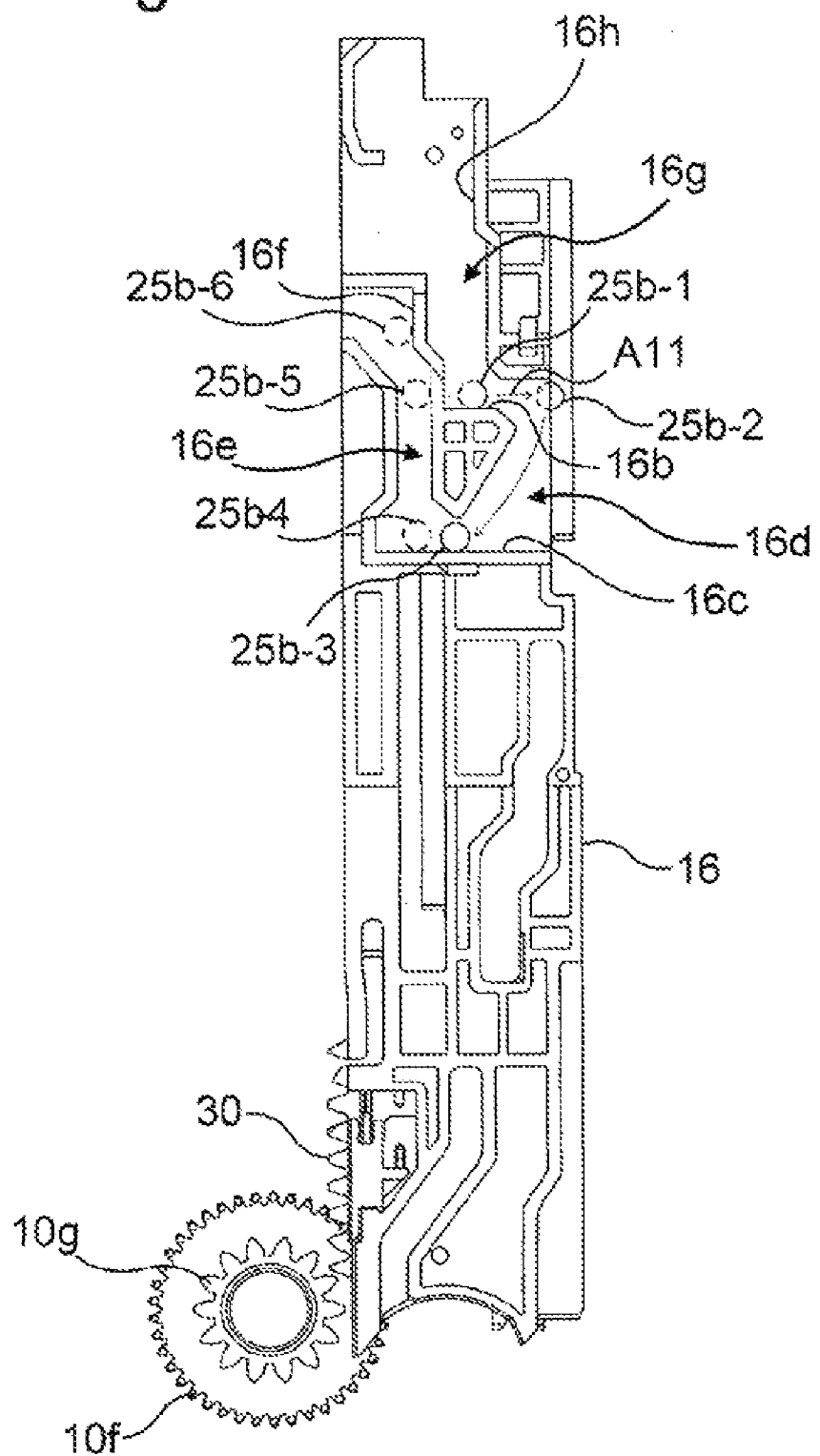
FIG. 11 is a top view showing a relative movement trajectory of a slide cam pressing portion of a trigger lever relative to engagement portions formed in a slide cam member at the time of inserting the large-diameter disk.

Firstly, with reference to FIGS. 11 to 16, operations of the parts in the case where the large-diameter disk 100 is inserted into the casing 300 will be described. FIG. 11 is a top view showing a relative movement trajectory of the slide cam pressing portion 25b of the trigger lever 25 relative to engagement portions formed to the slide cam member 16 at the time of inserting the large-diameter disk. FIGS. 12 to 16 are top views showing positional relationships among the slide cam member 16, the centering member 24, the trigger lever 25, and the guide lever 26 when the large-diameter disk 100 inserted into the casing 300 is conveyed to the replayable position. It is noted that in these figures, portions of the constituent parts are shown as transparent for convenience.

As shown in FIG. 11, the slide cam member 16 is provided with a first engagement portion 16b and a second engagement portion 16c as the engagement portions to which the slide cam pressing portion 25b of the trigger lever 25 is engaged. The first engagement portion 16b is a part to be pressed by the slide cam pressing portion 25b when the trigger lever 25 is rotated by being pressed by the small-diameter disk 200. The second engagement portion 16c is a part to be pressed by the slide cam pressing portion 25b when the trigger lever 25 is rotated by being pressed by the large-diameter disk 100. The slide cam member 16 is provided with cam portions 16d to 16f. The cam portion 16d is formed so as to connect the first engagement portion 16b and the second engagement portion 16c. The cam portion 16d is a part for guiding movement of the slide cam pressing portion 25b from the first engagement portion 16b to the second engagement portion 16c when the large-diameter disk 100 is inserted into the casing 300 and the rotation shaft portion 25c of the trigger lever 25 moves. The cam portion 16e is a part for moving the slide cam pressing portion 25b so as to bring the slide cam pressing portion away from the second engagement portion 16c when the large-diameter disk 100 is installed onto the turntable 13 after being conveyed to the replayable position. The cam portion 16f is a part for bringing the positioning contact portions 24a, 24b and the like of the centering member 24 away from the large-diameter disk 100. The positional relationships between the parts are changed as shown in FIGS. 12 to 16, so that the slide cam pressing portion 25b of the trigger lever 25 follows the trajectory of positions 25b-1 to 25b-6.

When the large-diameter disk 100 is inserted into the casing 300, firstly, the vicinity of the front end of the large-diameter disk 100 is contacted with the positioning guide 26b of the guide lever 26, so that the height in the thickness direction of the large-diameter disk 100 is determined.

Figure 12:
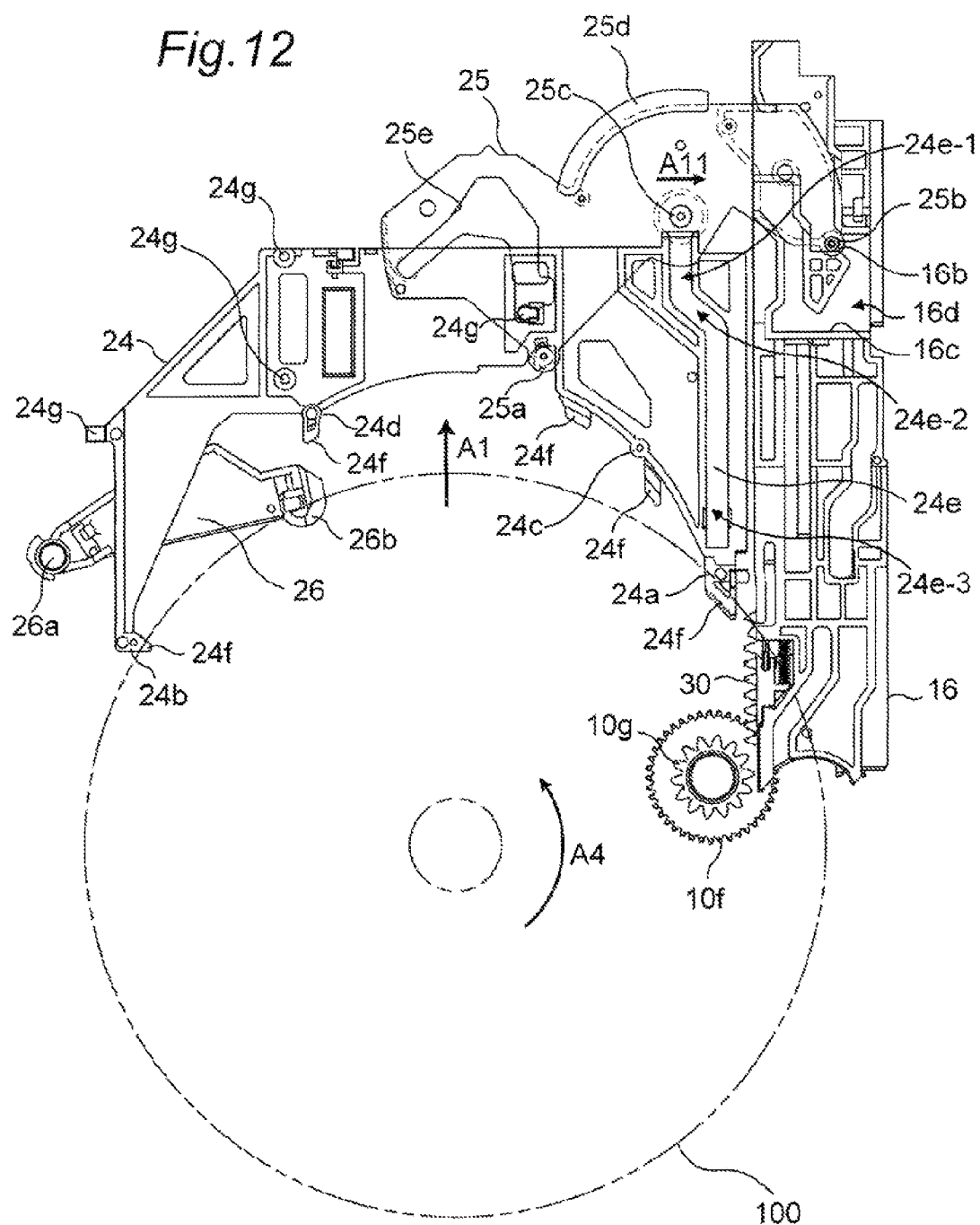
FIG. 12 is a top view showing a state in which the large-diameter disk is contacted with a positioning contact portion of a centering member.

Next, as described with reference to FIG. 4, the large-diameter disk 100 is conveyed in the arrow A1 direction while being rotated in the arrow A4 direction. Thereby, the guide lever 26 is pressed by the large-diameter disk 100 and rotated about the rotation shaft 26a against the bias force of the torsion coil spring 24h, and as shown in FIG. 12, the large-diameter disk 100 is contacted with the positioning contact portions 24a, 24b of the centering member 24. The peripheral part of the large-diameter disk 100 is contacted with both the positioning contact portions 24a, 24b, so that the large-diameter disk 100 is centered. That is, the center of the large-diameter disk 100 is positioned so as to be placed on a straight line parallel to the disk conveying direction in plan view, the straight line running through the center of the turntable 13.

It is noted that in the state shown in FIG. 12, the disk contact portion 25a of the trigger lever 25 is in an initial state in which the disk contact portion is not contacted with the large-diameter disk 100, and the slide cam pressing portion 25b is placed at the position 25b-1 at which the slide cam pressing portion is contacted with the first engagement portion 16b of the slide cam member 16 as shown in FIG. 11. In the state shown in FIG. 12, the rotation shaft portion 25c of the trigger lever 25 is not guided by the guide cam 24e of the centering member 24.

Figure 13:
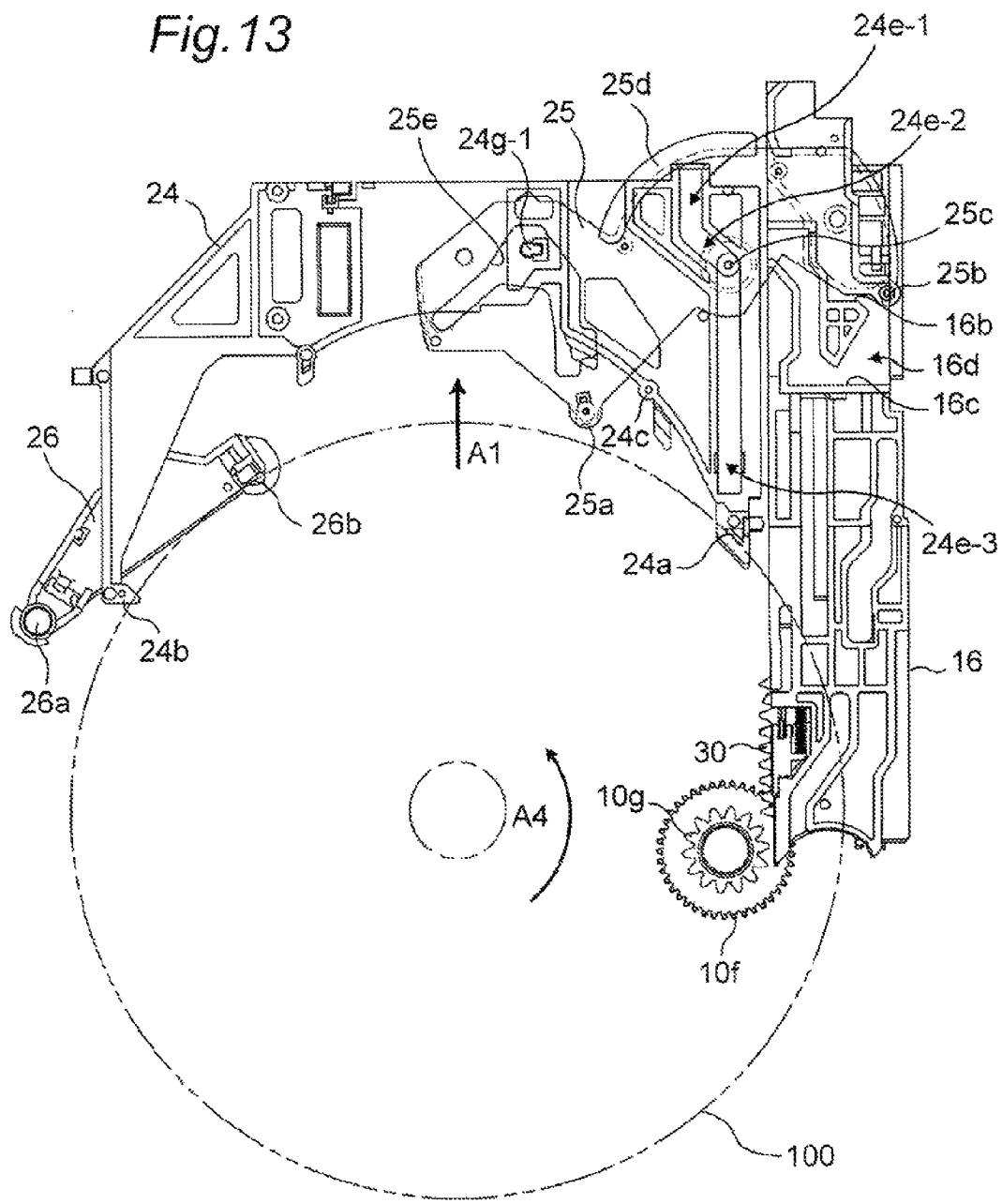
FIG. 13 is a top view showing a state in which, from the state shown in FIG. 12, the trigger lever is pressed by the large-diameter disk and moved at right angle to the disk conveying direction.

When the large-diameter disk 100 is further conveyed in the arrow A1 direction from the state shown in FIG. 12, the large-diameter disk 100 moves the centering member 24 in the arrow A1 direction against the bias force of the twist coil spring 24h, and also rotates the guide lever 26 against the bias force in the arrow A12 direction. Thereby, the rotation shaft portion 25c of the trigger lever 25 is guided by the tilt cam portion 24e-2 after passing through the first straight cam portion 24e-1 of the guide cam 24e. At this time, since movement in the disk conveying direction is regulated by the axial hole 22g (refer to FIGS. 9 and 10), the rotation shaft portion 25c moves in the arrow A11 direction. That is, the entire trigger lever 25 moves in the arrow A11 direction (from a first position to a second position). By this movement in the arrow A11 direction, the rotation shaft portion 25c moves from the tilt cam portion 24e-2 to the second straight cam portion 24e-3 as shown in FIG. 13. At this time, the arc shape convex portion 25d of the trigger lever 25 is guided and moved by the concave portion 22h of the upper base 22 described above with reference to FIGS. 9 and 10.

It is noted that in the state shown in FIG. 13, the disk contact portion 25a of the trigger lever 25 is not yet contacted with the large-diameter disk 100. The slide cam pressing portion 25b is placed at the position 25b-2 away from the position 25b-1 at which the slide cam pressing portion is contacted with the first engagement portion 16b of the slide cam member 16 as shown in FIG. 11. The slide cam member 16 is not yet moved.

Figure 14:
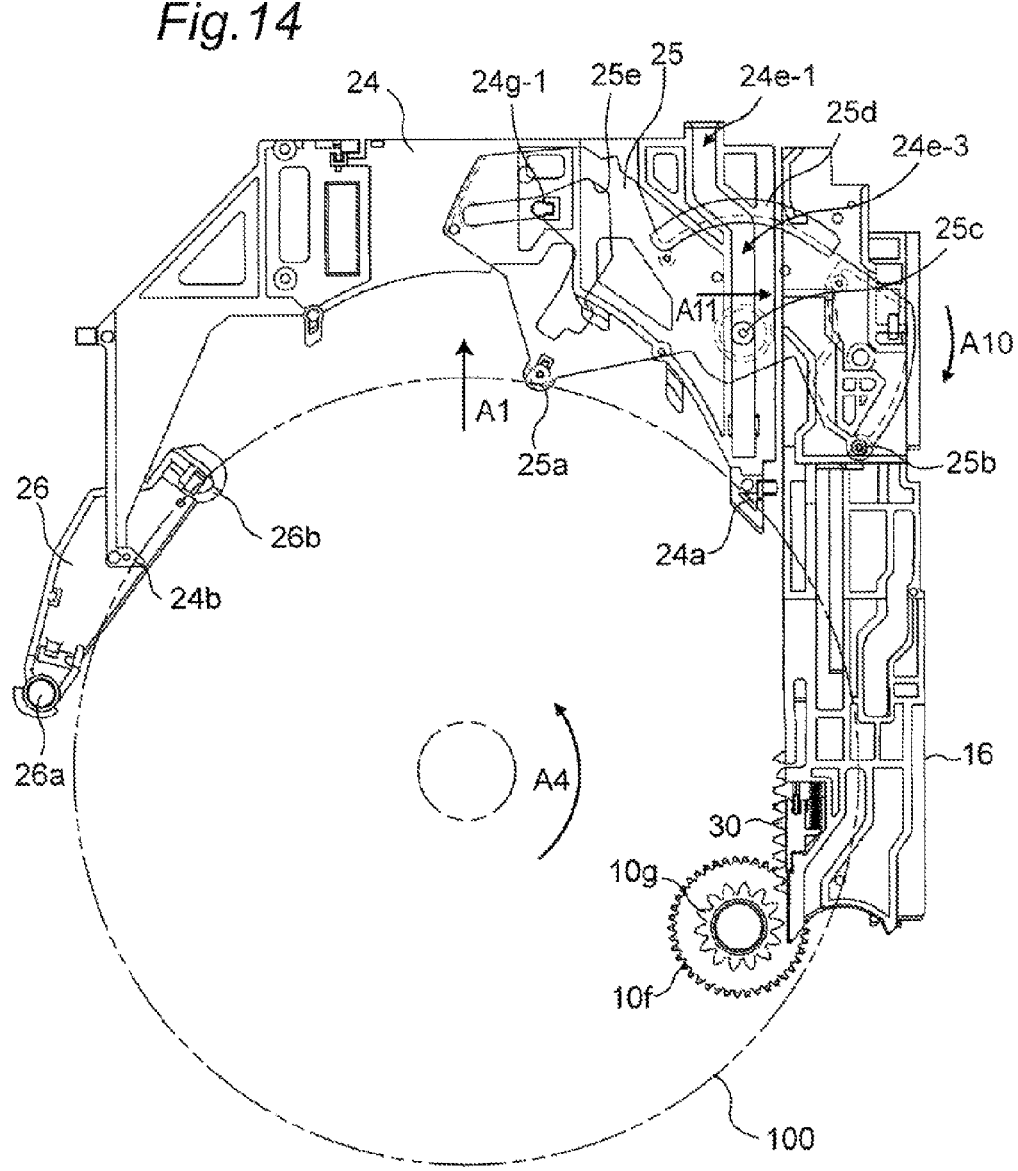
FIG. 14 is a top view showing a state in which, from the state shown in FIG. 13, the trigger lever is further turned by being pressed by the large-diameter disk, and the slide cam pressing portion of the trigger lever is contacted with a second engagement portion of the slide cam member.

When the large-diameter disk 100 is further conveyed in the arrow A1 direction from the state shown in FIG. 13, the large-diameter disk 100 is contacted with the disk contact portion 25a of the trigger lever 25 so as to press the trigger lever 25. At this time, since the rotation shaft portion 25c of the trigger lever 25 is engaged with the axial hole 22g (refer to FIGS. 9 and 10), the movement of the trigger lever 25 in the disk conveying direction is regulated. Meanwhile, the centering member 24 is pressed by the large-diameter disk 100 and moved in the arrow A1 direction. Thereby, the tilt cam portion 24e-2 moves so as to be brought away from the rotation shaft portion 25c of the trigger lever 25, and as shown in FIG. 14, the trigger lever 25 is rotated in the arrow A10 direction about the rotation shaft portion 25c. At this time, the rotation shaft portion 25c is placed in the second straight cam portion 24e-3 (second position), the movement in the arrow A11 direction and the opposite direction thereof is regulated, and the slide cam pressing portion 25b is rotated without being disturbed by the cam portion 16d of the slide cam member 16. Thereby, the slide cam pressing portion 25b moves to the position 25b-3 at which the slide cam pressing portion is contacted with the second engagement portion 16c of the slide cam member 16 as shown in FIG. 11.

Figure 15:
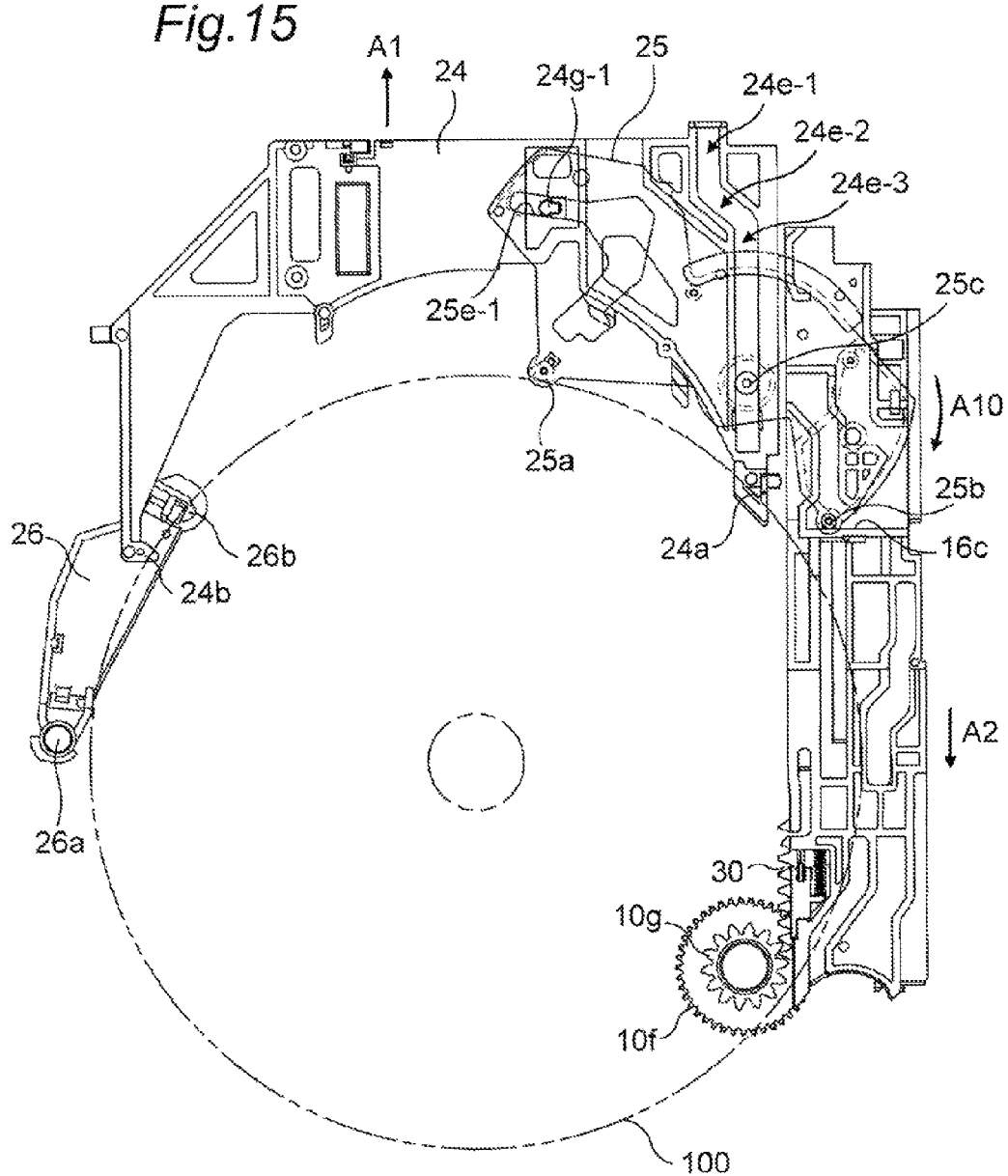
FIG. 15 is a top view showing a state in which the large-diameter disk is already conveyed to the replayable position.

When the large-diameter disk 100 is further conveyed in the arrow A1 direction from the state shown in FIG. 14, the trigger lever 25 pressed by the large-diameter disk 100 is further rotated in the arrow A10 direction, and the slide cam pressing portion 25b presses the second engagement portion 16c of the slide cam member 16 in the arrow A2 direction. Thereby, the entire slide cam member 16 slides in the arrow A2 direction, and as shown in FIG. 15, the rack 30 of the slide cam member 16 and the pinion 10g are meshed with each other. Thereby, the conveyance operation of the large-diameter disk 100 is completed, and the installment operation thereof is started.

It is noted that in the state shown in FIG. 15, the slide cam pressing portion 25b is placed at the position 25b-4 at which the slide cam pressing portion is contacted with the second engagement portion 16c of the slide cam member 16 as shown in FIG. 11. In the state shown in FIG. 15, the large-diameter disk 100 is already conveyed to the replayable position.

Since the drive force of the motor 9 is transmitted via the gear row 10 and thus the pinion 10g is rotated in the state shown in FIG. 15, the meshed rack 30 is driven, and the slide cam member 16 further slides in the arrow A2 direction. In accordance with this sliding, the slide cam member 18 connected to the slide cam member 16 via the link arm 17 slides in the arrow A1 direction. By this sliding of the slide cam members 16, 18 in the opposite directions to each other, as described above, the installment operation of the large-diameter disk 100 onto the turntable 13 is performed. By the sliding of the slide cam member 16 in the arrow A2 direction, the second engagement portion 16c is brought away from the slide cam pressing portion 25b, and the slide cam pressing portion 25b is guided by the cam portion 16e and moved to the position 25b-5 shown in FIG. 11.

Figure 16:
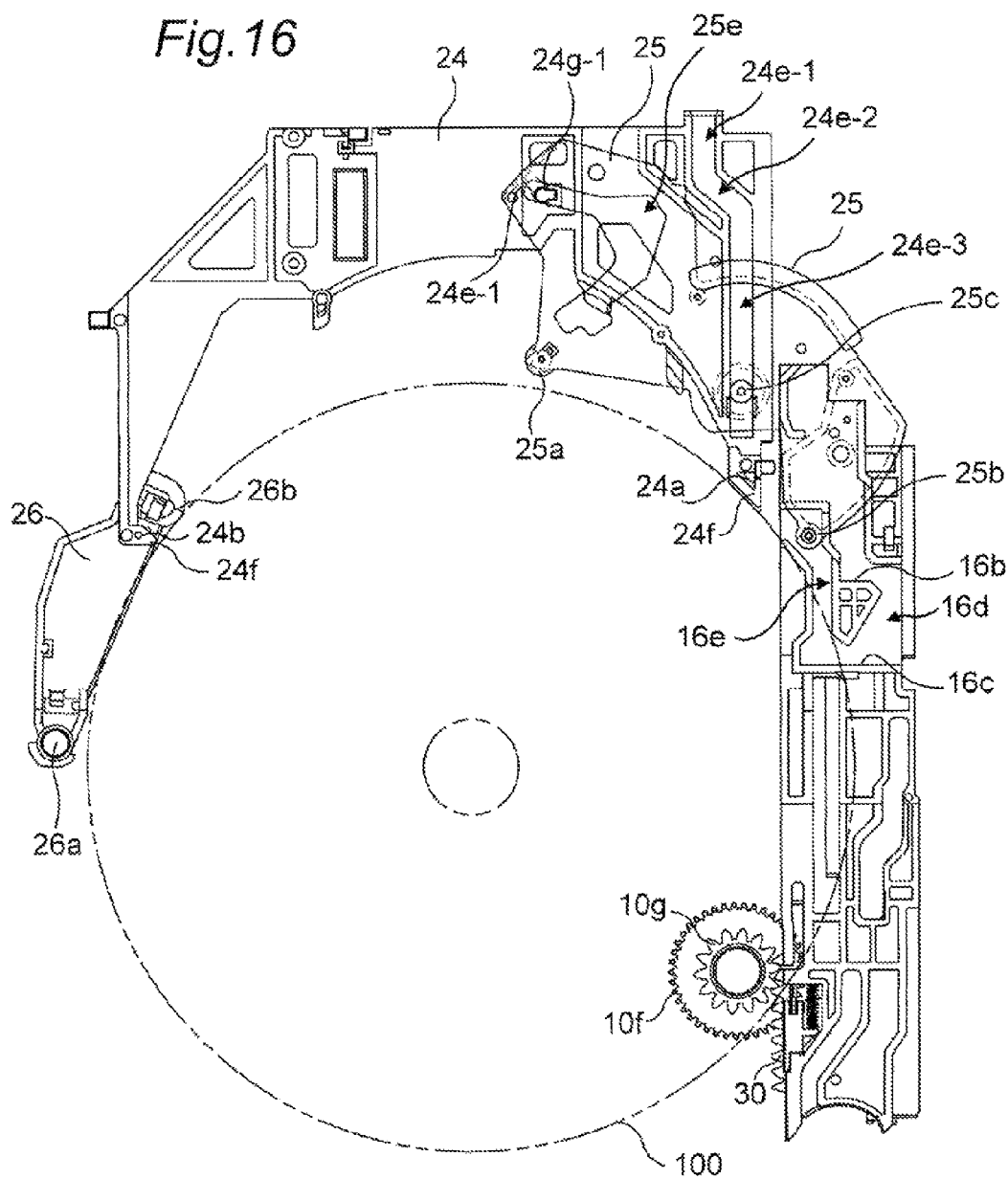
FIG. 16 is a top view showing a state in which an installment operation of the large-diameter disk is completed.

When the slide cam member 16 further slides in the arrow A2 direction from the state that the slide cam pressing portion 25b is placed at the position 25b-5, the slide cam pressing portion 25b moves from the cam portion 16e to the position 25b-6 shown in FIG. 11 above the cam portion 16f via an tilt part. At this time, the trigger lever 25 is slightly rotated in the arrow A10 direction about the rotation shaft portion 25c. By this rotation, the guide 24g-1 of the centering member 24 engaged with the link groove 25e-1 of the trigger lever 25 is pressed, and the centering member 24 slides in the arrow A1 direction. Thereby, as shown in FIG. 16, the positioning contact portions 24a, 24b and the positioning guides 24f of the centering member 24, the disk contact portion 25a of the trigger lever 25, and the positioning guide 26b of the guide lever 26 are brought away from the large-diameter disk 100, and hence rotation of the large-diameter disk 100 is not disturbed.

As described above, the installment operation of the large-diameter disk 100 is completed.

Figure 17:
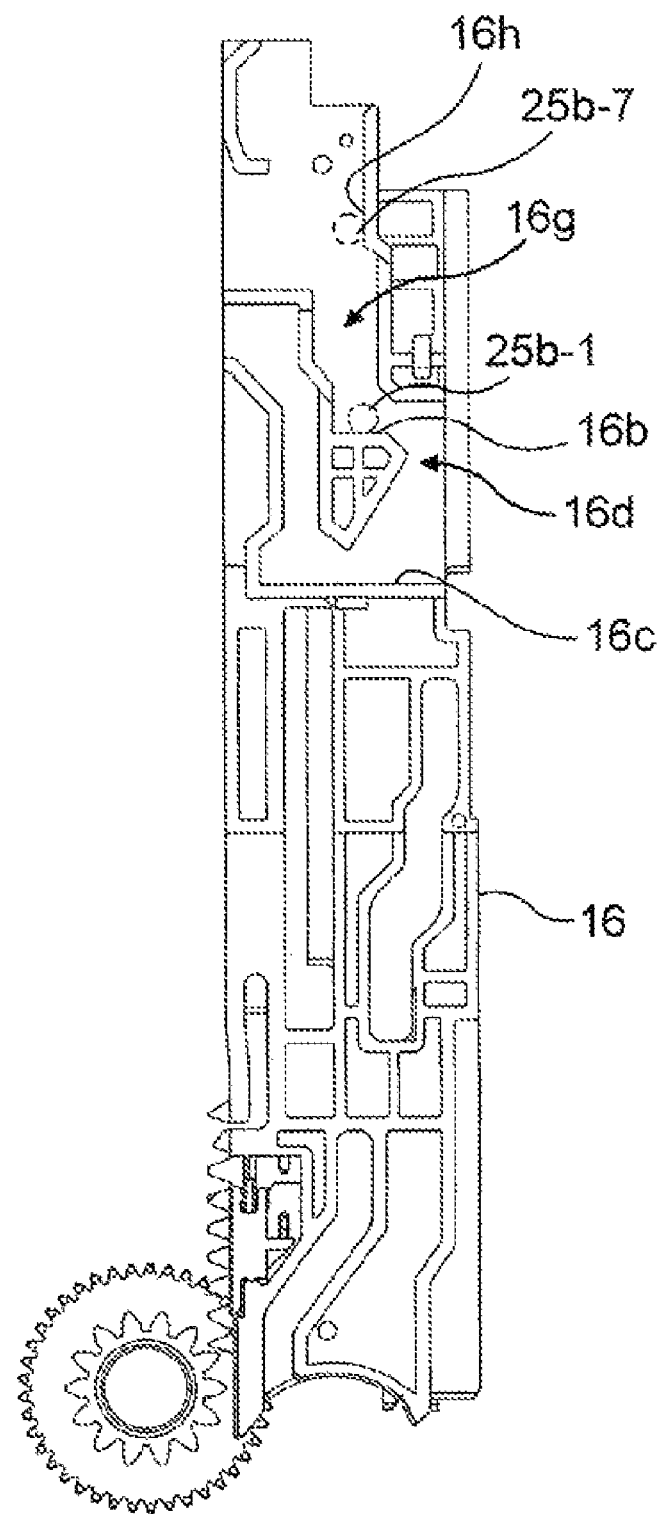
FIG. 17 is a top view showing a relative movement trajectory of the slide cam pressing portion of the trigger lever relative to the engagement portions formed in the slide cam member at the time of inserting a small-diameter disk.

Next, with reference to FIGS. 17 to 21, operations of the parts in the case where the small-diameter disk 200 is inserted into the casing 300 will be described. FIG. 17 is a top view showing a relative movement trajectory of the slide cam pressing portion 25b of the trigger lever 25 relative to the engagement portions provided to the slide cam member 16 at the time of inserting the small-diameter disk. FIGS. 18 to 21 are top views showing positional relationships among the slide cam member 16, the centering member 24, the trigger lever 25, and the guide lever 26 when the small-diameter disk 200 inserted into the casing 300 is conveyed to the replayable position. It is noted that also in these figures, portions of the constitute parts are shown as transparent for convenience.

The slide cam member 16 is provided with cam portions 16g, 16h other than the first engagement portion 16b, the second engagement portion 16c, and the cam portions 16d to 16f described with reference to FIG. 11. The cam portion 16g is apart for moving the slide cam pressing portion 25b so as to bring the slide cam pressing portion away from the first engagement portion 16b when the small-diameter disk 200 is installed onto the turntable 13 after being conveyed to the replayable position. The cam portion 16h is a part for bringing the positioning contact portions 24a, 24b and the like of the centering member 24 away from the small-diameter disk 200. The positional relationships between the parts are changed as shown in FIGS. 18 to 21, so that the slide cam pressing portion 25b of the trigger lever 25 follows the trajectory of the positions 25b-1 to 25b-7.

Figure 18:
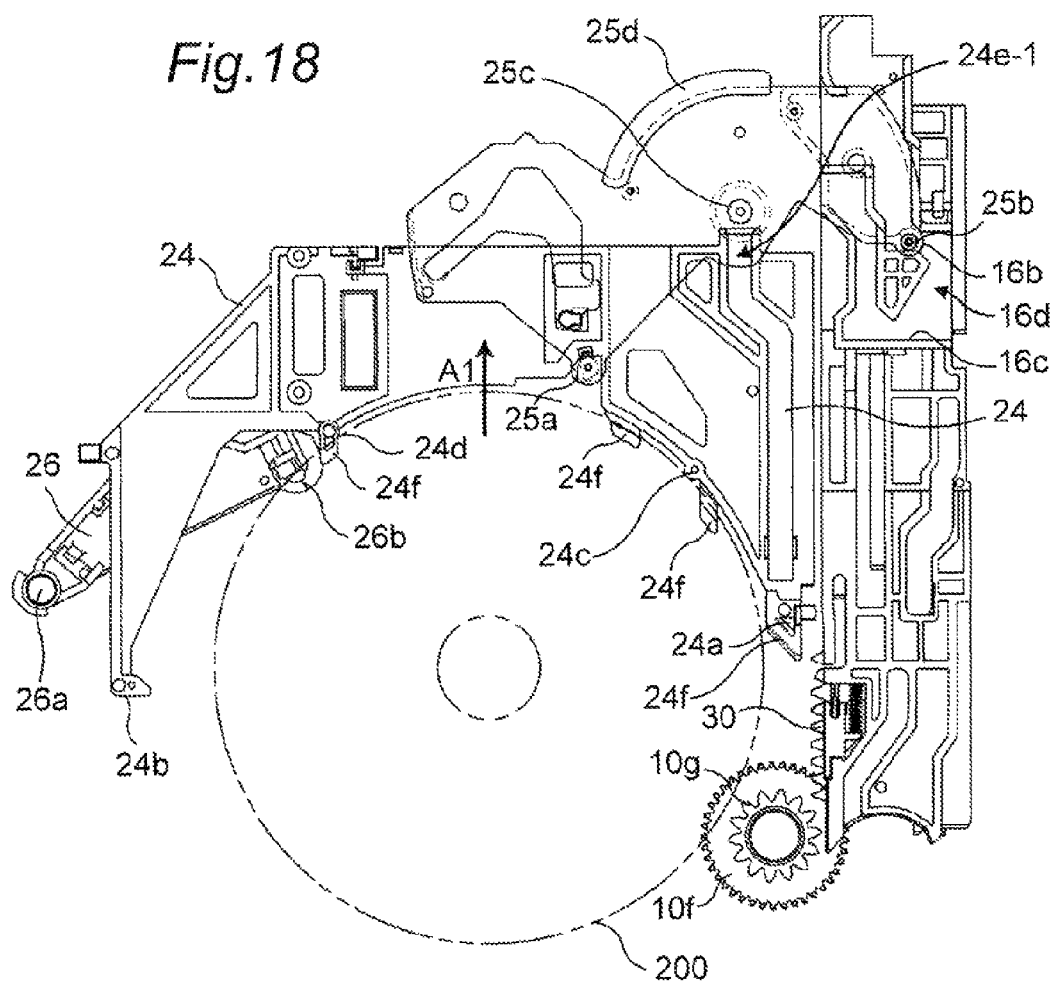
FIG. 18 is a top view showing a state in which the small-diameter disk is contacted with the positioning contact portion of the centering member.

When the small-diameter disk 200 is inserted into the casing 300, firstly, the vicinity of the front end of the small-diameter disk 200 is contacted with the positioning guide 26b of the guide lever 26, so that the height in the thickness direction of the small-diameter disk 200 is determined. In this state, when the small-diameter disk 200 is further conveyed to the replayable position, the guide lever 26 is pressed by the small-diameter disk 200 and rotated about the rotation shaft 26a against the bias force of the torsion coil spring 24h, and as shown in FIG. 18, the small-diameter disk 200 is contacted with the positioning contact portions 24c, 24d of the centering member 24. The peripheral part of the small-diameter disk 200 is contacted with the positioning contact portions 24c, 24d, so that the small-diameter disk 200 is centered. That is, the center of the small-diameter disk 200 is positioned so as to be placed on the straight line parallel to the disk conveying direction in plan view, the straight line running through the center of the turntable.

It is noted that in the state shown in FIG. 18, the disk contact portion 25a of the trigger lever 25 is in an initial state in which the disk contact portion is not contacted with the small-diameter disk 200, and the slide cam pressing portion 25b of the trigger lever 25 is placed at the position 25b-1 at which the slide cam pressing portion is contacted with the first engagement portion 16b of the slide cam member 16 as shown in FIG. 17. In a state shown in FIG. 18, the rotation shaft portion 25c of the trigger lever 25 is not guided by the guide cam 24e of the centering member 24.

Figure 19:
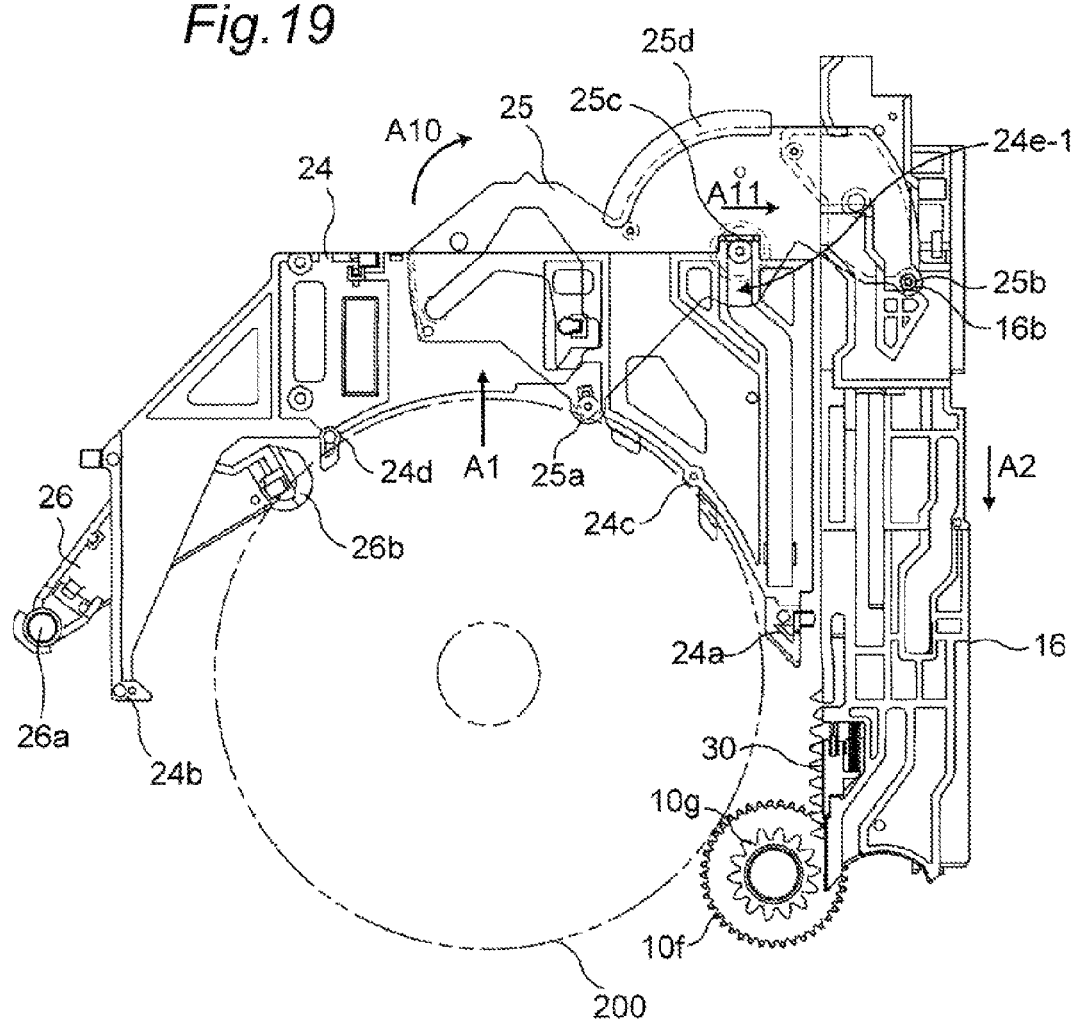
FIG. 19 is a top view showing a state in which, from the state shown in FIG. 18, the centering member is pressed by the small-diameter disk and the small-diameter disk is contacted with an contact portion of the trigger lever.

When the small-diameter disk 200 is further conveyed in the arrow A1 direction from the state shown in FIG. 18, the small-diameter disk 200 moves the centering member 24 in the arrow A1 direction against the bias force of the twist coil spring 24h, and also moves the guide lever 26 in the arrow A1 direction. Thereby, as shown in FIG. 19, the rotation shaft portion 25c of the trigger lever 25 moves into the first straight cam portion 24e-1 of the guide cam 24e, and the small-diameter disk 200 is contacted with the disk contact portion 25a of the trigger lever 25. It is noted that at this time point, the rack 30 of the slide cam member 16 and the pinion 10g are not yet meshed with each other.

Figure 20:
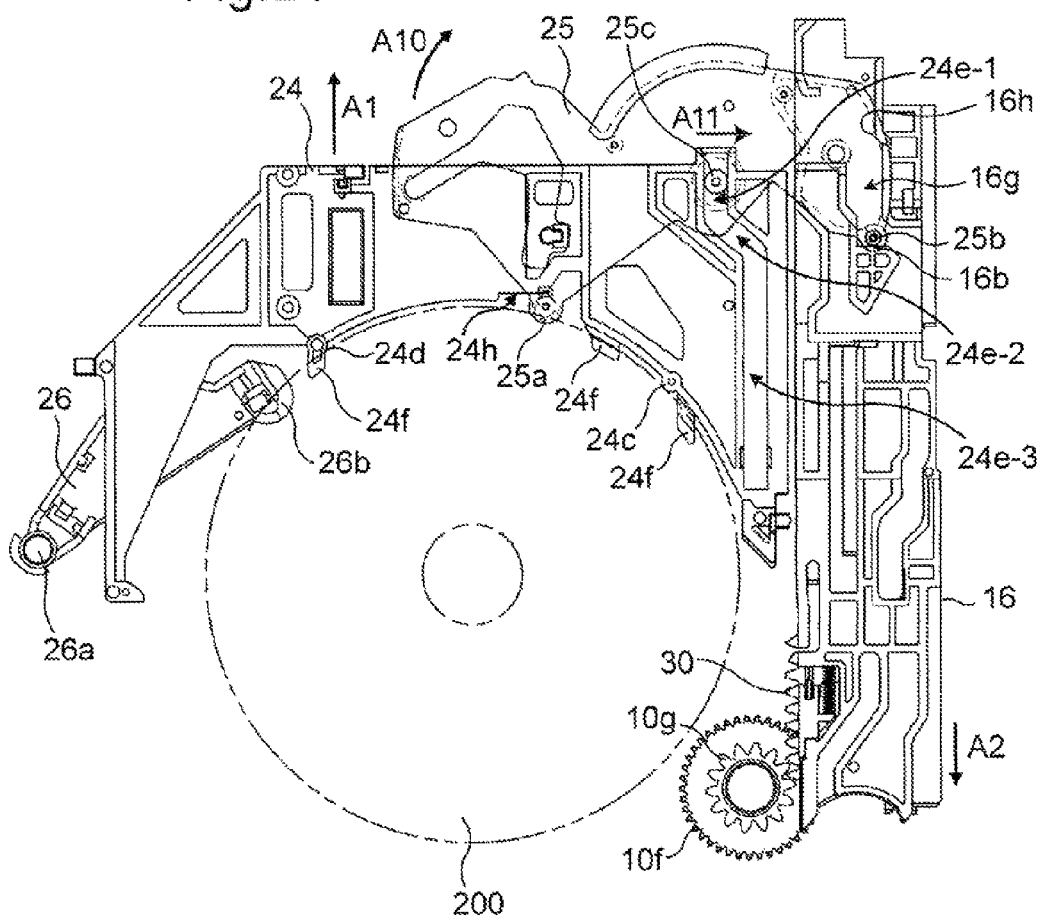
FIG. 20 is a top view showing a state in which the small-diameter disk is already conveyed to the replayable position.

When the small-diameter disk 200 is further conveyed in the arrow A1 direction from the state shown in FIG. 19, the trigger lever 25 is pressed by the small-diameter disk 200 in the arrow A1 direction. At this time, since the rotation shaft portion 25c of the trigger lever 25 is engaged with the axial hole 22g (refer to FIGS. 9 and 10), the movement in the disk conveying direction is regulated. Moreover, since the rotation shaft portion is placed in the first straight cam portion 24e-1 (first position), the movement in the arrow A11 direction and the opposite direction thereof is regulated. Meanwhile, the centering member 24 is pressed by the small-diameter disk 200 and moved in the arrow A1 direction. Thereby, the trigger lever 25 pressed by the small-diameter disk 200 is rotated in the arrow A10 direction by the rotation shaft portion 25c. By this rotation of the trigger lever 25, the slide cam pressing portion 25b presses the first engagement portion 16b of the slide cam member 16 in the arrow A2 direction. Thereby, the entire slide cam member 16 slides in the arrow A2 direction, and as shown in FIG. 20, the rack 30 of the slide cam member 16 and the pinion 10g are meshed with each other. Thereby, the conveyance operation of the small-diameter disk 200 is completed, and the installment operation thereof is started. It is noted that in the state shown in FIG. 20, the small-diameter disk 200 is already conveyed to the replayable position.

Since the drive force of the motor 9 is transmitted via the gear row 10 and thus the pinion 10g is rotated in the state shown in FIG. 20, the meshed rack 30 is driven, and the slide cam member 16 further slides in the arrow A2 direction. In accordance with this sliding, the slide cam member 18 connected to the slide cam member 16 via the link arm 17 slides in the arrow A1 direction. By this sliding of the slide cam members 16, 18 in the opposite directions to each other, as described above, the installment operation of the small-diameter disk 200 onto the turntable 13 is performed. By the sliding of the slide cam member 16 in the arrow A2 direction, the first engagement portion 16b is brought away from the slide cam pressing portion 25b, and the slide cam pressing portion 25b is guided and moved by the cam portion 16g.

When the slide cam member 16 further slides in the arrow A2 direction from the state in which the slide cam pressing portion 25b is placed in the cam portion 16g, the slide cam pressing portion 25b moves from the cam portion 16g to the position 25b-7 shown in FIG. 17 above the cam portion 16h via an tilt part. At this time, the trigger lever 25 is slightly rotated in the arrow A10 direction about the rotation shaft portion 25c. By this rotation, the edge portion 24h of the centering member 24 contacted with the disk contact portion 25a of the trigger lever 25 is pressed by the disk contact portion 25a, and the centering member 24 slides in the arrow A1 direction. Thereby, as shown in FIG. 21, the positioning contact portions 24c, 24d and the positioning guides 24f of the centering member 24, the disk contact portion 25a of the trigger lever 25, and the positioning guide 26b of the guide lever 26 are brought away from the small-diameter disk 200, and hence rotation of the small-diameter disk 200 is not disturbed.

As described above, the installment operation of the small-diameter disk 200 is completed.

In the conveyance operation of the small-diameter disk 200, the distance between the position at which the disk is contacted with the positioning contact portions 24c, 24d of the centering member 24 and the replayable position to which the disk is conveyed is shorter than the distance in the conveyance operation of the large-diameter disk 100. Therefore, the rotation shaft portion 25c of the trigger lever 25 is not moved into the tilt cam portion 24e-2 of the guide cam 24e but moved only in the first straight cam portion 24e-1.

FIG. 22 is a view showing a positional relationship of the slide cam member 16, the centering member 24, and the trigger lever 25 relative to the large-diameter disk 100 conveyed to the replayable position, and a positional relationship of the slide cam member 16, the centering member 24, and the trigger lever 25 relative to the small-diameter disk 200 conveyed to the replayable position. In FIG. 22, the center of the large-diameter disk 100 and the center of the small-diameter disk 200 are placed on a straight line 21b orthogonal to the disk conveying direction, the straight line running through the center of the turntable 13. As clear from FIG. 22, even in the case where any of the large-diameter disk 100 and the small-diameter disk 200 is inserted into the casing 300, the slide cam member 16 can be slid in the arrow A2 direction by the slide cam pressing portion 25b of the trigger lever 25.

Next, with reference to FIGS. 23 to 27, a configuration for raising and lowering the turntable 13 will be described in more detail.

FIG. 23 is a perspective view of the slide cam member 16. As described above, the raising and lowering cam 16a to be engaged with the engagement pin 19c provided to the intermediate chassis 19 in order to raise and the lower the front part of the intermediate chassis 19 is formed in the slide cam member 16. This raising and lowering cam 16a is formed by a lower surface cam portion 16a-1, a tilt cam portion 16a-2, and a higher surface cam portion 16a-3. The lower surface cam portion 16a-1 is a part for retaining the front part of the intermediate chassis 19 in a state that the front part is lowered. The tilt cam portion 16a-2 is a part for raising and lowering the front part of the intermediate chassis 19. The higher surface cam portion 16a-3 is a part for retaining the front part of the intermediate chassis 19 in a state that the front part is raised.

As shown in FIG. 2, the raising and lowering cam 18a to be engaged with the engagement pin 19d of the intermediate chassis 19 is formed on the slide cam member 18. This raising and lowering cam 18a is formed by a lower surface cam portion, a tilt cam portion, and a higher surface cam portion similar to the slide cam member 16. The cam portions of the raising and lowering cam 18a and the cam portions 16a-1 to 16a-3 of the raising and lowering cam 16a have opposite tilt directions to each other.

Accordingly, the slide cam member 16 and the slide cam member 18 slide in the opposite directions to each other as described above in a state that the engagement pin 19c is engaged with the raising and lowering cam 16a and the engagement pin 19d is engaged with the raising and lowering cam 18a, so that the front part of the intermediate chassis 19 is raised or lowered. That is, the turntable 13 provided in the front part of the intermediate chassis 19 is raised by the sliding of the slide cam member 16 in the arrow direction A2 and lowered by the sliding of the slide cam member 16 in the arrow A1 direction.

Figure 24A:
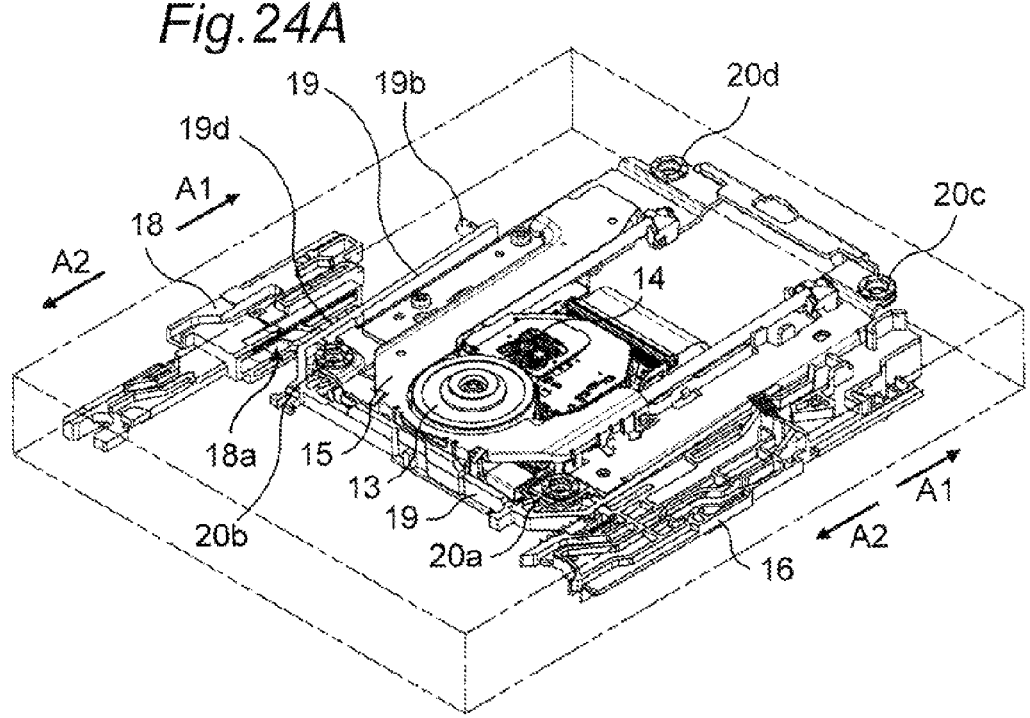
FIG. 24A is a perspective view showing a positional relationship between an intermediate chassis and a pair of slide cam members when a turntable is lowered.
Figure 24B:
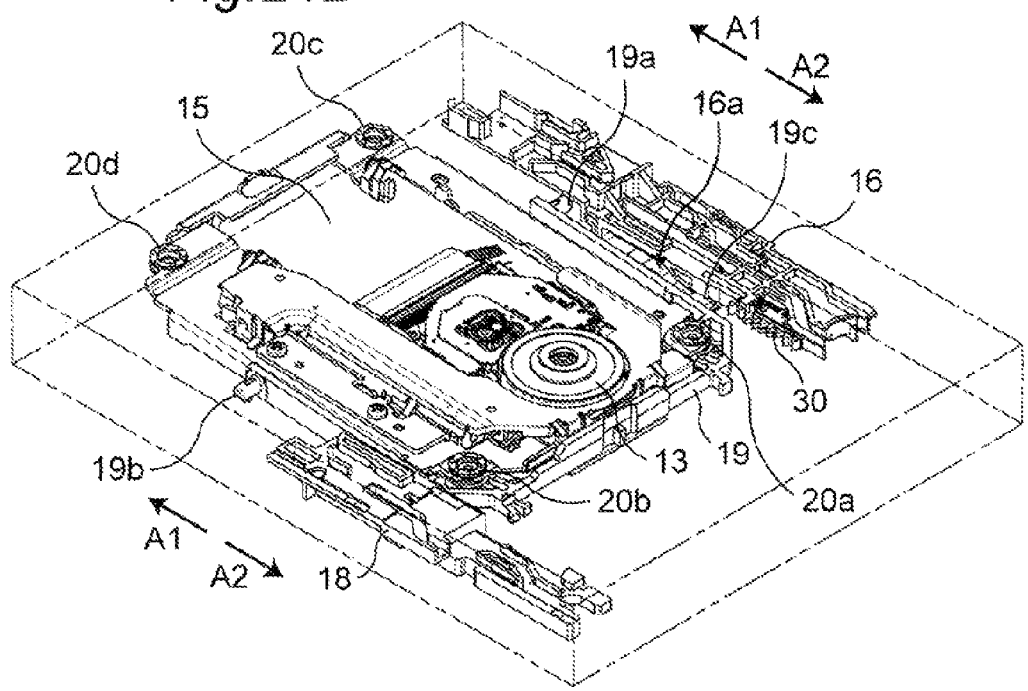
FIG. 24B is another perspective view showing a positional relationship between the intermediate chassis and the pair of slide cam members when the turntable is lowered.
Figure 25:
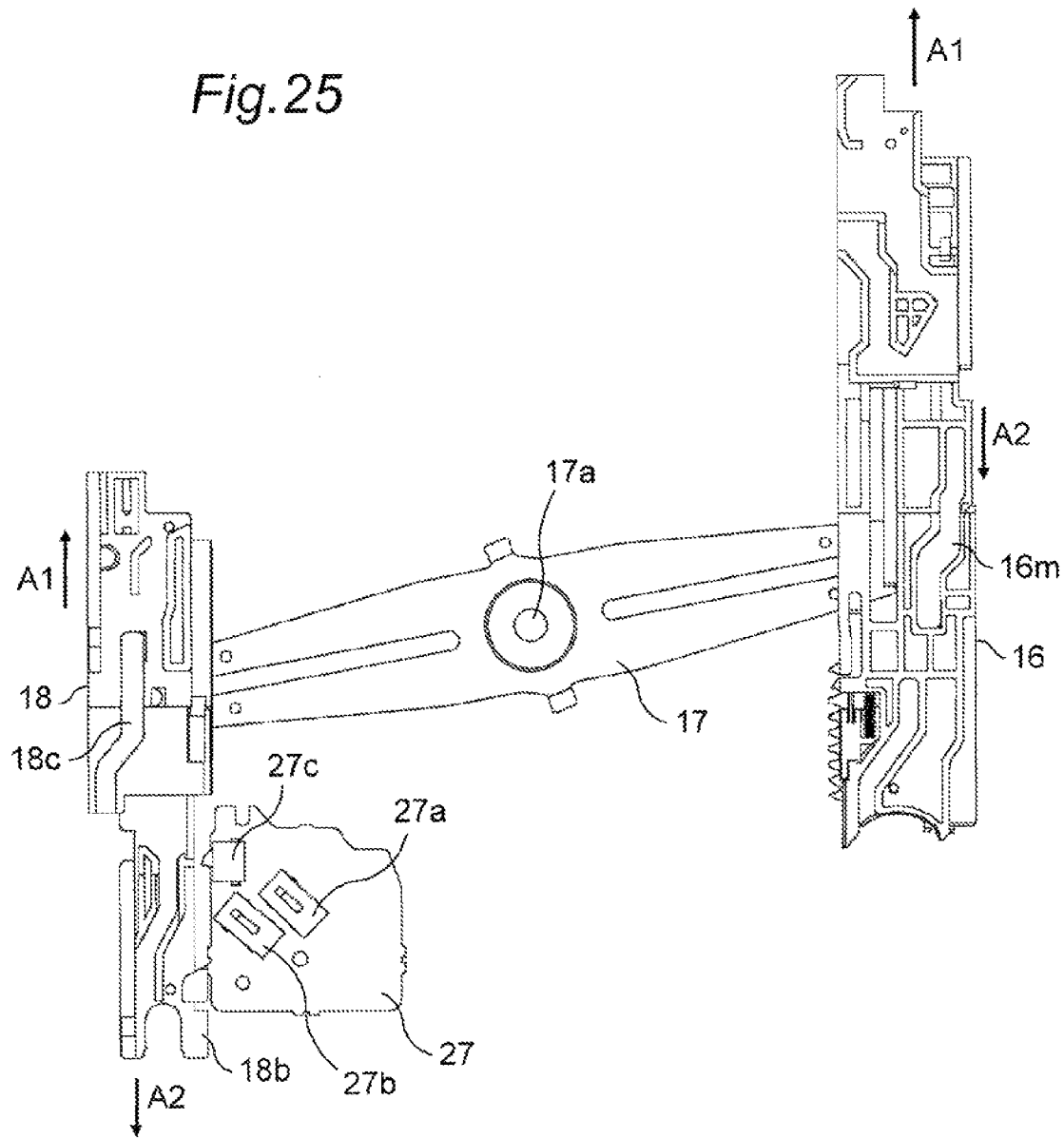
FIG. 25 is a top view showing a positional relationship between the pair of slide cam members and a link arm when the turntable is lowered.

FIGS. 24A and 24B are perspective views showing a positional relationship between the intermediate chassis 19 and the slide cam members 16, 18 when the turntable 13 is lowered (a standby state in which the disk is not inserted). FIG. 25 is a top view showing a positional relationship between the slide cam members 16, 18 and the link arm 17 when the turntable 13 is lowered. In this state, the slide cam member 16 is biased in the A1 direction by the spring 16j as described above with reference to FIG. 3. This slide cam member 16 is coupled to the slide cam member 18 via the link arm 17. The link arm 17 is provided rotatably about a rotation shaft 17a. Therefore, the slide cam member 18 is biased by the spring 16j in the arrow A2 direction opposite to that of the slide cam member 16. In this state, since the turntable 13 is lowered, the disk can be inserted.

As shown in FIG. 25, a protruding portion 18b capable of being contacted with the detection switch 27c is formed on the slide cam member 18. When the disk is conveyed to the replayable position and the slide cam member 18 slides in the arrow A1 direction, the protruding portion 18b is contacted with the detection switch 27c so as to operate the detection switch 27c.

It is noted that as described above, the state shown in FIGS. 24A, 24B, and 25 is continued until the disk is conveyed to the replayable position, the slide cam member 16 is pressed by the slide cam pressing portion 25b of the trigger lever 25, the rack 30 is meshed with the pinion 10g, and then the slide cam member 16 starts sliding in the arrow A2 direction. The slide cam member 16 slides in the arrow A2 direction and the slide cam member 18 slides in the arrow A1 direction, so that the engagement pins 19c, 19d of the intermediate chassis 19 move along the raising and lowering cam 16a and the raising and lowering cam 18a. Thereby, the front part of the intermediate chassis 19 is raised, the turntable 13 is raised, and the disk is nipped between the turntable 13 and the clamper 21. After that, the protruding portion 18b of the slide cam member 18 described above is contacted with the detection switch 27c, so that the drive of the motor 9 is stopped. Thereby, the disk is brought into an installment completion state.

Figure 27:
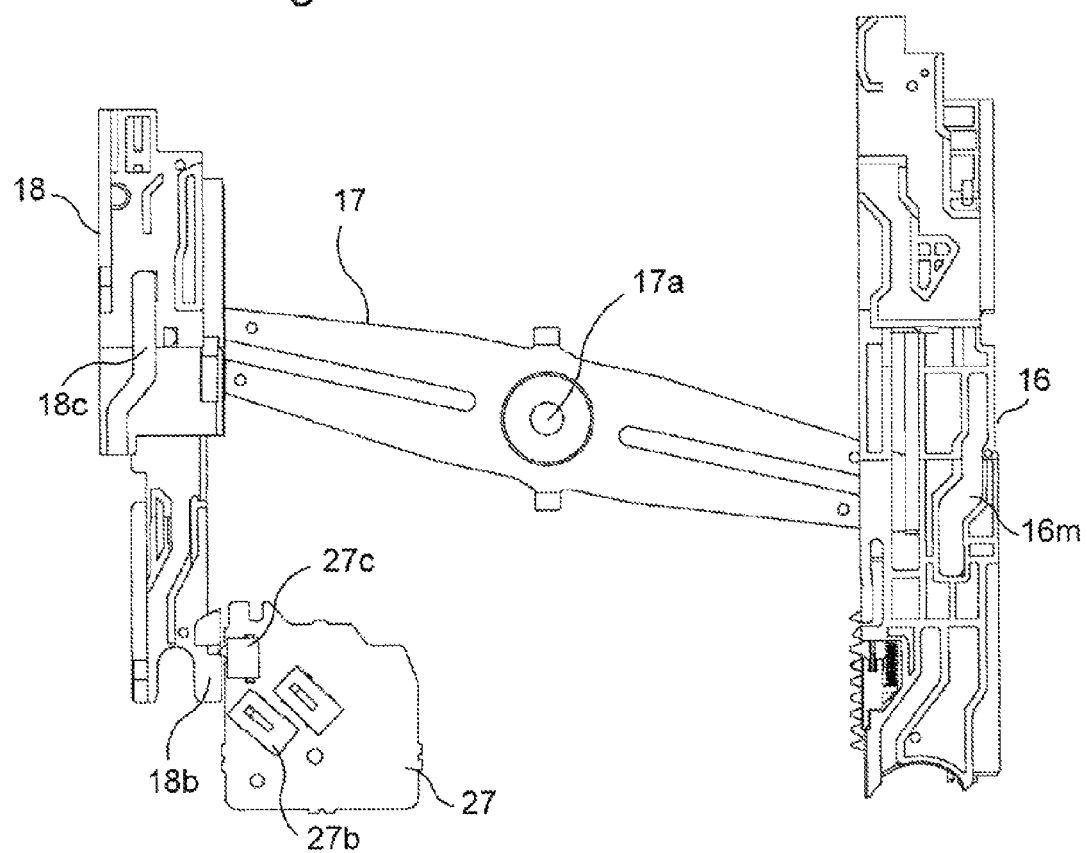
FIG. 27 is a top view showing a positional relationship between the pair of slide cam members and the link arm when the turntable is raised.

FIGS. 26A and 26B are perspective views showing a positional relationship between the intermediate chassis 19 and the slide cam members 16, 18 when the turntable 13 is raised (installment completion state of the disk: refer to FIG. 16 for the large-diameter disk 100, and refer to FIG. 21 for the small-diameter disk 200). FIG. 27 is a top view showing a positional relationship among the slide cam member 16, the slide cam member 18, and the link arm 17 when the turntable 13 is raised. It is noted that at this time, the rack 30 and pinion 10g remain meshed with each other. This state is continued until the motor 9 is reversely driven by an ejecting operation for the disk ejection and the slide cam member 16 moves in the arrow A1 direction opposite to that of the disk conveyance.

It is noted that as shown in FIG. 23, an engagement portion 16k supporting the spring 16j for biasing the slide cam member 16 in the arrow A1 direction is formed in the slide cam member 16. A cam groove 16m for moving the clamper lifter 23a is formed on the upper surface of the slide cam member 16. Similarly, as shown in FIGS. 25 and 27, a cam groove 18c for moving the clamper lifter 23b is formed on the upper surface of the slide cam member 18.

Figure 28:
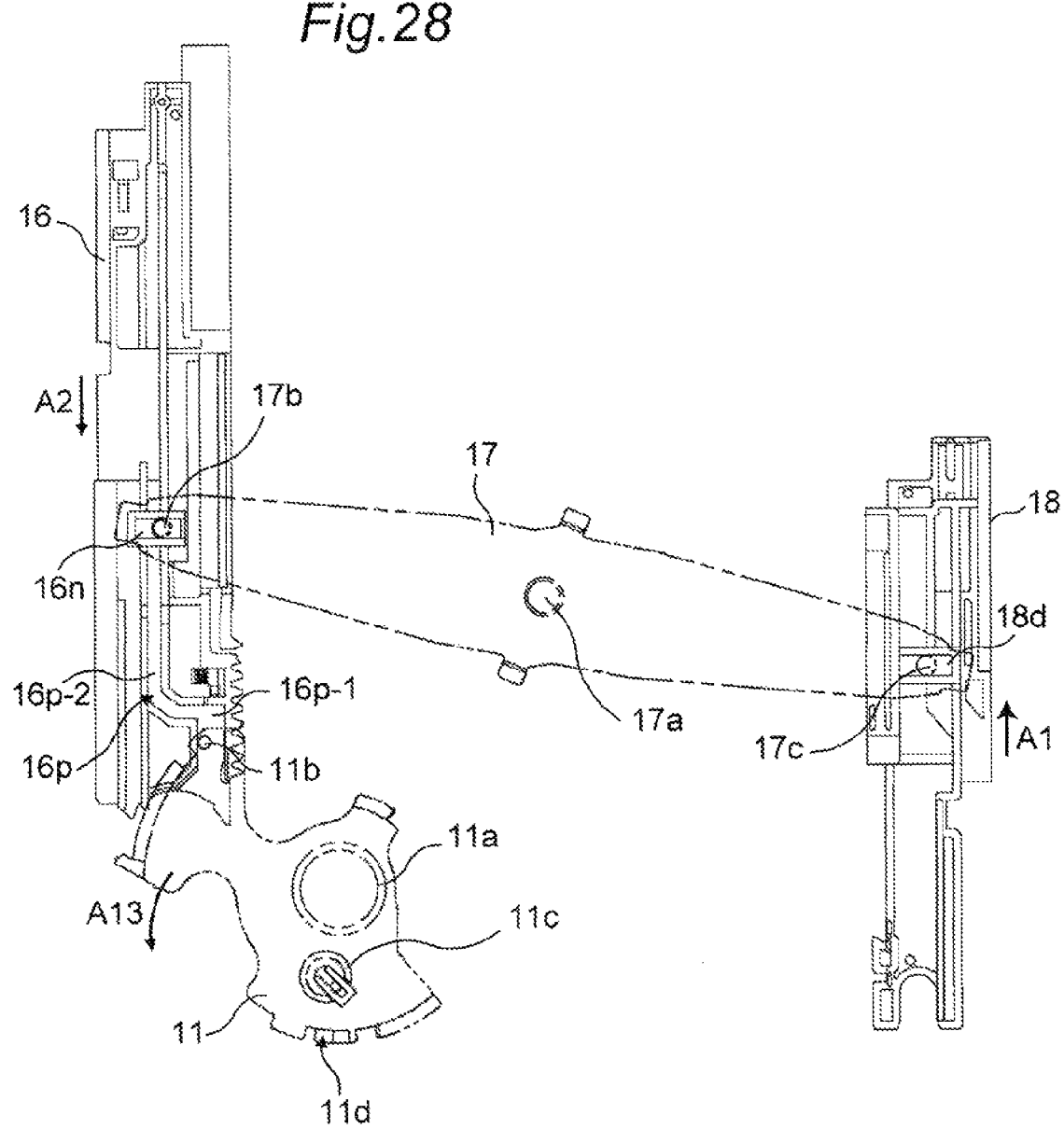
FIG. 28 is a bottom view showing a positional relationship among the pair of slide cam members, the link arm, and a clutch plate when the turntable is lowered.
Figure 29:
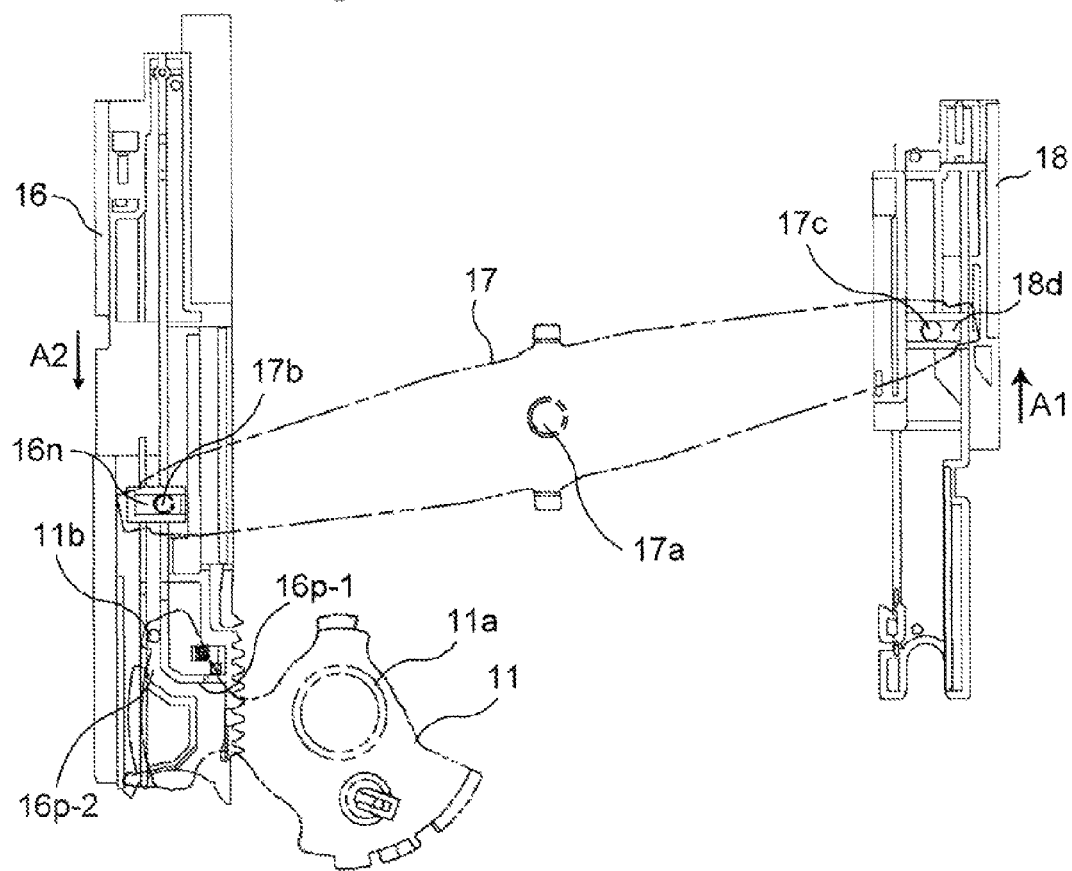
FIG. 29 is a bottom view showing a positional relationship among the pair of slide cam members, the link arm, and the clutch plate when the turntable is raised.

FIG. 28 is a bottom view showing a positional relationship among the slide cam members 16, 18, the link arm 17, and the clutch plate 11 when the turntable 13 is lowered. FIG. 29 is a bottom view showing a positional relationship among the slide cam members 16, 18, the link arm 17, and the clutch plate 11 when the turntable 13 is raised. As shown in these figures, engagement pins 17b, 17c are formed at both ends of the link arm 17. The engagement pin 17b is engaged with an engagement concave portion 16n formed in the slide cam member 16, and the engagement pin 17c is engaged with an engagement concave portion 18d formed in the slide cam member 18. Thereby, the link arm 17 couples the slide cam members 16, 18 so that these slide cam members are operated in association with each other. It is noted that the engagement pins 17b, 17c of the link arm 17 move while following an arc shape about the rotation shaft 17a, whereas the slide cam members 16, 18 move in a straight line in the arrow A1 or A2 direction. That is, in accordance with the rotation of the link arm 17, the distance between the rotation shaft 17a of the link arm 17 and the engagement concave portions 16n, 18d is changed. Therefore, the engagement concave portions 16n, 18d are formed into a groove shape elongated at a right angle to the arrow A1 and A2 directions so that the rotation of the link arm 17 is not prevented by the change in the distance.

As shown in FIGS. 28 and 29, a cam 16p is formed on the lower surface of the slide cam member 16 so as to rotate the clutch plate 11 in association with the sliding of the slide cam member 16. This cam 16p is formed by a first cam portion 16p-1 and a second cam portion 16p-2. The first cam portion 16p-1 is formed and extended at a right angle to the sliding direction (arrow A1 or A2 direction) of the slide cam member 16. The second cam portion 16p-2 is extended in the sliding direction of the slide cam member 16 and formed so as to be coupled to the first cam portion 16p-1.

Figure 30:
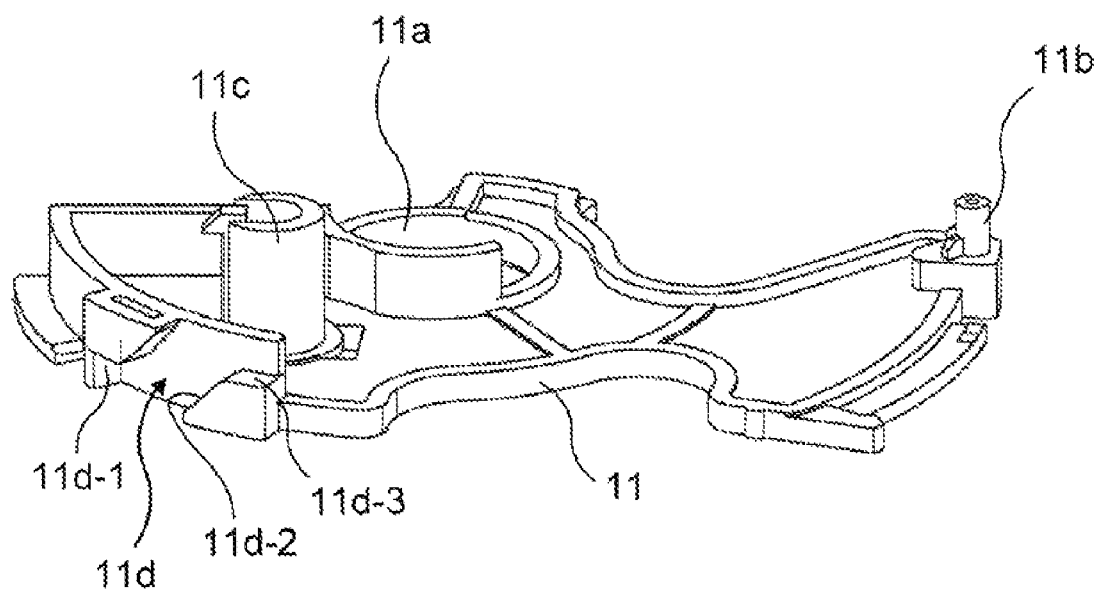
FIG. 30 is a perspective view of the clutch plate.

FIG. 30 is a perspective view of the clutch plate 11 seen from the upper side. The clutch plate 11 is provided with a bearing portion 11a rotatably supported on a shaft formed on the mechanical chassis 12, an engagement pin 11b to be engaged with the cam 16p of the slide cam member 16, a shaft portion 11c for rotatably supporting the gear 10c, and a cam 11d for raising and lowering a disk insertion blocking member 33. The clutch plate 11 is rotatable in a state in which the bearing portion 11a is arranged coaxially with a rotation axis of the gear 10d for transmitting the drive force of the motor 9, and the gear 10c is rotatably supported by a periphery of the shaft portion 11c. The cam 11d has a lower surface cam portion 11d-1, a tilt cam portion 11d-2, and an upper surface cam portion 11d-3.

The slide cam member 16 slides in a state in which the engagement pin 11b is engaged with the cam 16p of the slide cam member 16, so that the clutch plate 11 is rotated. That is, the slide cam member 16 slides in the arrow A2 direction from the state shown in FIG. 28, so that the engagement pin 11b is contacted with the first cam portion 16p-1. When the slide cam member 16 further slides in the arrow A2 direction from this state, the clutch plate 11 is rotated in an arrow A13 direction about the bearing portion 11a, and the engagement pin 11b moves from the first cam portion 16p-1 to the second cam portion 16p-2. Thereby, the rotation of the clutch plate 11 is stopped. When the slide cam member 16 further slides in the arrow A2 direction from this state, the engagement pin 11b is guided and moved by the second cam portion 16p-2. FIG. 29 shows a state in which the disk installment operation described above is completed and the sliding of the slide cam member 16 is stopped. In this state, the engagement pin 11b is retained by the second cam portion 16p-2, and the rotation of the clutch plate 11 is regulated.

Next, with reference to FIGS. 31 to 33, an operation for switching the transmission route of the drive force of the motor 9 by rotating the clutch plate 11, that is, an operation for switching the disk conveyance operation and the disk installment operation will be described.

Figure 31:
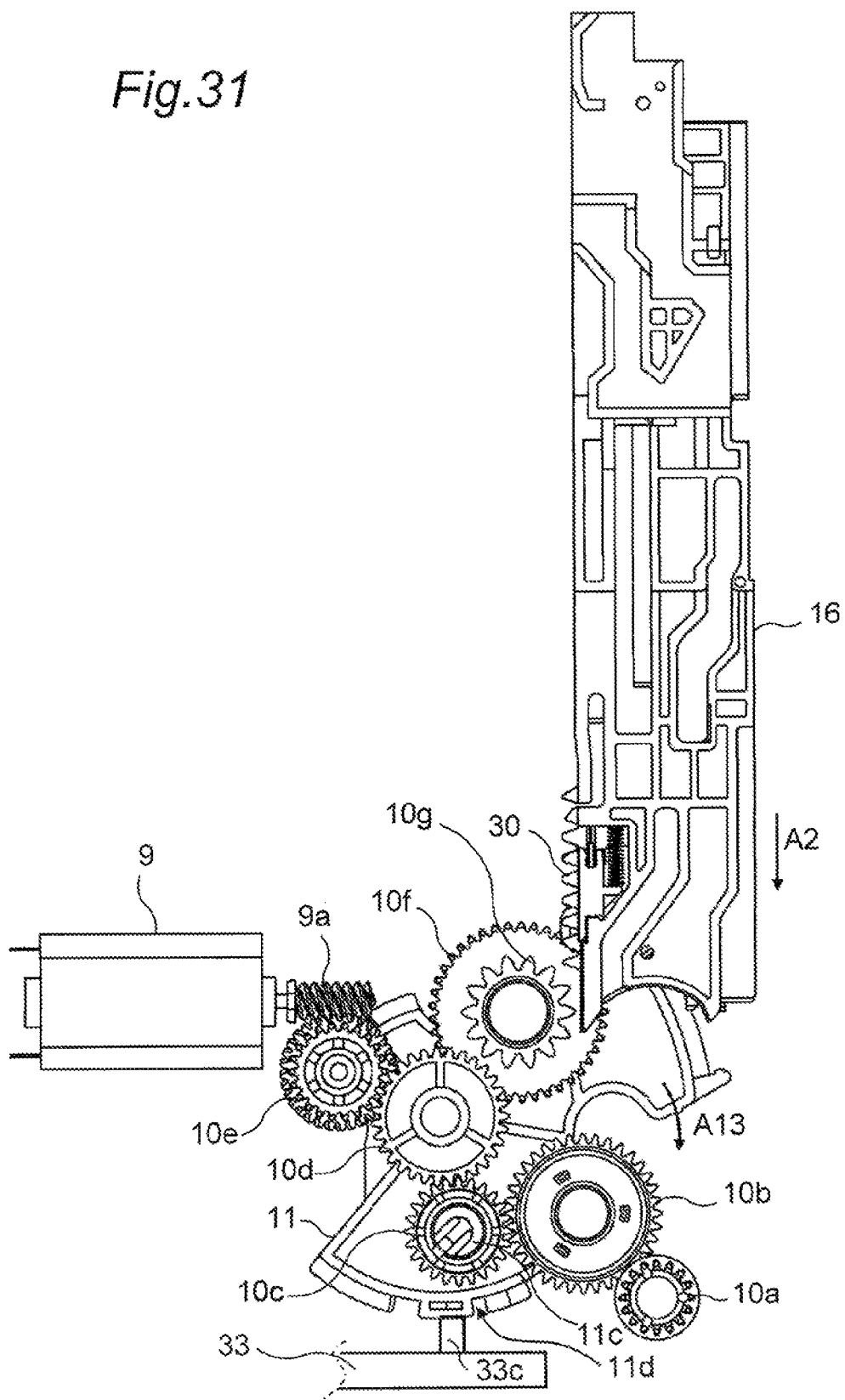
FIG. 31 is a top view showing a positional relationship of parts relating to the clutch plate before a disk conveyance operation.

FIG. 31 is a top view showing a positional relationship of the parts relating to the clutch plate before the disk conveyance operation. In the state shown in FIG. 31, the drive force of the motor 9 can be transmitted to the gear 10a via the worm gear 9a, the gear 10e, the gear 10d, the gear 10c, and the gear 10b. As described above with reference to FIGS. 2 and 7, the gear 10a can transmit the drive force of the motor 9 to the roller gears 6e, 6f integrated with the rubber rollers 6a, 6b via the gear row 8. Meanwhile, in this state, the gear 10f is meshed with the lower portion of the gear 10d so as to transmit the drive force. However, the pinion 10g integrated with the gear 10f is not meshed with the rack 30.

When the motor 9 is driven in the state shown in FIG. 31, the drive force of the motor 9 is transmitted to the roller gears 6e, 6f, so that the rubber rollers 6a, 6b are rotated. By this rotation of the rubber rollers 6a, 6b, the disk can be conveyed to the replayable position. At this time, the drive force of the motor 9 functions as disk conveying force. At this time, the drive force of the motor 9 is also transmitted to the pinion 10g and the pinion is rotated. However, the pinion is not yet meshed with the rack 30.

When the disk is conveyed in the arrow A1 direction to the replayable position, as described above, the slide cam member 16 slides in the arrow A2 direction. Thereby, the rack 30 and the pinion 10g are meshed with each other. At this time, since the drive force of the motor 9 is transmitted to the pinion 10g and the pinion is rotated, the slide cam member 16 further slides in the arrow A2 direction. By this sliding of the slide cam member 16, the clutch plate 11 is rotated in the arrow A13 direction as described above with reference to FIGS. 28 and 29. By this rotation, the gear 10c provided on the clutch plate 11 moves in the arrow A13 direction at the same time. Thereby, as shown in FIG. 32, meshing between the gear 10b provided on the mechanical chassis 12 and the gear 10c is released, so that the rotation of the rubber rollers 6a, 6b is stopped.

Figure 32:
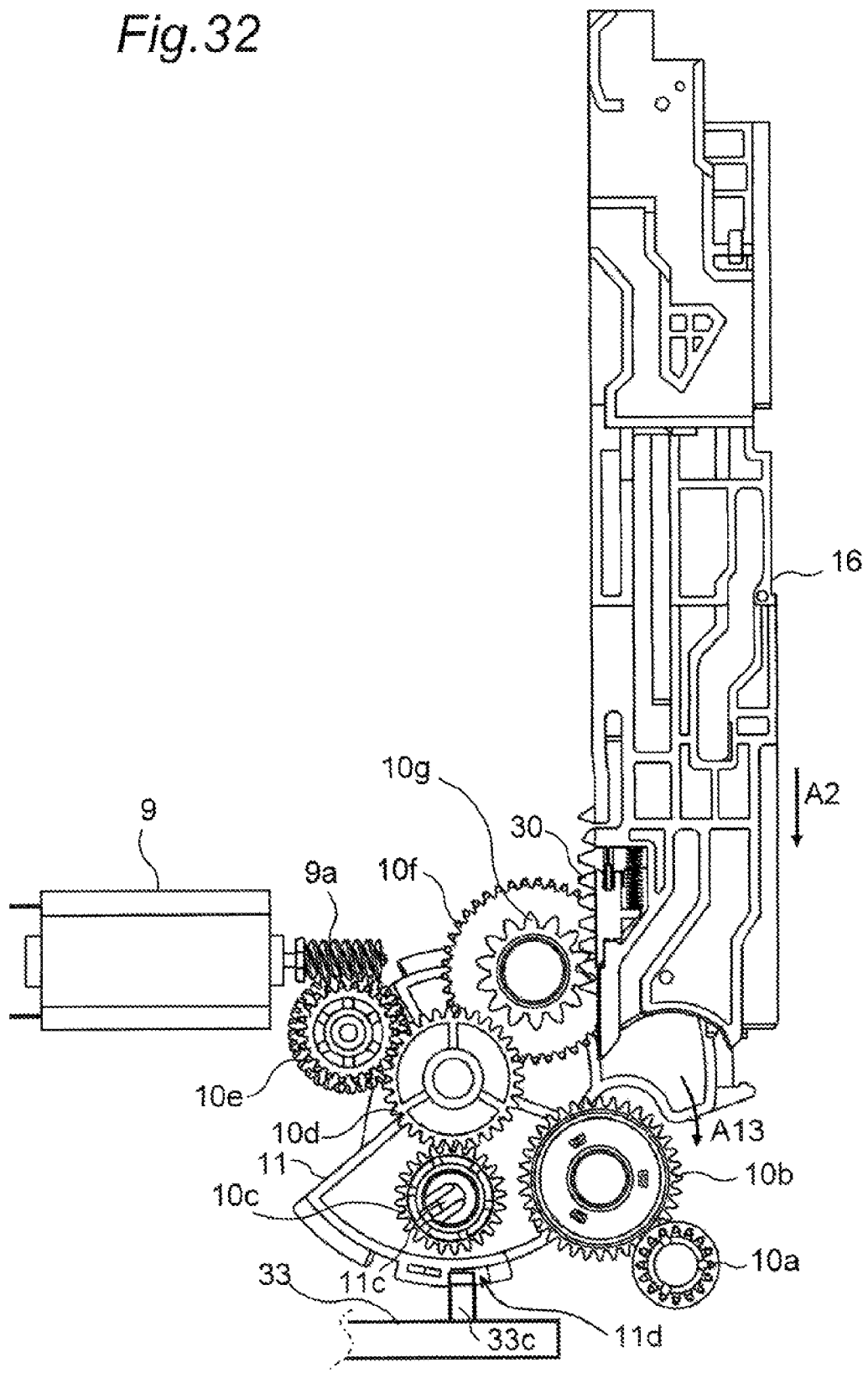
FIG. 32 is a top view showing a positional relationship of the parts relating to the clutch plate during a disk installment operation.

FIG. 32 is a top view showing a positional relationship of the parts relating to the clutch plate during the disk installment operation. At this time, the drive force of the motor 9 is transmitted only to the pinion 10g via the worm gear 9a, the gear 10e, the gear 10d, and the gear 10f. When the slide cam member 16 further slides in the A2 direction by the rotation of the pinion 10g meshed with the rack 30, as described above, the engagement pin 11b of the clutch plate 11 moves to the second cam portion 16p-2 of the cam 16p, so that the rotation of the clutch plate 11 is regulated. In the state that the engagement pin 11b is placed in the second cam portion 16p-2, further movement of the slide cam member 16 in the A2 direction is allowed. When the slide cam member 16 slides to the position shown in FIG. 29, the drive of the motor 9 is stopped. In this process of rotating the clutch plate 11 from this first cam portion 16p-1 to the second cam portion 16p-2, the disk is installed onto the turntable 13 and is brought into the installment completion state shown in FIG. 33.

Figure 33:
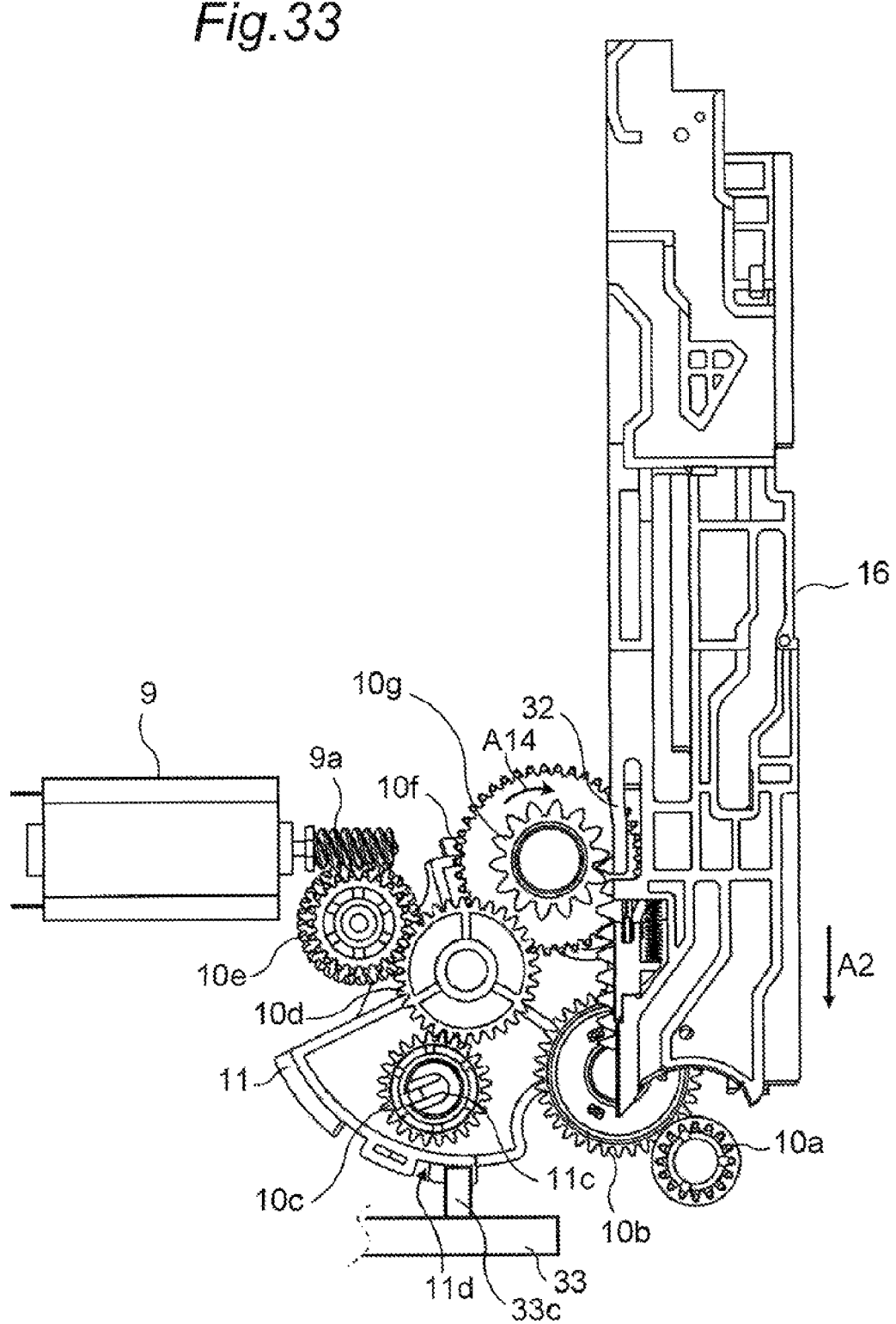
FIG. 33 is a top view showing a positional relationship of the parts relating to the clutch plate after completion of the disk installment operation.

FIGS. 33, 26, and 27 show a state after completion of the same disk installment operation. In this state, meshing between the pinion 10g and the rack 30 is retained. This state is maintained until the motor 9 is reversely driven for the disk ejection and the drive force in the opposite direction to that of the conveyance of the disk is transmitted to the rack 30. It is noted that the clutch plate 11 shown in FIG. 33 is slightly rotated in the arrow A13 direction in comparison to the state of FIG. 32.

Next, with reference to FIGS. 34 to 38, a configuration of the clamper lifters 23a, 23b and parts relating to those clamper lifters will be described in detail. FIG. 34 is an exploded perspective view showing the configuration of the clamper 21, the upper base 22, and the clamper lifters 23a, 23b. The clamper lifters 23a, 23b are movable in opposite directions to each other in the horizontal direction orthogonal to the thickness direction of the disk device in conjunction with the movement of the pair of slide cam members 16, 18.

A clamper support portion 41a capable of supporting one part of an outer peripheral part of the clamper 21 is provided in one end of the clamper lifter 23a. A cam shaft 42a passing through a guide hole 22m formed in the upper base 22, the cam shaft being engageable with the cam groove (also called a lifter cam) 16m formed in the slide cam member 16, is provided in the other end of the clamper lifter 23a.

A through hole 43a engageable with a projection 45a formed in the upper base 22 is formed in the clamper lifter 23a. The projection 45a is provided so as to protrude upward in a peripheral part of the opening portion 22a of the upper base 22. Projections 45b to 45d are provided so as to protrude upward in the peripheral part of the opening portion 22a of the upper base 22. The projection 45b is provided at a position facing the projection 45a relative to the opening portion 22a, and the projection 45c and the projection 45d are provided so as to face each other relative to the opening portion 22a in the disk conveying direction. The projections 45a to 45d act as regulating pieces for regulating the clamper 21 from moving in the horizontal direction.

A guide hole 44a engageable with a projection 46a formed in the upper base 22 is formed in the clamper lifter 23a. The guide hole 44a is formed so as to extend in the crossing direction (such as the orthogonal direction) to the disk conveying direction. The projection 46a is formed so as to protrude upward between the projection 45a and the guide hole 22m. By sliding of the projection 46a in the guide hole 44a, the moving direction of the clamper lifter 23a is regulated so that the clamper lifter 23a is moved in the crossing direction to the disk conveying direction.

The clamper lifter 23b has the same configuration as the clamper lifter 23a. In other words, a clamper support portion 41b capable of supporting one part of the outer peripheral part of the clamper 21 is provided in one end of the clamper lifter 23b. A cam shaft 42b passing through a guide hole 22n formed in the upper base 22, the camshaft being engageable with the cam groove (also called a lifter cam) 18c formed in the slide cam member 18 is provided in the other end of the clamper lifter 23b. A through hole 43b engageable with the above described projection 45b is formed in the clamper lifter 23b. A guide hole 44b engageable with a projection 46b formed in the upper base 22 is formed in the clamper lifter 23b. The guide hole 44b is formed so as to extend in the crossing direction (such as the orthogonal direction) to the disk conveying direction. The projection 46b is formed so as to protrude upward between the projection 45b and the guide hole 22n. By sliding of the projection 46b in the guide hole 44b, the moving direction of the clamper lifter 23b is regulated so that the clamper lifter 23b is moved in the crossing direction to the disk conveying direction.

Figure 35A:
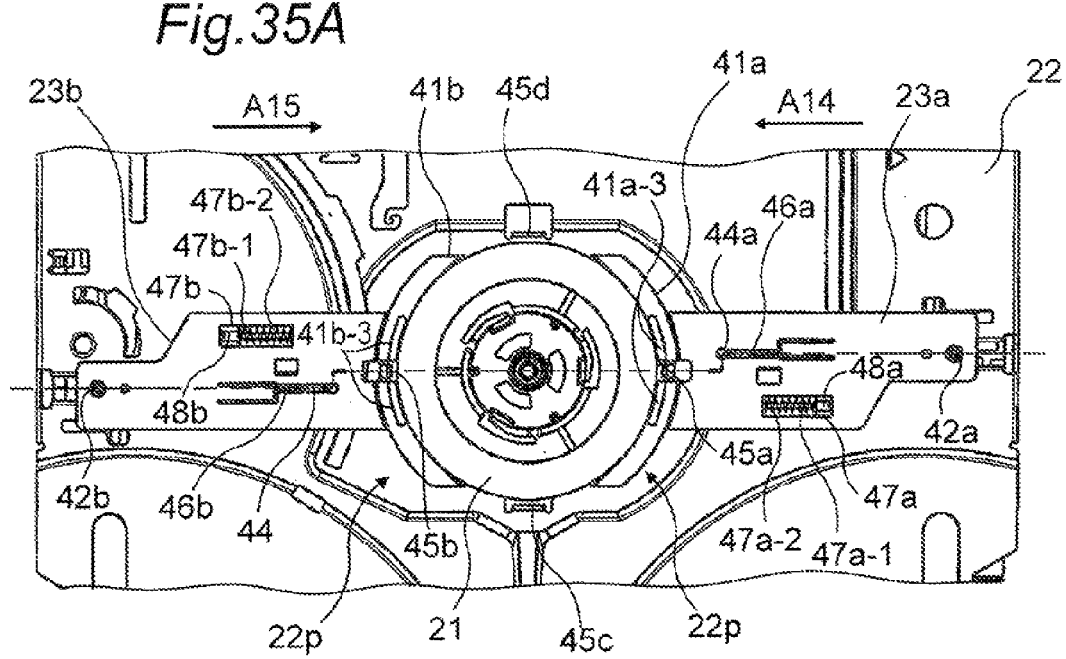
FIG. 35A is a top view showing a state in which the clamper is supported by clamper support portions for the clamper of the pair of clamper lifters.

Next, a relationship between the clamper 21 and the clamper lifters 23a, 23b will be described. FIG. 35A is a top view showing a state in which the clamper 21 is supported by the clamper support portions 41a, 41b of the clamper lifters 23a, 23b, and FIG. 35B is a sectional view thereof.

Figure 35B:
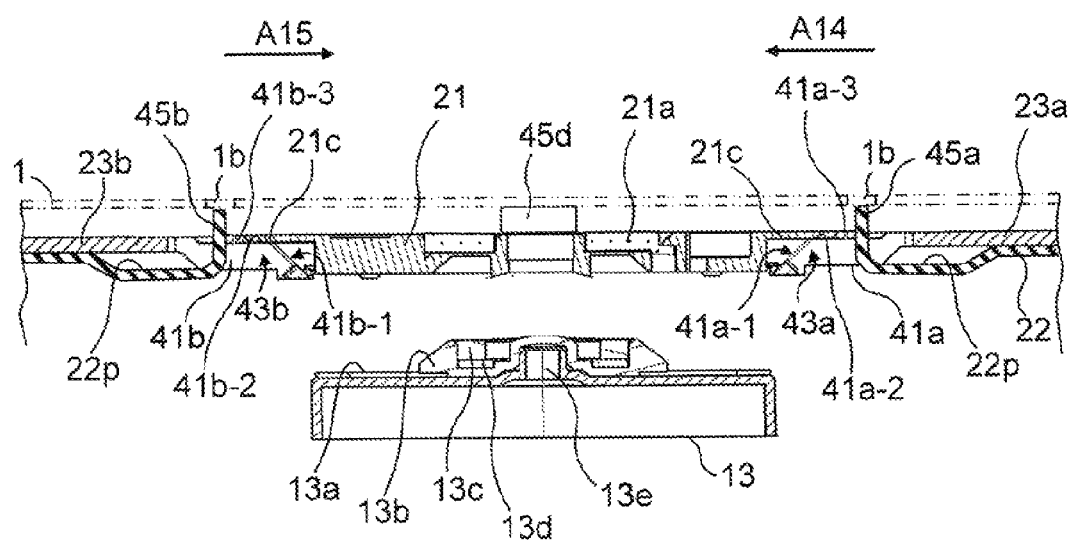
FIG. 35B is a sectional view of parts relating to the clamper in the state shown in FIG. 35A.

As shown in FIGS. 35A and 35B, in a state in which the clamper 21 is supported by the clamper support portions 41a, 41b, a position in the horizontal direction which is the normal direction to the axial direction of the clamper 21 is regulated by the projections 45a, 45b, 45c, 45d formed in the upper base 22. As described above, the upper base 22 is fixed to the mechanical chassis 12. The mechanical chassis 12 is nipped and fixed between the upper cover 1 and the lower cover 2. That is, the position of the clamper 21 is regulated by the upper cover 1 and the lower cover 2 via the upper base 22.

As shown in FIG. 35B, in a state in which the upper base 22 is fixed to the upper cover 1 and the lower cover 2 via the mechanical chassis 12, at least one of the projections 45a, 45b, 45c, 45d (the projection 45d in FIG. 35B) is contacted with an inner surface of the upper cover 1. Thereby, the upper base 22 is positioned in the up and down direction (the thickness direction). Other projections (45a, 45b in FIG. 35B) face a hole 1b provided at a corresponding position of the upper base 22, and the projections (45a, 45b in FIG. 35B) are not contacted with the upper cover 1. Thereby, a size error of the projections 45a, 45b, 45c, 45d can be solved. For example, the mechanical chassis 12 can be easily nipped and fixed between the upper cover 1 and the lower cover 2. It is noted that a plurality of projections among the projections 45a, 45b, 45c, 45d may be contacted with the inner surface of the upper cover 1. By contacting at least one of the projections 45a, 45b, 45c, 45d with the inner surface of the upper cover 1, a fixed gap (space) can be formed between the inner surface of the upper cover 1 and an upper surface of the upper base 22. By this gap, the sliding of the above described clamper lifters 23a, 23b in the arrow A14 or A15 direction can be reliably performed without any problem. It is noted that this gap may be provided so as to have a minimum extra margin for size in the thickness direction of the clamper lifters 23a, 23b, and a moving range in the axial direction of the clamper 21. Thereby, the entire device can be thinner.

As shown in FIGS. 34, 35A, and 35B, a concave portion 22p recessed slightly downward relative to a main surface of the upper base 22 is formed in the peripheral part of the opening portion 22a of the upper base 22 supporting the clamper 21. The clamper support portions 41a, 41b of the clamper lifters 23a, 23b are formed so as to be fitted into the concave portion 22p. That is, the clamper support portions 41a, 41b are formed so as to protrude downward in the thickness direction. Front edges of the clamper support portions 41a, 41b are formed into an arc shape along a circumferential part of the clamper 21. Inclined surfaces 41a-1, 41b-1 inclined so that lower edges are on the front side, are formed on the front edges of the clamper support portions 41a, 41b.

Step portions 41a-2, 41b-2 recessed downward relative to upper surfaces of the clamper lifters 23a, 23b are formed in the clamper support portions 41a, 41b as surfaces supporting a flange portion 21c formed in the outer peripheral part of the clamper 21. Clamper regulating ribs 41a-3, 41b-3 for regulating the movement in the horizontal direction of the clamper 21 are formed on surfaces of the step portions 41a-2, 41b-2. The size in the height direction of the step portions 41a-2, 41b-2 and the clamper regulating ribs 41a-3, 41b-3 of the clamper support portions 41a, 41b is formed so as to be substantially the same as the size in the thickness direction of the flange portion 21c of the clamper 21. Therefore, as shown in FIG. 35B, in a state in which the clamper 21 is supported by the clamper support portions 41a, 41b, an upper surface of the clamper 21 and the upper surfaces of the clamper lifters 23a, 23b are substantially flush with each other.

It is noted that as shown in FIG. 35B, the turntable 13 is provided with a disk mount surface 13a, a centering member 13b for the disk, a magnet 13c, a yoke 13d, and a bearing portion 13e. The disk mounted on the disk mount surface 13a is positioned in the horizontal direction by the centering member 13b. In this state, by attracting the yoke 21a of the clamper 21 to the magnet 13c with magnetic force, the disk is held on the turntable 13. That is, the disk is nipped between the clamper 21 and the turntable 13 and brought into a replayable clamping state.

As shown in FIG. 35A, holes 47a, 47b are formed in the clamper lifters 23a, 23b. The holes 47a, 47b are formed so as to extend in the arrow A14 and A15 directions. A pin 47a-1 protrudes in the hole 47a so as to extend in the arrow A15 direction from an edge on the side of the clamper 21. A pin 47b-1 protrudes in the hole 47b so as to extend in the arrow A14 direction from an edge on the side of the clamper 21. Coil springs 47a-2, 47b-2 are attached to peripheries of the pins 47a-1, 47b-1. Holes 48a, 48b are formed in the upper base 22 at positions corresponding to the holes 47a, 47b. The coil spring 47a-2 is contacted with an edge of the hole 48a of the upper base 22 on the opposite side of the clamper 21 so as to press a side edge of the hole 47a on the side of the clamper 21, and to bias the clamper lifter 23a in the arrow A14 direction. The coil spring 47b-2 is contacted with an edge of the hole 48b of the upper base 22 on the opposite side of the clamper 21 so as to press a side edge of the hole 47b on the side of the clamper 21, and to bias the clamper lifter 23b in the arrow A15 direction. That is, at a normal time, as shown in FIGS. 35A and 35B, the clamper lifters 23a, 23b support the clamper 21 on the surfaces of the step portions 41a-2, 41b-2, so that the clamper 21 is positioned on the upper side of an axis thereof.

Figure 36A:
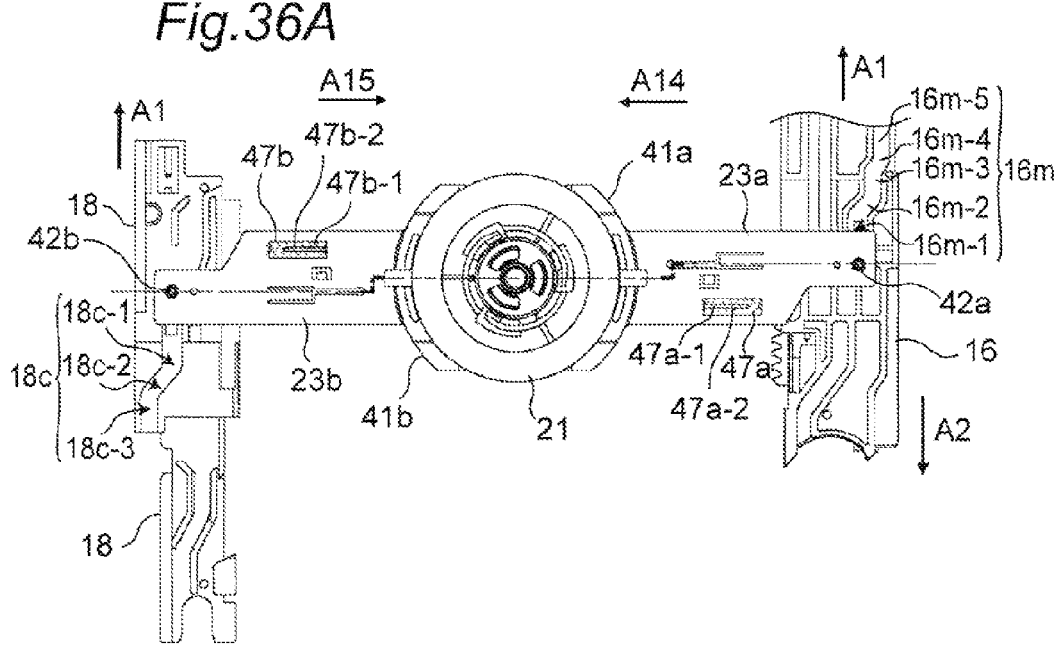
FIG. 36A is a top view showing an engagement relationship between the pair of clamper lifters and a pair of slide cam members in a standby state before the disk is brought into a clamping state.
Figure 36B:
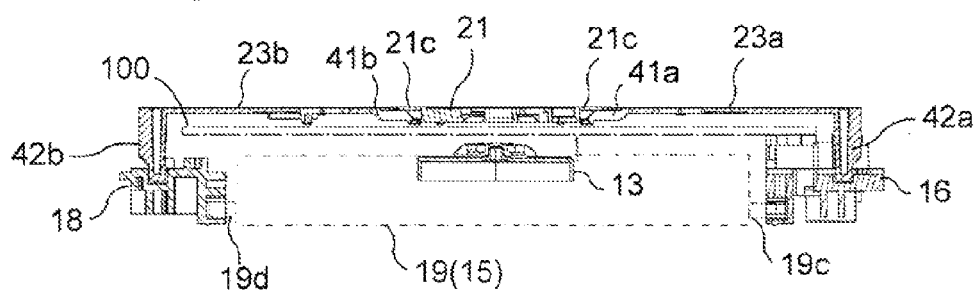
FIG. 36B is a sectional view of the parts relating to the clamper in the state shown in FIG. 36A.
Figure 36C:
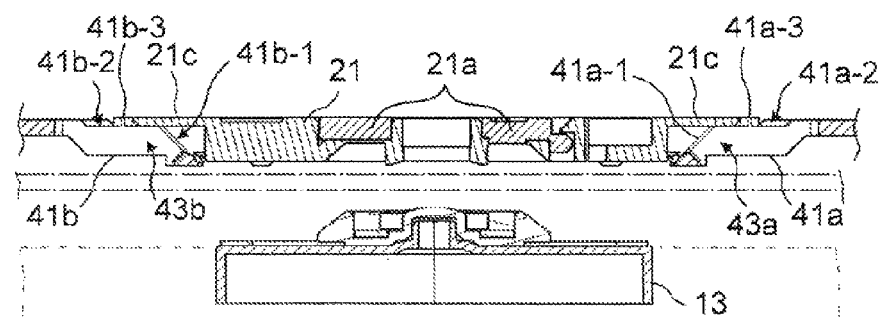
FIG. 36C is a partially enlarged sectional view of FIG. 36B.

Next, an engagement relationship between the clamper lifters 23a, 23b and the slide cam members 16, 18 will be described in detail. Firstly, a configuration of the lifter cam 16m of the slide cam member 16 and the lifter cam 18c of the slide cam member 18 will be described. FIG. 36A is a top view showing the engagement relationship between the clamper lifters 23a, 23b and the slide cam members 16, 18 in a standby state before the disk is brought into the clamping state, and FIG. 36B is a sectional view thereof. FIG. 36C is a partially enlarged sectional view of FIG. 36B.

As shown in FIG. 36A, the lifter cam 16m of the slide cam member 16 has a configuration that a first parallel cam portion 16m-1, a first inclined cam portion 16m-2, a second parallel cam portion 16m-3, a second inclined cam portion 16m-4, and a third parallel cam portion 16m-5 are formed in a stair-like form. The first parallel cam portion 16m-1, the second parallel cam portion 16m-3, and the third parallel cam portion 16m-5 are provided in parallel to the sliding direction (the arrow A1 or A2 direction) of the slide cam member 16. The first parallel cam portion 16m-1 and the second parallel cam portion 16m-3 are coupled by the first inclined cam portion 16m-2 provided in the direction crossing the sliding direction of the slide cam member 16. The second parallel cam portion 16m-3 and the third parallel cam portion 16m-5 are coupled by the second inclined cam portion 16m-4 provided in the direction crossing the sliding direction of the slide cam member 16.

The lifter cam 18c of the slide cam member 18 has a configuration in which a first parallel cam portion 18c-1, an inclined cam portion 18c-2, and a second parallel cam portion 18c-3 are formed in a stair-like form. The first parallel cam portion 18c-1 and the second parallel cam portion 18c-3 are provided in parallel to the sliding direction (the arrow A1 or A2 direction) of the slide cam member 18. The first parallel cam portion 18c-1 and the second parallel cam portion 18c-3 are coupled by the inclined cam portion 18c-2 provided in the direction crossing the sliding direction of the slide cam member 18.

Next, with reference to FIGS. 36A to 38C, an operation of the clamper lifters 23a, 23b will be described. This operation is performed in conjunction with the installment operation of the disk to the turntable 13 performed successively after completion of the above described disk conveyance operation.

FIG. 36A shows a state in which the disk is not inserted into the device or a state in which the disk is being conveyed after insertion, which is a state in which the disk is not yet conveyed to the replayable position. In this state, as described above, the clamper lifter 23a is biased in the arrow A14 direction, and the clamper lifter 23b is biased in the arrow A15 direction. The clamper lifter 23a supports the clamper 21 by the step portion 41a-2 of the clamper support portion 41a. The clamper lifter 23b supports the clamper 21 by the step portion 41b-2 of the clamper support portion 41b. The movement in the arrow A14 and A15 directions of the clamper 21 is regulated by the clamper regulating rib 41a-3 of the clamper support portion 41a, and the clamper regulating rib 41b-3 of the clamper support portion 41b.

In a state shown in FIGS. 36A to 36C, the cam shaft 42a of the clamper lifter 23a is engaged with the first parallel cam portion 16m-1 of the lifter cam 16m, and the cam shaft 42b of the clamper lifter 23b is engaged with the first parallel cam portion 18c-1 of the lifter cam 18c. At this time, the slide cam members 16, 18 are in the above described state shown in FIG. 25. The turntable 13 is in a lowered state, and a gap into which the disk 100 can be conveyed is formed between the clamper 21 and the clamper lifters 23a, 23b, and the turntable 13. The disk 100 shown by a one-chain line in FIGS. 36B and 36C indicates a conveyance position of the disk 100 in the gap. In this state, the clamper 21 is supported in a parallel state to the conveyance position of the disk 100, and the movement in the arrow A14 and A15 directions is regulated by the clamper regulating ribs 41a-3, 41b-3. It is noted that even when the flange portion 21c of the clamper 21 goes over the clamper regulating ribs 41a-3, 41b-3, the movement in the horizontal direction is regulated by the projections 45a, 45b, 45c, 45d. Thus, a center of the clamper 21 is not significantly displaced from a center of the turntable 13.

When the disk 100 is conveyed in the arrow A1 direction from the state shown in FIGS. 36A to 36C to the replayable position, as described above, the trigger lever 25 pressed by the disk 100 is rotated, and the slide cam member 16 slides in the arrow A2 direction. Thereby, the rack 30 is meshed with the rotating pinion 10g, and the slide cam member 16 further slides in the arrow A2 direction. In conjunction with this sliding of the slide cam member 16, the slide cam member 18 coupled to the slide cam member 16 via the link arm 17 slides in the arrow A1 direction. By this sliding of the slide cam members 16, 18, as described above, the turntable 13 is raised and brought into a state shown in FIGS. 37A to 37C.

Figure 37A:
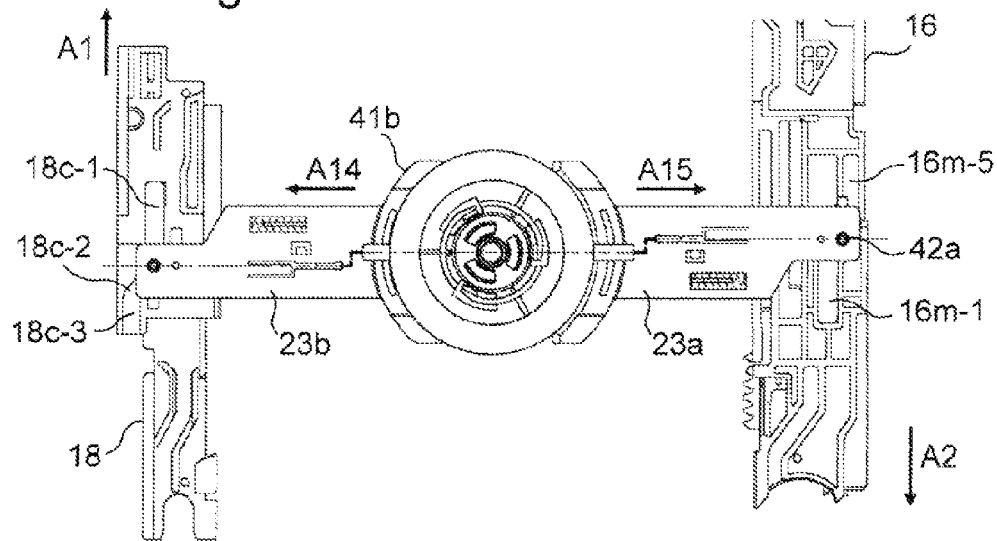
FIG. 37A is a top view of the clamper and the pair of clamper lifters in a state in which the disk is being brought into the clamping state.
Figure 37B:
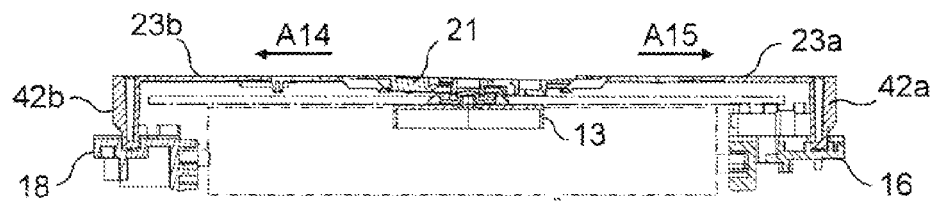
FIG. 37B is a sectional view of the clamper and the pair of clamper lifters in the state shown in FIG. 37A.
Figure 37C:
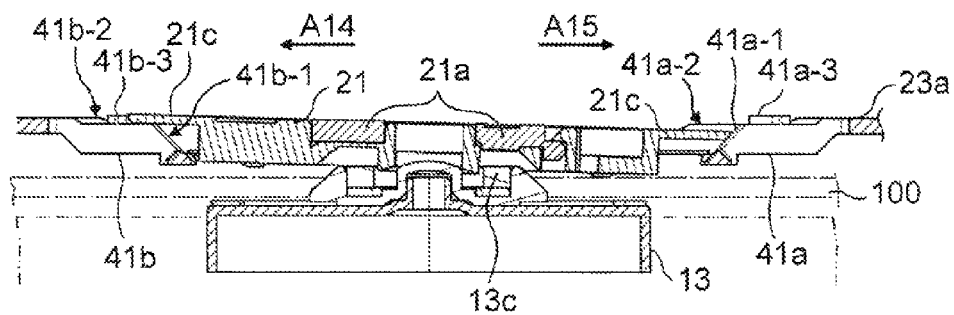
FIG. 37C is a partially enlarged sectional view of FIG. 37B.

In the state shown in FIGS. 37A to 37C, the cam shaft 42a of the clamper lifter 23a is moved from the first parallel cam portion 16m-1 of the lifter cam 16m to the second parallel cam portion 16m-3 via the first inclined cam portion 16m-2. In this moving process of the cam shaft 42a, the clamper lifter 23a is moved in the arrow A15 direction by the first inclined cam portion 16*m*-2. Meanwhile, the cam shaft 42*b* of the clamper lifter 23*b* is still engaged with the first parallel cam portion 18*c*-1 of the lifter cam 18*c*, and not yet moved in the arrow A14 direction. Therefore, as shown in FIGS. 37B and 37C, when the yoke 21*a* of the clamper 21 is attracted by force of the magnet 13*c* of the turntable 13, the clamper 21 is brought into an inclined state in which the side supported by the clamper support portion 41*a* of the clamper lifter 23*a* is contacted with the disk. That is, a peripheral part of the flange portion 21*c* of the clamper 21 on the side of the clamper lifter 23*a* is moved downward from the step portion 41*a*-2 along the inclined surface 41*a*-1 in accordance with the sliding in the arrow A15 direction of the clamper lifter 23*a*. Meanwhile, a peripheral part of the flange portion 21*c* of the clamper 21 on the side of the clamper lifter 23*b* is still mounted on the step portion 41*b*-2 of the clamper support portion 41*b*.

When the slide cam member 16 slides in the arrow A2 direction and the slide cam member 18 slides in the arrow A1 direction further from the state shown in FIGS. 37A to 37C, the cam shaft 42*a* of the clamper lifter 23*a* is moved from the second parallel cam portion 16*m*-3 of the lifter cam 16*m* to the third parallel cam portion 16*m*-5 via the second inclined cam portion 16*m*-4. By this movement, the clamper lifter 23*a* is further moved in the arrow A15 direction by the second inclined cam portion 16*m*-4. At this time, the camshaft 42*b* of the clamper lifter 23*b* is moved from the first parallel cam portion 18*c*-1 to the second parallel cam portion 18*c*-3 via the inclined cam portion 18*c*-2. In this moving process of the camshaft 42*b*, the clamper lifter 23*b* is moved in the arrow A14 direction by the inclined cam portion 18*c*-2. By this movement of the clamper lifter 23*b*, the peripheral part of the flange portion 21*c* of the clamper 21 on the side of the clamper lifter 23*b* is moved downward along the inclined surface 41*b*-1. After that, as shown in FIG. 27 described above, when the movement of the slide cam members 16, 18 is completed, the state becomes as shown in FIGS. 38A to 38C.

Figure 38A:
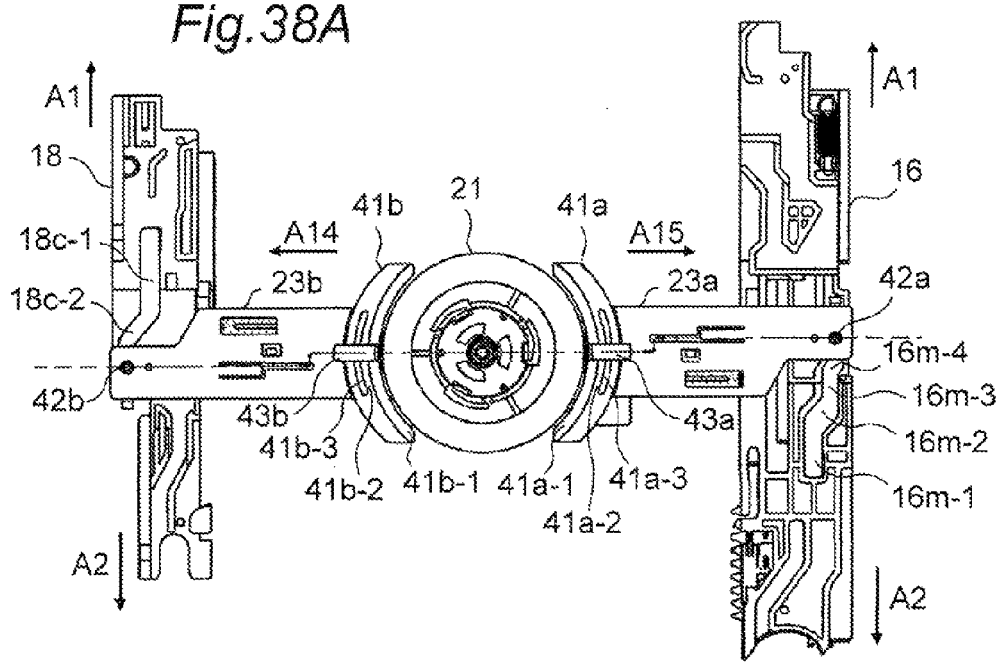
FIG. 38A is a top view of the clamper and the pair of clamper lifters when the disk is in the clamping state.
Figure 38B:
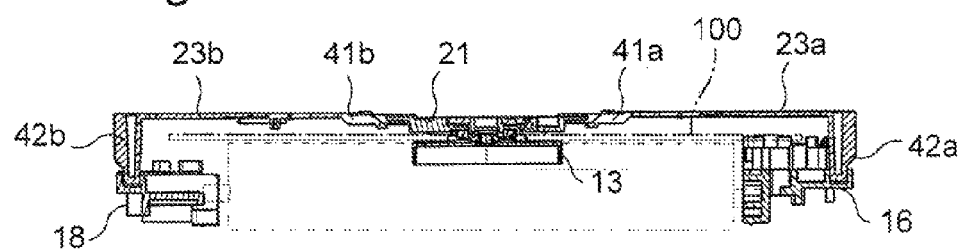
FIG. 38B is a sectional view of the clamper and the pair of clamper lifters in the state shown in FIG. 38A.
Figure 38C:
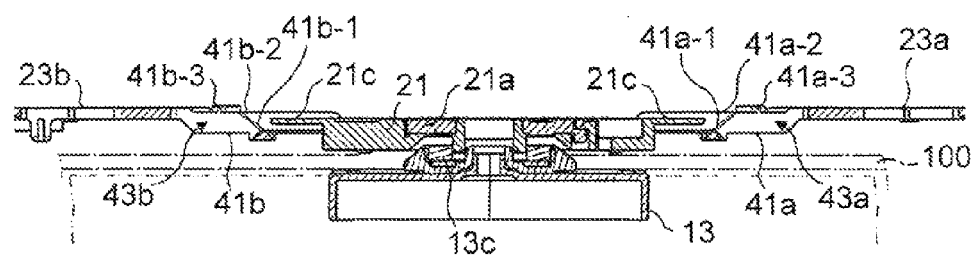
FIG. 38C is a partially enlarged sectional view of FIG. 38B.

FIGS. 38A to 38C show a state in which the clamper 21 is attracted onto the turntable 13 and a clamping operation is completed, that is, an installment completion state in which the disk 100 is held on the turntable 13. In this state shown in FIGS. 38A to 38C, the clamper lifters 23*a*, 23*b* are respectively moved in the arrow A14 or A15 direction to an utmost extent. The flange portion 21*c* of the clamper 21 is away from the step portions 41*a*-2, 41*b*-2, and the inclined surfaces 41*a*-1, 41*b*-1 of the clamper support portions 41*a*, 41*b*. That is, there is no problem in rotation of the clamper 21 by rotation of the turntable 13. Therefore, in this state, by rotating the turntable 13, the disk 100 clamped by the clamper 21 can be replayed.

Next, an operation for cancelling the clamping state of the disk shown in FIGS. 38A to 38C and ejecting the disk to an exterior of the device will be described.

When disk ejection is commanded in the state shown in FIGS. 38A to 38C, as described above, the slide cam member 16 starts the movement in the arrow A1 direction and the slide cam member 18 starts the movement in the arrow A2 direction by the drive of the motor 9.

By the movement of the slide cam members 16, 18, the cam shaft 42*a* of the clamper lifter 23*a* is moved from the third parallel cam portion 16*m*-5 of the lifter cam 16*m* to the second parallel cam portion 16*m*-3 via the second inclined cam portion 16*m*-4. By this movement, the clamper lifter 23*a* is moved in the arrow A14 direction by the second inclined cam portion 16*m*-4. By this movement of the clamper lifter 23*a*, the peripheral part of the flange portion 21*c* of the clamper 21 on the side of the clamper lifter 23*a* is moved upward along the inclined surface 41*a*-1, and brought into the state shown in FIGS. 37A to 37C. That is, the peripheral part of the flange portion 21*c* of the clamper 21 on the side of the clamper lifter 23*a* is contacted with the inclined surface 41*a*-1, and one part of the clamper 21 on the side of the clamper lifter 23*a* is contacted with the disk.

By the movement of the slide cam members 16, 18, the cam shaft 42*b* of the clamper lifter 23*b* is moved from the second parallel cam portion 18*c*-3 of the lifter cam 18*c* to the first parallel cam portion 18*c*-1 via the inclined cam portion 18*c*-2. By this movement, the clamper lifter 23*b* is moved in the arrow A15 direction by the inclined cam portion 18*c*-2. By this movement of the clamper lifter 23*b*, the peripheral part of the flange portion 21*c* of the clamper 21 on the side of the clamper lifter 23*b* is moved upward along the inclined surface 41*b*-1, and brought into the state shown in FIGS. 37A to 37C.

By this change from the state shown in FIG. 38 to the state shown in FIG. 37, the peripheral part of the flange portion 21*c* of the clamper 21 on the side of the clamper lifter 23*b* is mounted on the step portion 41*b*-2 of the clamper support portion 41*b*. Meanwhile, although the peripheral part of the flange portion 21*c* of the clamper 21 on the side of the clamper lifter 23*a* is contacted with the inclined surface 41*a*-1, one part of the peripheral part of the clamper 21 on the side of the clamper lifter 23*a* is still contacted with the disk 100. That is, when the state shown in FIG. 38 is changed to the state shown in FIG. 37, the clamper 21 is detached from the disk mounted on the turntable 13 from the part on the side of the clamper lifter 23*b*. The clamper 21 is detached from the disk by making the peripheral part of the flange portion 21*c* slide on the inclined surfaces 41*a*-1, 41*b*-1. Thereby, the clamper 21 can be easily detached from the disk with a light load.

When the slide cam members 16, 18 slide in the arrow A1 or A2 direction further from the state shown in FIGS. 37A to 37C, the cam shaft 42*a* of the clamper lifter 23*a* is moved from the second parallel cam portion 16*m*-3 of the lifter cam 16*m* to the first parallel cam portion 16*m*-1 via the first inclined cam portion 16*m*-2. By this movement, the clamper lifter 23*a* is further moved in the arrow A14 direction by the first inclined cam portion 16*m*-2. By this movement of the clamper lifter 23*a*, the peripheral part of the flange portion 21*c* of the clamper 21 on the side of the clamper lifter 23*a* is moved upward along the inclined surface 41*a*-1, and brought into the state shown in FIGS. 36A to 36C. That is, in a process of this operation, the peripheral part of the flange portion 21*c* of the clamper 21 on the side of the clamper lifter 23*a* is also completely detached from the disk 100.

In the state shown in FIGS. 36A to 36C, as described above, the turntable 13 is in a lowered state, and the gap into which the disk can be conveyed is formed between the clamper 21 and the clamper lifters 23*a*, 23*b*, and the turntable 13. Therefore, an ejection operation of the disk can be performed.

According to the disk device of the first embodiment, the clamper lifters 23*a*, 23*b* are formed so as to be moved in the opposite directions to each other in the horizontal direction orthogonal to the thickness direction of the device. Thus, there is no need for a space in which the clamper lifters 23*a*, 23*b* are rotated. Therefore, a further thinner and smaller disk device can be realized.

According to the disk device of the first embodiment, the timing of the clamper lifters 23*a*, 23*b* to start movement are different from each other, and the clamper support portions 41*a*, 41*b* have the inclined surfaces 41*a*-1, 41*b*-1. Thereby, the part of the flange portion 21*c* of the clamper 21 on the side of the clamper lifter 23*a* and the part on the side of the clamper lifter 23*b* can slide along the inclined surface 41*a*-1 and the inclined surface 41*b*-1 with a time difference. As a result, an impact force and impact sound when the clamper 21 is brought into contact with the disk 100 can be eased. A load required when the clamper 21 is brought away from the disk can be reduced.

It is noted that the inclined surfaces 41a-1, 41b-1 may be preferably formed so that size in the thickness direction of the disk device is smaller than size in the thickness direction of the clamper 21. Thereby, the size in the thickness direction of the clamper lifters 23a, 23b can be suppressed. As a result, a thinner and smaller disk device can be realized.

Preferably, thickness which is a sum of thickness of part of the clamper lifters 23a, 23b excluding the clamper support portions 41a, 41b, and the cam shafts 42a, 42b, and thickness of the upper base 22 is substantially equal to thickness of the clamper 21. Thereby, a configuration for performing the clamping operation can be suppressed substantially equally to the thickness of the clamper. As a result, a thinner and smaller disk device can be realized.

According to the disk device of the first embodiment, the upper base 22 has the plurality of projections 45a to 45d for regulating the clamper 21 from moving in the horizontal direction in the peripheral part of the opening portion 22a. Thereby, when the clamper lifters 23a, 23b are moved in the arrow A14 or A15 direction, the clamper 21 can be regulated from moving together with the clamper lifters 23a, 23b, and the disk can be more reliably brought into the clamping state at the replayable position.

According to the disk device of the first embodiment, at least one of the projections 45a to 45d is contacted with the inner surface of the upper cover 1 so as to form a fixed space permitting the movement of the clamper lifters 23a, 23b between the upper base 22 and the inner surface of the upper cover 1. Thereby, with a simple configuration, disturbance of the movement of the clamper lifters 23a, 23b in the arrow A14 or A15 direction can be prevented.

According to the disk device of the first embodiment, in conjunction with a series of the movement of the slide cam members 16, 18, the raising and lowering cams 16a, 18a perform an operation for raising and lowering the turntable 13, and the lifter cams 16m, 18c perform an operation for moving the clamper lifters 23a, 23b in the opposite directions to each other. Thereby, a series of operations of the disk conveyance operation and the disk installment operation can be simply and reliably performed.

Second Embodiment

Figure 39:
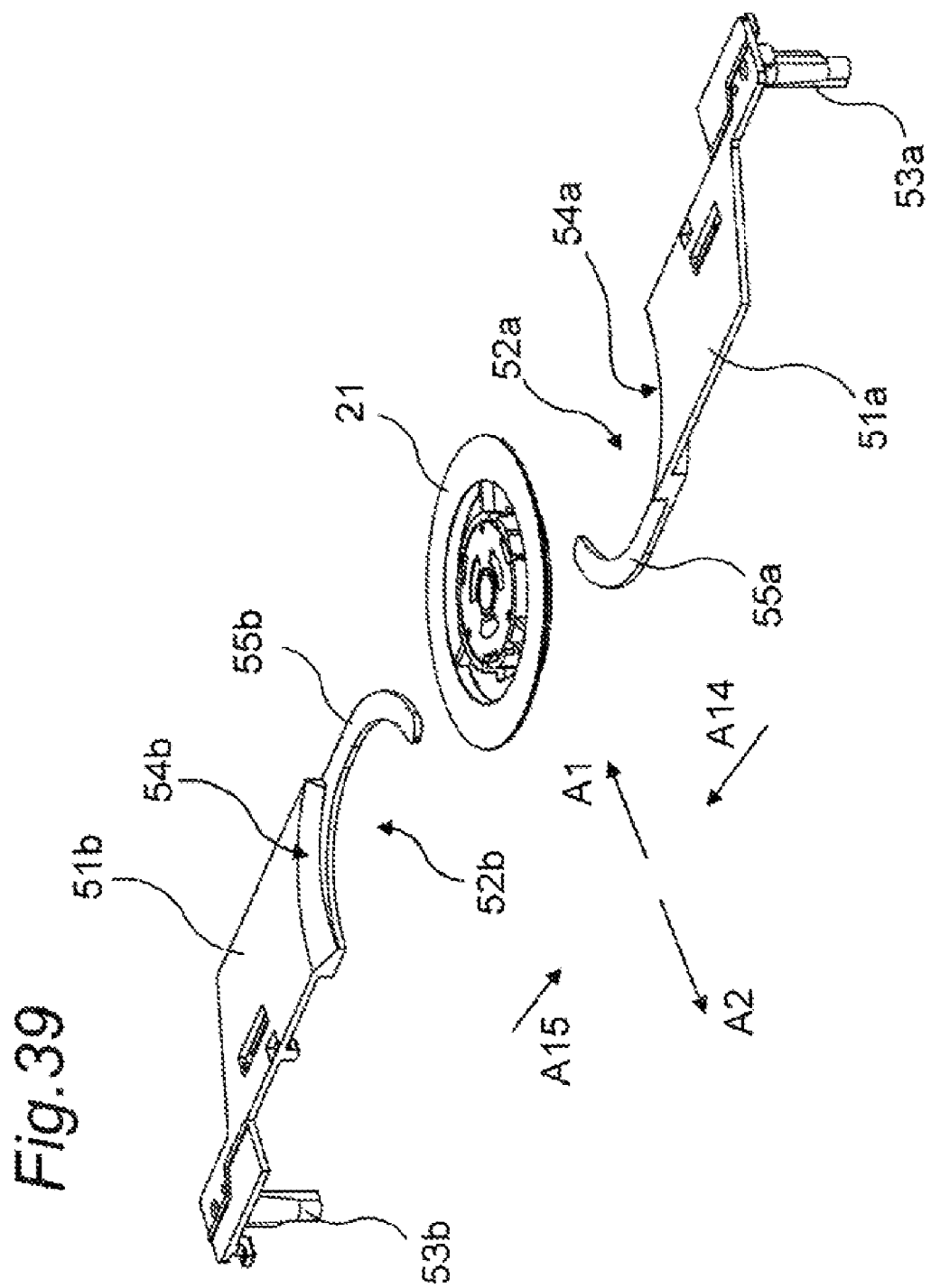
FIG. 39 is a perspective view showing a positional relationship between the clamper and a pair of clamper lifters of a disk device according to a second embodiment of the present invention.
Figure 40A:
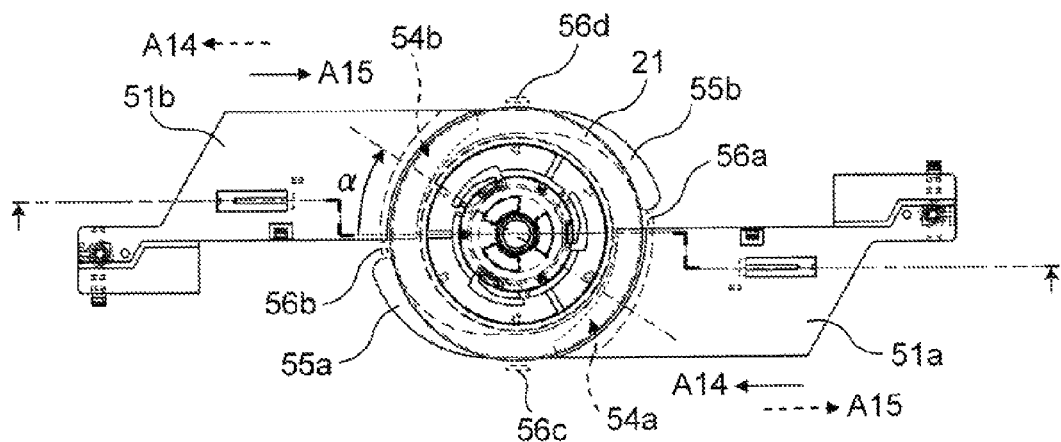
FIG. 40A is a top view showing a positional relationship between the clamper and the pair of clamper lifters in the standby state before the disk is brought into the clamping state in the disk device according to the second embodiment of the present invention.
Figure 40B:
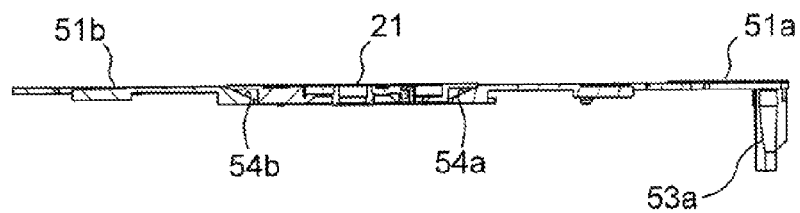
FIG. 40B is a sectional view of the clamper and the pair of clamper lifters in the state shown in FIG. 40A.
Figure 40C:
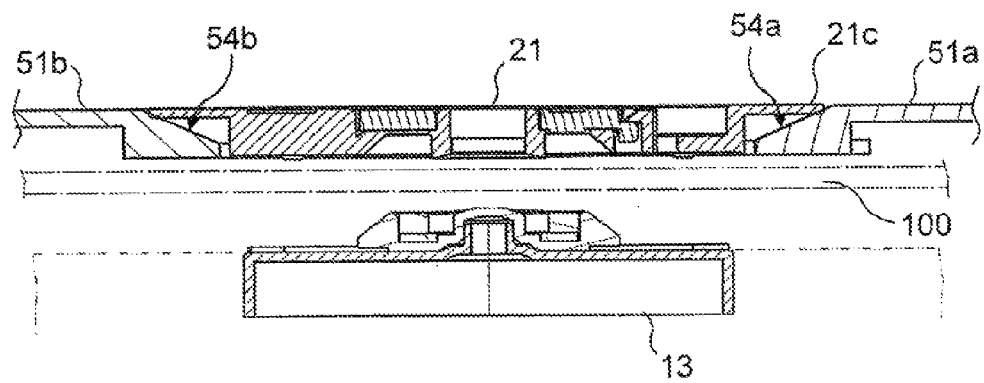
FIG. 40C is a partially enlarged sectional view of FIG. 40B.
Figure 41A:
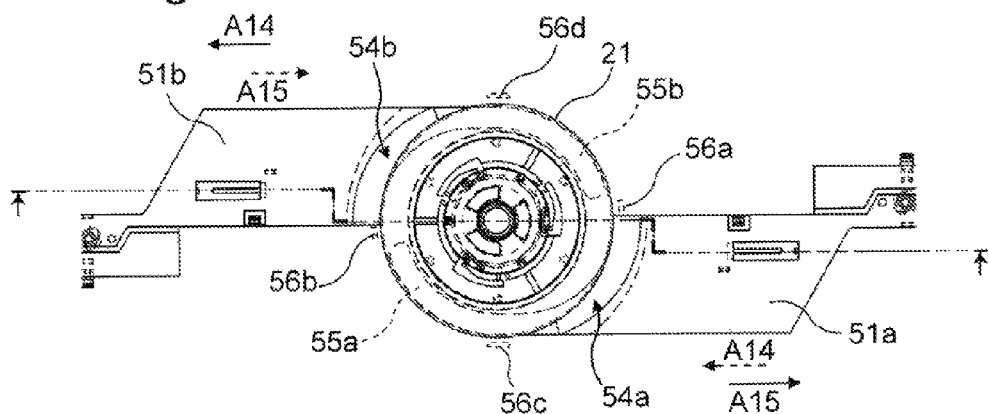
FIG. 41A is a top view showing a positional relationship between the clamper and the pair of clamper lifters when the disk is in the clamping state in the disk device according to the second embodiment of the present invention.
Figure 41B:
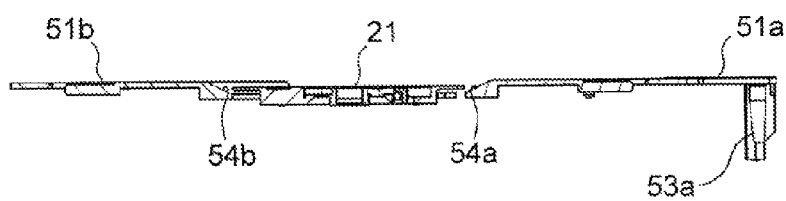
FIG. 41B is a sectional view of the clamper and the pair of clamper lifters in the state shown in FIG. 41A.
Figure 41C:
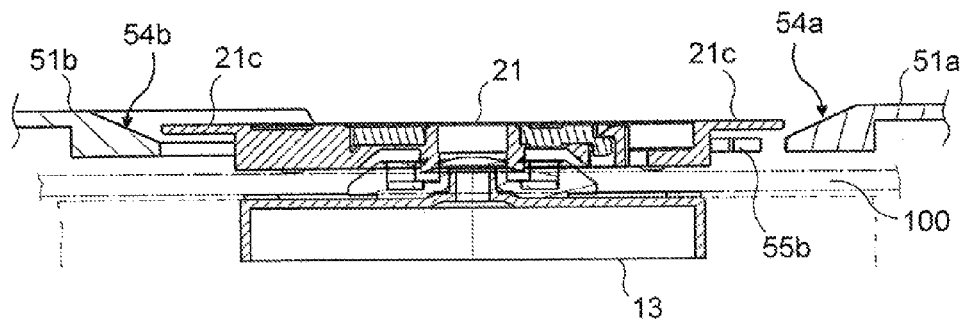
FIG. 41C is a partially enlarged sectional view of FIG. 41B.

A disk device according to a second embodiment of the present invention will be described with reference to FIGS. 39 to 41C. FIG. 39 is a perspective view showing the clamper and clamper lifters of the disk device according to the second embodiment of the present invention. FIG. 40A is a top view showing a positional relationship between the clamper and the clamper lifters in the standby state before the disk is brought into the clamping state, and FIG. 40B is a sectional view thereof. FIG. 40C is a partially enlarged sectional view of FIG. 40B. FIG. 41A is a top view showing a positional relationship between the clamper and the clamper lifters when the disk is in the clamping state, and FIG. 41B is a sectional view thereof. FIG. 41C is a partially enlarged sectional view of FIG. 41B. FIGS. 40C and 41C also show a positional relationship between the clamper, the clamper lifters, and the turntable.

The disk device of the second embodiment is mainly different from the disk device of the first embodiment in that clamper lifters 51a, 51b are provided in place of the clamper lifters 23a, 23b. Hereinafter, description of matters overlapping the disk device of the first embodiment will not be repeated, and different matters will be described.

As shown in FIG. 39, a clamper support portion 52a capable of supporting one part of the outer peripheral part of the clamper 21 is provided in one end of the clamper lifter 51a. A cam shaft 53a passing through the guide hole 22m formed in the upper base 22, the cam shaft being engageable with the lifter cam 16m formed in the slide cam member 16 is provided in the other end of the clamper lifter 51a. Similarly, a clamper support portion 52b capable of supporting one part of the outer peripheral part of the clamper 21 is provided in one end of the clamper lifter 51b. A cam shaft 53b passing through the guide hole 22n formed in the upper base 22, the cam shaft being engageable with the lifter cam 18c formed in the slide cam member 18 is provided in the other end of the clamper lifter 51b. By the sliding of the slide cam members 16, 18 in a state in which the cam shaft 53a is engaged with the lifter cam 16m and the cam shaft 53b is engaged with the lifter cam 18c, the clamper lifters 51a, 51b are moved in the opposite directions (the arrow A14 or A15 direction) to each other.

As shown in FIGS. 40A and 41A, the clamper support portion 52a is formed and displaced on the upstream side of the disk conveying direction A1 relative to a straight line in the arrow A14 or A15 direction passing through a center axis of the clamper 21. The clamper support portion 52b is formed and displaced on the downstream side of the disk conveying direction A1 relative to the straight line in the arrow A14 or A15 direction passing through the center axis of the clamper 21. That is, as shown in FIG. 40A, the clamper support portions 52a, 52b are formed so as to support the clamper 21 taking the direction displaced by a fixed angle α relative to the arrow A14 or A15 direction as a center.

The clamper support portions 52a, 52b are provided with inclined support portions 54a, 54b, and auxiliary support portions 55a, 55b formed into an arc shape so as to be along the outer peripheral part of the clamper 21 for supporting the clamper 21.

Inclined surfaces are formed in the inclined support portions 54a, 54b so that the clamper 21 can be moved in the axial direction (the up and down direction). The inclined surfaces are formed so that a curvature of an upper edge arc portion and a lower edge arc portion matches with a curvature of the peripheral part of the flange portion 21c of the clamper 21. The inclined surfaces of the inclined support portions 54a, 54b are formed so that centers of arcs of the upper edge arc portion and the lower edge arc portion are displaced so as to move the clamper 21 in the axial direction. That is, the inclined surfaces of the inclined support portions 54a, 54b are formed so that width of the upper edge arc portion and the lower edge arc portion is not equal in a plan view but becomes slightly narrower as approaching the auxiliary support portions 55a, 55b. An inclination angle of the inclined surfaces of the inclined support portions 54a, 54b is not fixed but becomes greater as approaching the auxiliary support portions 55a, 55b.

In the second embodiment, in order to regulate the clamper 21 so that the position in the horizontal direction is not displaced relative to the upper base 22, projections 56a, 56b, 56c, 56d having the same function and configuration as the projections 45a, 45b, 45c, 45d of the first embodiment are provided in the upper base (refer to FIGS. 40A, 41A).

The auxiliary support portions 55a, 55b are formed so as to regulate the clamper 21 from moving in the horizontal direction together with the projections 56a, 56b, 56c, 56d when the clamper lifters 51a, 51b slide in the opposite directions to each other and the clamper 21 is lowered from the state shown in FIG. 40A to the state shown in FIG. 41A. More specifically, inner peripheral parts of the auxiliary support portions 55a, 55b facing the peripheral part of the flange portion 21b of the clamper 21 are formed so as to have arcs with a slightly greater curvature than the peripheral part of the flange portion 21b.

According to the disk device of the second embodiment, the clamper support portions 52a, 52b are formed so as to support the clamper 21 taking the direction displaced by the fixed angle α relative to the arrow A14 or A15 direction as a center. With such a configuration, the clamper lifters 51a, 51b are also formed so as to be moved in the opposite directions to each other in the horizontal direction orthogonal to the thickness direction of the device. Thus, there is no need for a space in which the clamper lifters 51a, 51b are rotated. Therefore, the further thinner and smaller disk device can be realized.

According to the disk device of the second embodiment, the timing of the clamper lifters 51a, 51b to start movement are different from each other, and the inclined support portions 54a, 54b of the clamper support portions 52a, 52b have inclined surfaces. Thereby, a part of the flange portion 21c of the clamper 21 on the side of the clamper lifter 51a and a part on the side of the clamper lifter 51b can slide along the inclined surfaces with a time difference. As a result, the impact force and the impact sound when the clamper 21 is brought into contact with the disk can be eased. The load required when the clamper 21 is brought away from the disk can be reduced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese Patent Application No. 2010-148729 filed on Jun. 30, 2010, including specification, drawing and claims, is incorporated herein by reference in its entirety.

The disk device of the present invention is capable of being further thinner and smaller. Thus, the present invention is particularly useful with a disk device for detecting a disk-shaped recording medium such as a CD, a DVD, and a BD at a position facing the turntable and bringing the recording medium into a replayable installment state with the clamper.

The invention claimed is:

1. A disk device having a casing, a clamper and a turntable in which a disk is conveyed to a replay position between the clamper and the turntable to be in a replay clamping state, and further comprising:
a pair of slide cam members that are movable in response to detection of the disk at the replay position;
a pair of clamper lifters that have respective clamper support portions for supporting the clamper, wherein
said pair of clamper lifters is arranged so that said clamper lifters move in opposite directions with respect to each other in a horizontal direction that is orthogonal to a thickness direction of the disk device in conjunction with movement of said pair of slide cam members and so that said clamper lifters have a different timing of starting movement in the opposite directions with respect to each other, and
said clamper support portions of said pair of clamper lifters have respective inclined surfaces that contact an outer peripheral part of the clamper in accordance with movement of said clamper lifters in the opposite directions to each other so as to move the clamper in the thickness direction of the disk device.

2. The disk device of claim 1, wherein said inclined surfaces of said clamper support portions are formed so that their size in the thickness direction of the disk device is smaller than the size of the clamper in the thickness direction.

3. The disk device of claim 1, wherein:
said clamper lifters are arranged to be slidable relative to a chassis that is on a side of the turntable toward the clamper,
said chassis has an opening portion, through which one part of the clamper is able to pass, that is formed in said chassis at a position facing the turntable,
said clamper lifters further comprise cam shafts, and
a thickness, which is a sum of (a) the thickness of said clamper lifters excluding said cam shafts and said clamper support portions and (b) the thickness of said chassis, is substantially equal to the thickness of said clamper.

4. The disk device of claim 3, wherein said chassis comprises a plurality of regulating pieces that are positioned at a peripheral part of said opening portion to regulate movement of the clamper in the horizontal direction.

5. The disk device of claim 4, wherein at least one of said regulating pieces contacts an inner surface of the casing to define a fixed space between the chassis and the inner surface of the casing in which movement of said pair of clamper lifters is permitted in the opposite directions.

6. The disk device of claim 1, wherein
said pair of slide cam members comprise raising and lowering cams, which raise and lower the turntable, and lifter cams, which move said pair of clamper lifters, formed therein, and
said clamper lifters have respective cam shafts to be engaged with said lifter cams.

7. The disk device of claim 6, wherein, in conjunction with a series of movements of said pair of slide cam members, said raising and lowering cams perform an operation which raises and lowers the turntable, and said lifter cams perform an operation which moves said pair of clamper lifters in the opposite directions to each other.

* * * * *